US012585429B2

(12) United States Patent
Ottens et al.

(10) Patent No.: US 12,585,429 B2
(45) Date of Patent: Mar. 24, 2026

(54) METHODS AND SYSTEMS FOR INTERACTING WITH AUDIO EVENTS VIA MOTION INPUTS

(71) Applicant: Apple Inc., Cupertino, CA (US)

(72) Inventors: Elizabeth A. Ottens, San Francisco, CA (US); William R. Boyd, Portland, OR (US); Charles C. Hoyt, Pacifica, CA (US); Andrew W. Malta, San Francisco, CA (US); Darius A. Satongar, Staffordshire (GB); Joe Savage, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/614,974

(22) Filed: Mar. 25, 2024

(65) Prior Publication Data

US 2024/0329922 A1 Oct. 3, 2024

Related U.S. Application Data

(60) Provisional application No. 63/456,449, filed on Mar. 31, 2023.

(51) Int. Cl.
*G06F 3/16* (2006.01)
*G06F 3/01* (2006.01)

(52) U.S. Cl.
CPC .............. *G06F 3/167* (2013.01); *G06F 3/017* (2013.01); *G06F 3/165* (2013.01)

(58) Field of Classification Search
CPC .......... G06F 3/167; G06F 3/017; G06F 3/165
USPC ....................................... 340/636.1
See application file for complete search history.

(56) References Cited

U.S. PATENT DOCUMENTS

| | | | |
|---|---|---|---|
| 10,339,721 B1 * | 7/2019 | Dascola ................. | G06F 3/011 |
| 2012/0197345 A1 | 8/2012 | Staller | |
| 2014/0321682 A1 | 10/2014 | Kofod-Hansen et al. | |
| 2017/0374477 A1 | 12/2017 | Salvatucci et al. | |
| 2019/0373355 A1 * | 12/2019 | Lee ......................... | G06F 1/163 |
| 2022/0022758 A1 * | 1/2022 | Eggers ................... | G16H 40/20 |

OTHER PUBLICATIONS

International Preliminary Report on Patentability received for PCT Patent Application No. PCT/US2024/021988, mailed on Oct. 9, 2025, 14 pages.

* cited by examiner

*Primary Examiner* — Naomi J Small
(74) *Attorney, Agent, or Firm* — YHE Law LLP

(57) ABSTRACT

The present disclosure generally relates to interacting with audio data via motion inputs. In some embodiments, methods, devices, and techniques are provided for detecting motion inputs to interact with audio notifications, providing audio feedback for detected motion gestures, and detecting motion inputs in spatial audio arrangements.

40 Claims, 41 Drawing Sheets

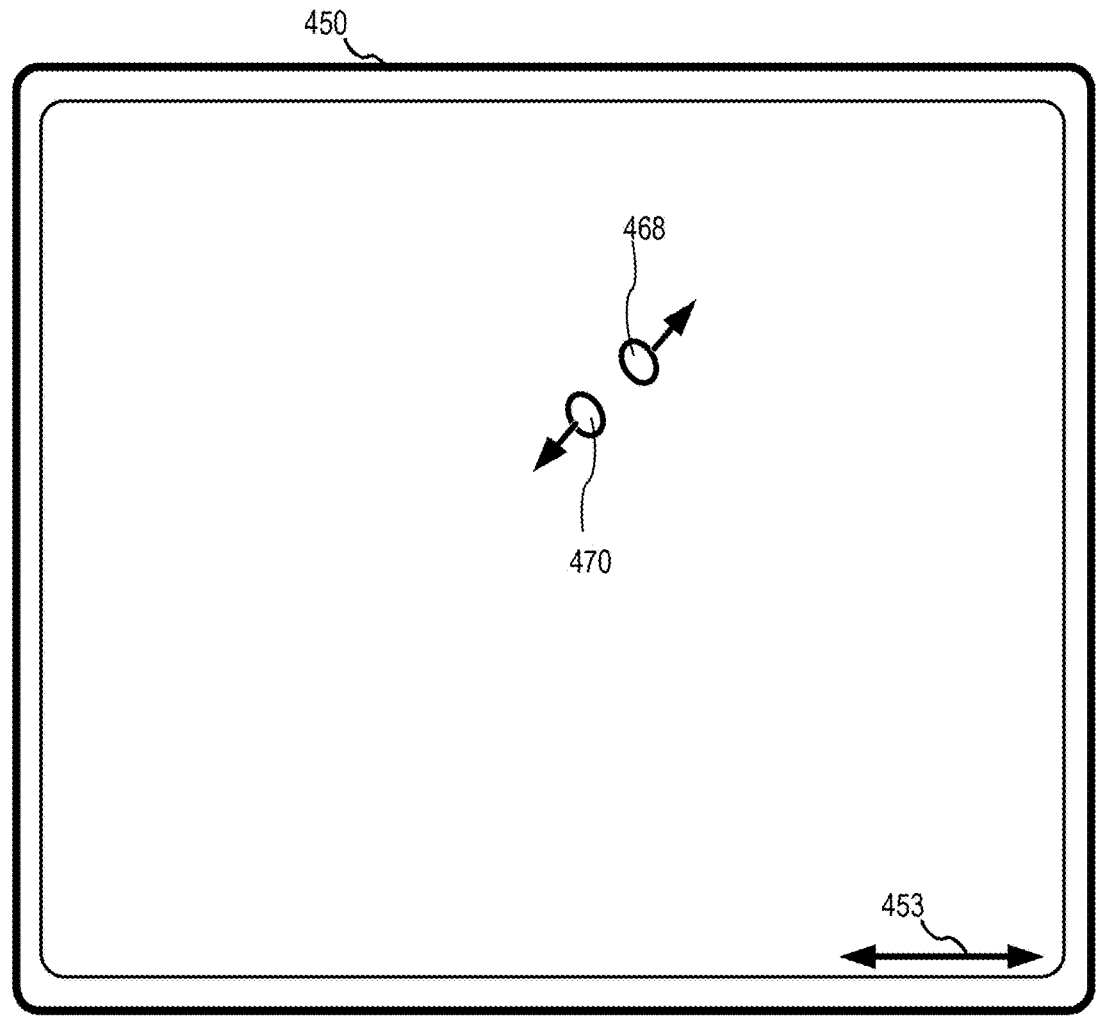
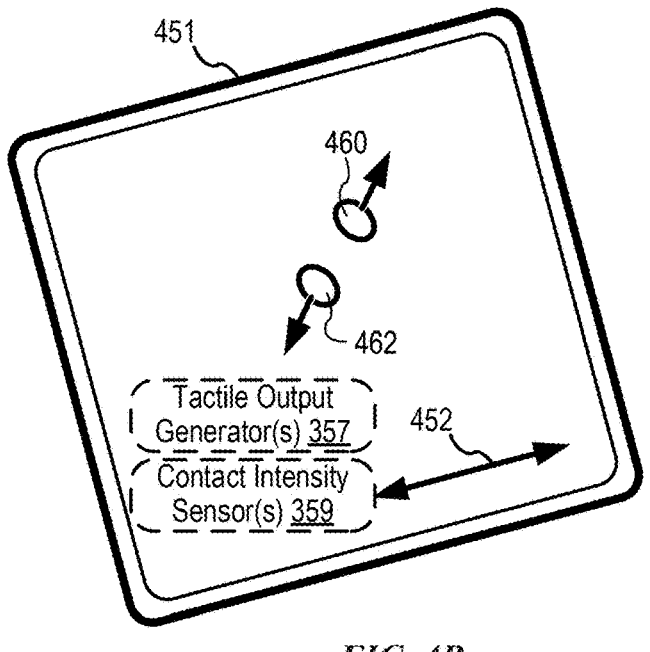
*FIG. 4B*

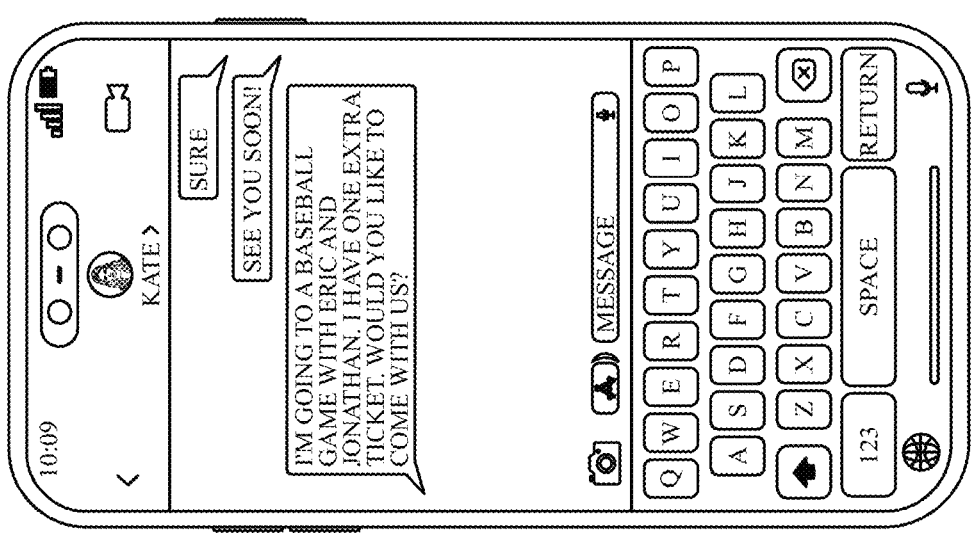
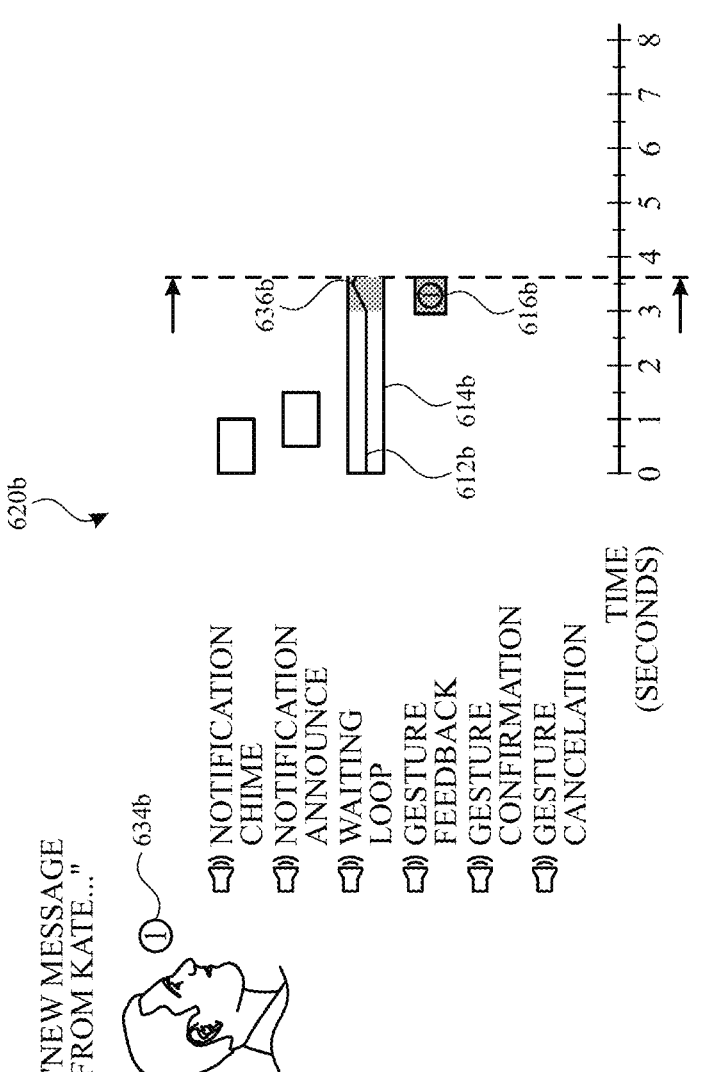
*FIG. 6C*

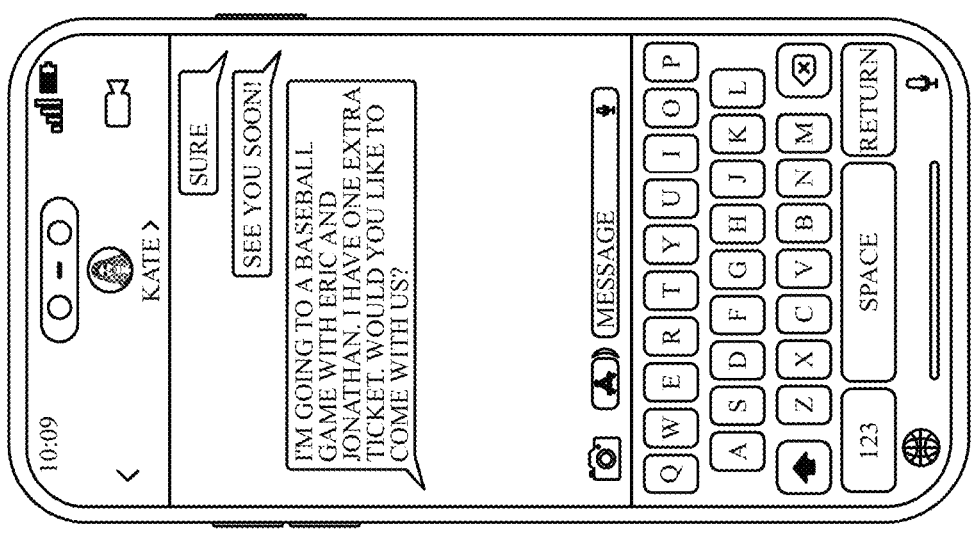
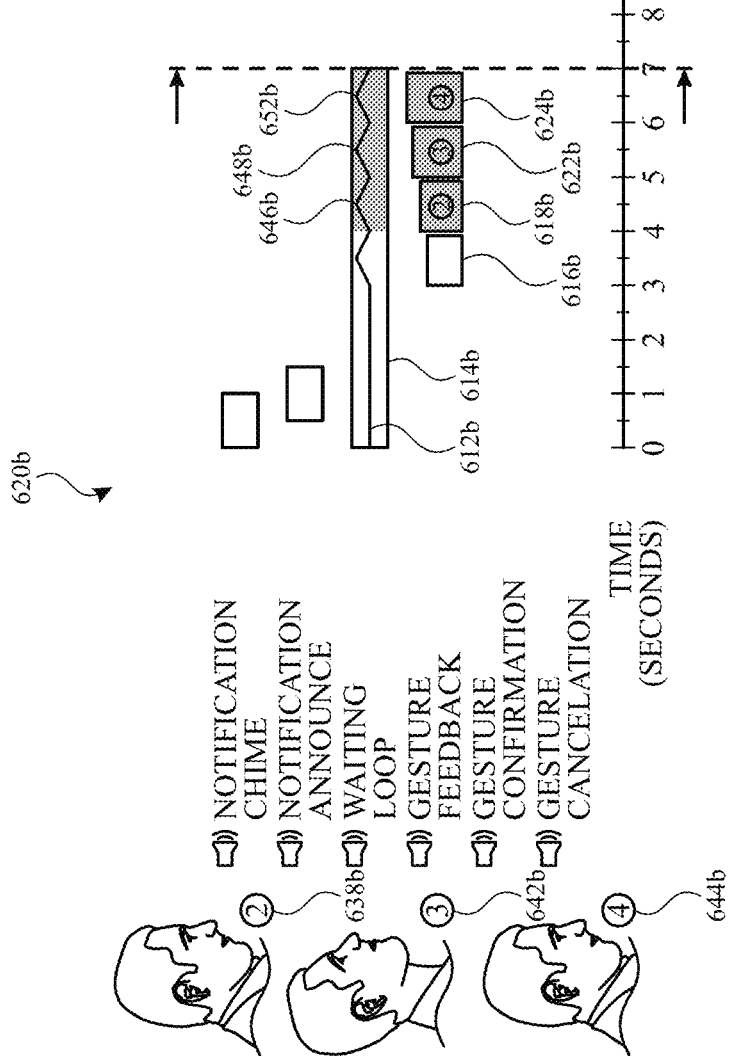
*FIG. 6D*

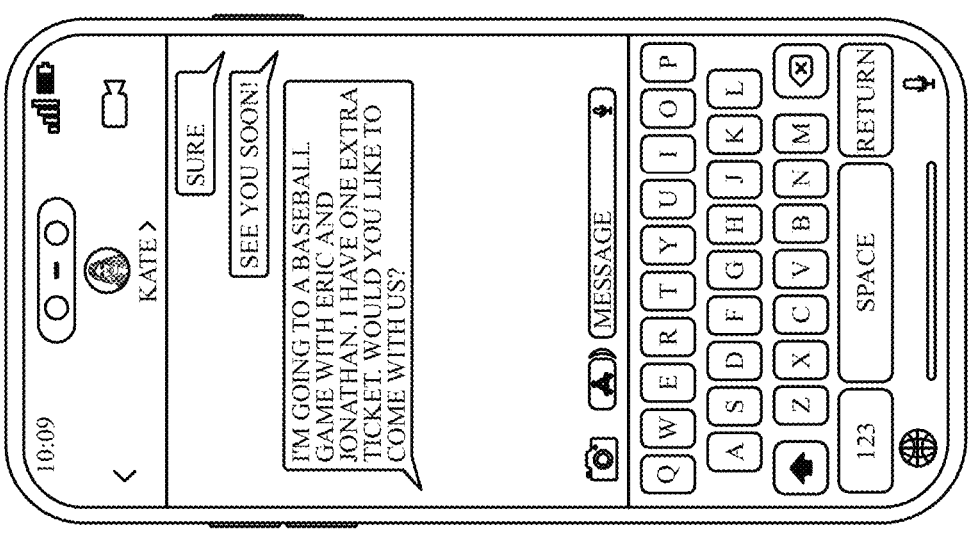
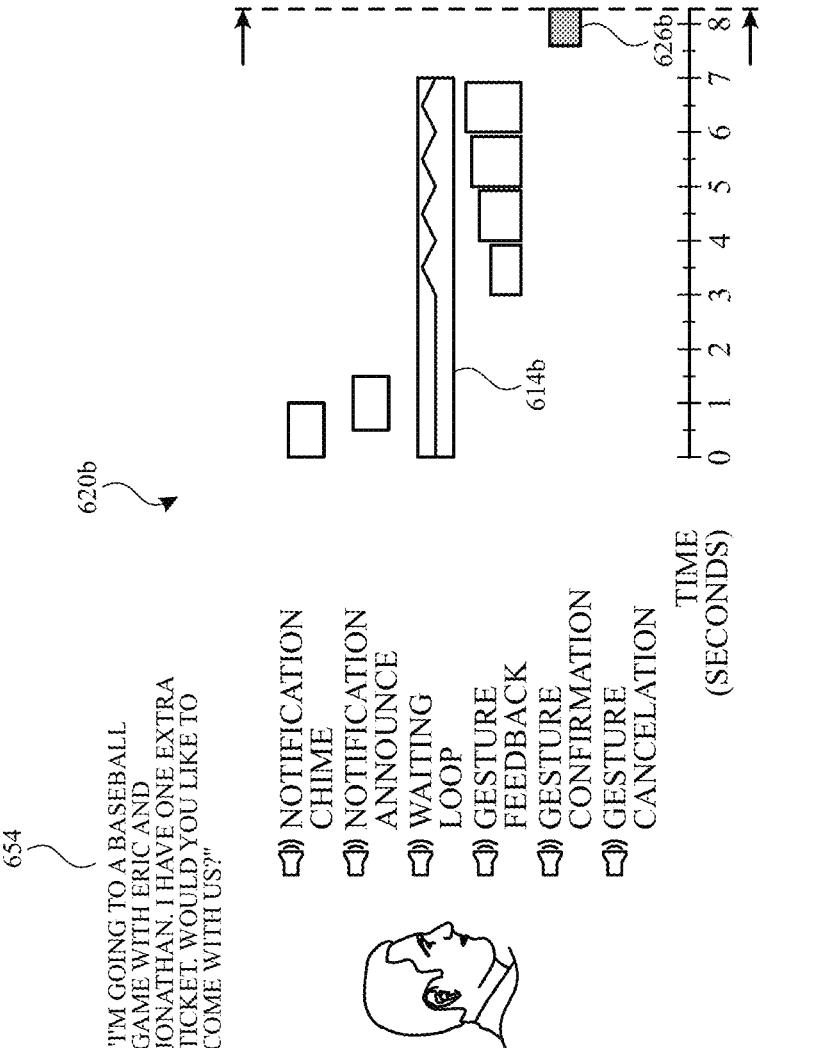
*FIG. 6E*

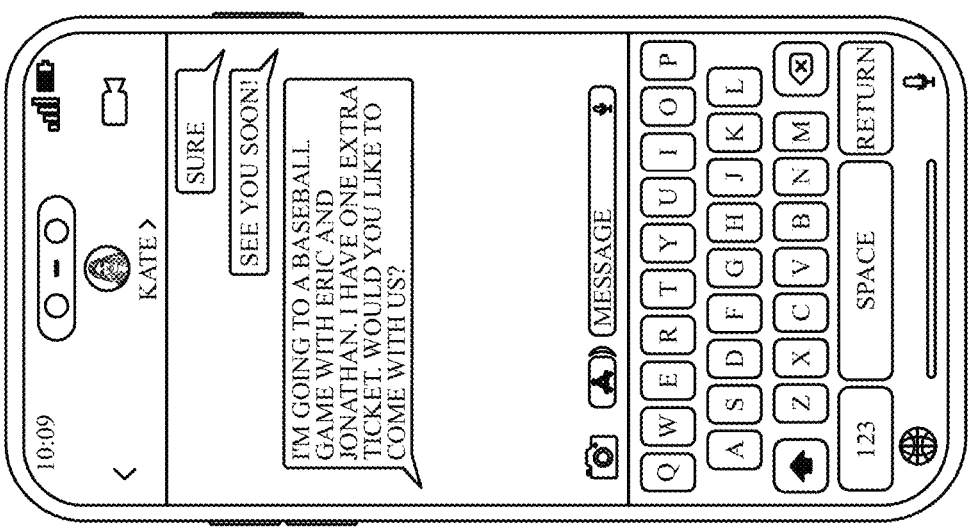
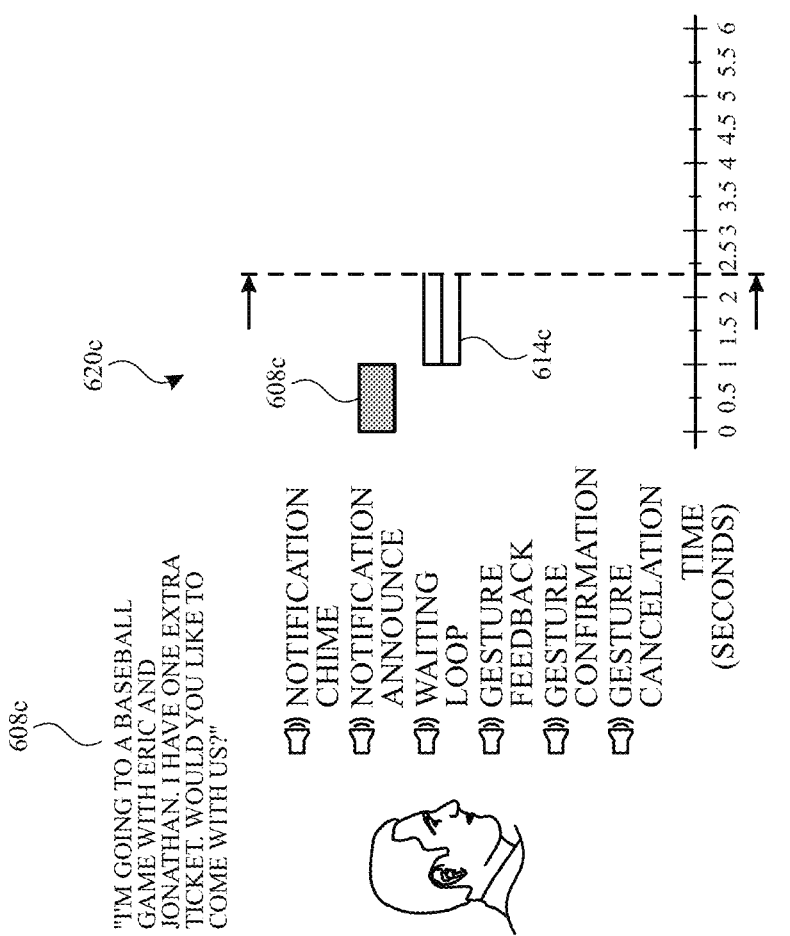
*FIG. 6F*

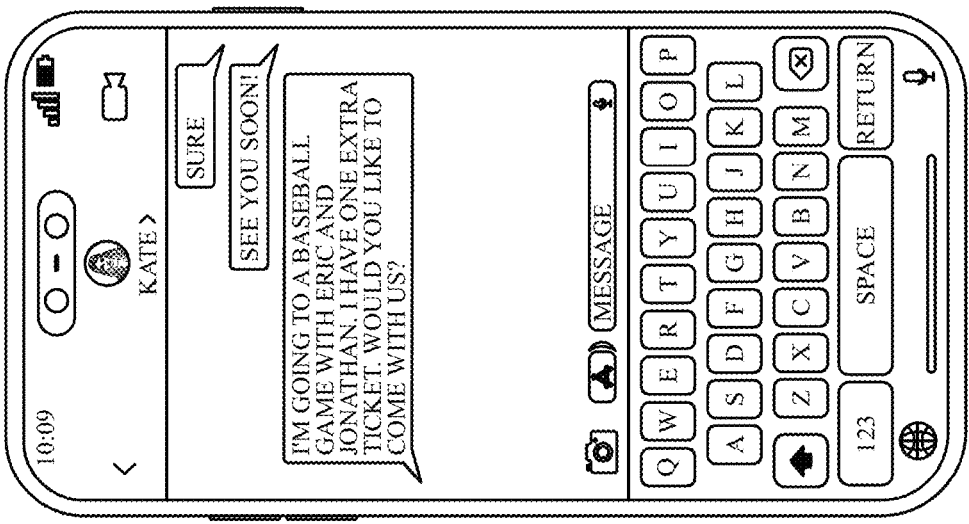
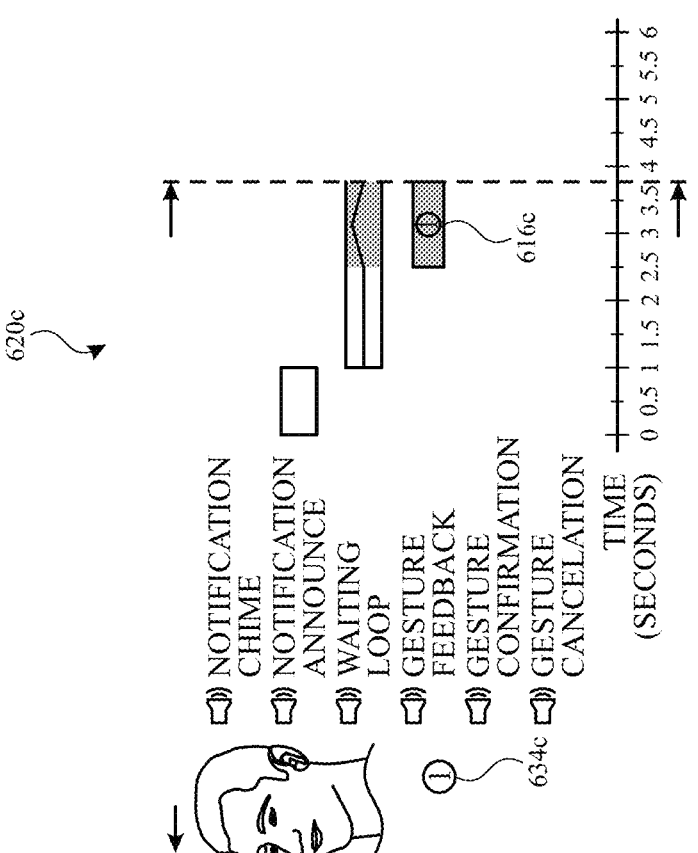
*FIG. 6G*

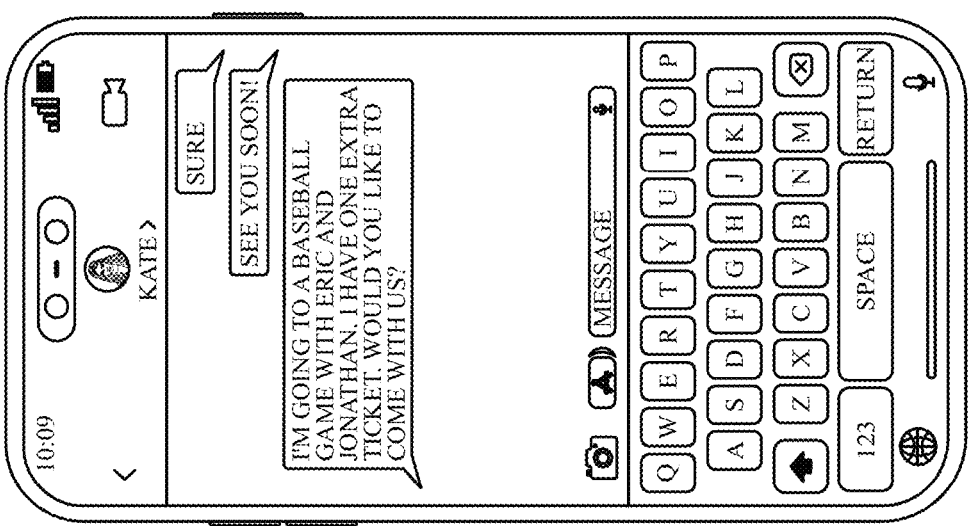
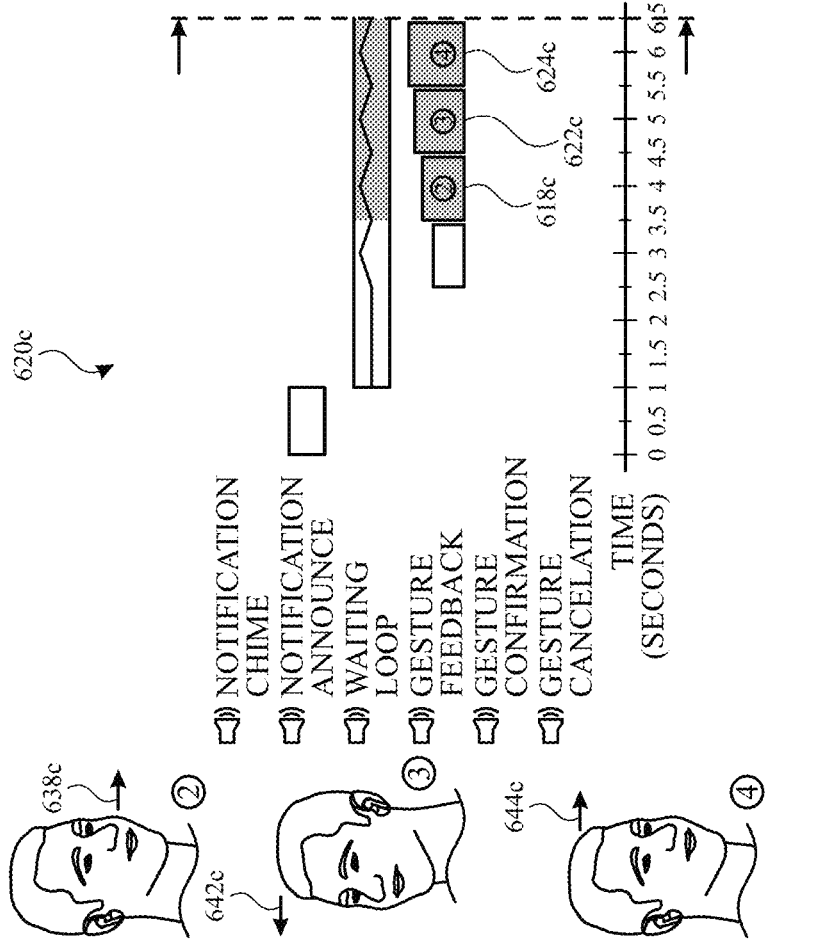
FIG. 6H

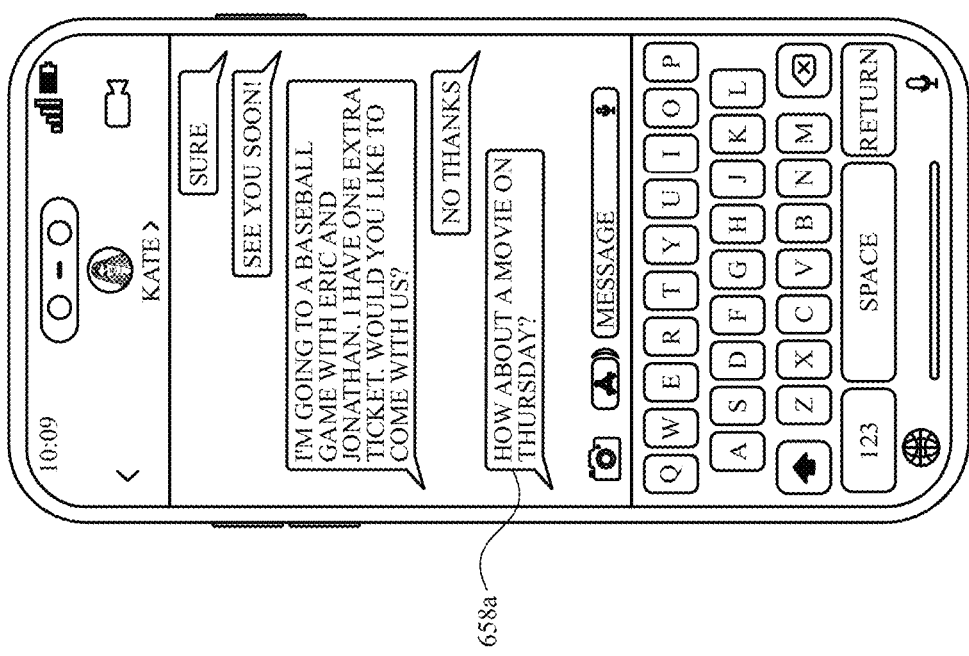
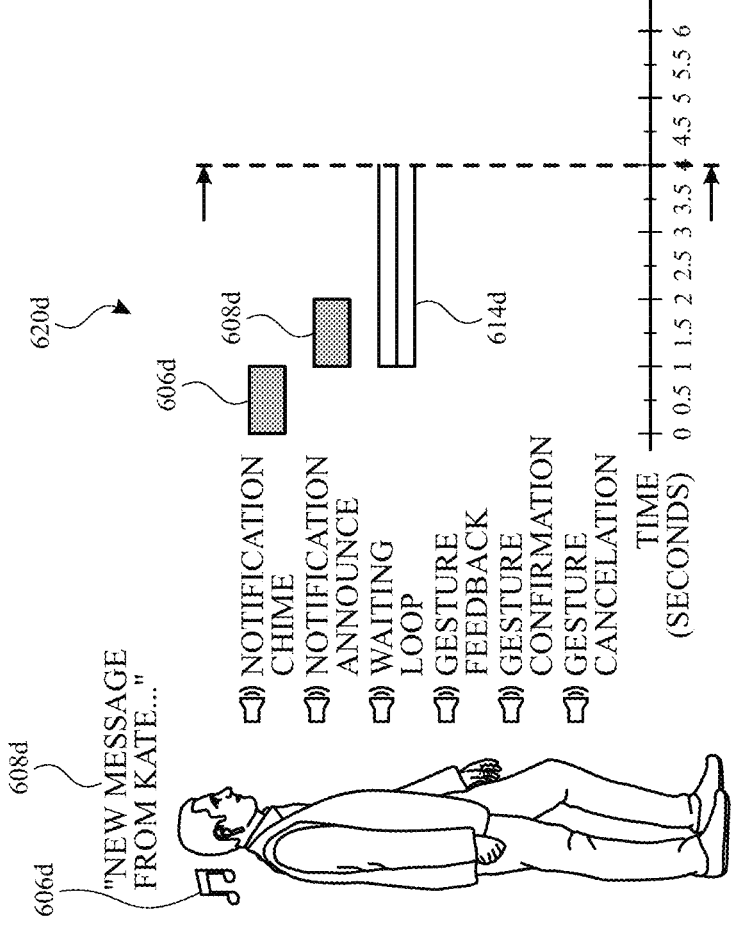
*FIG. 6J*

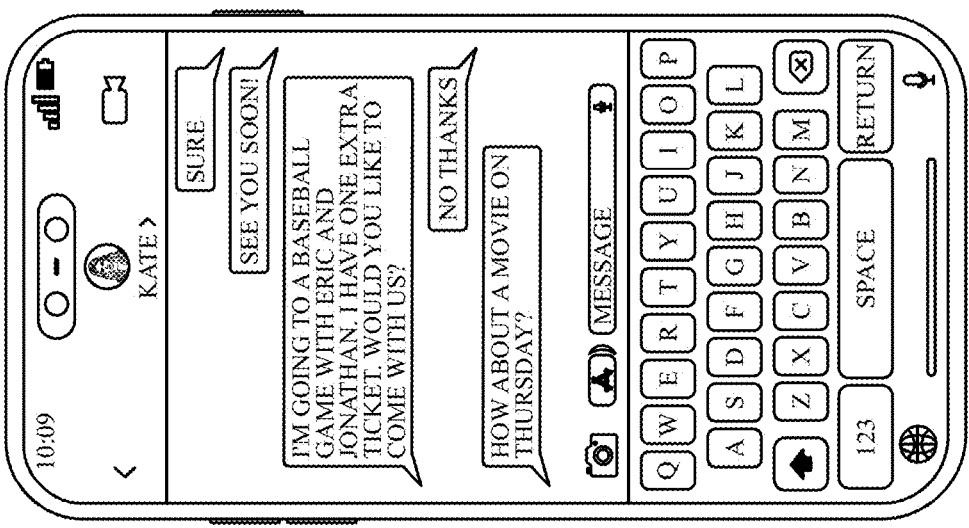
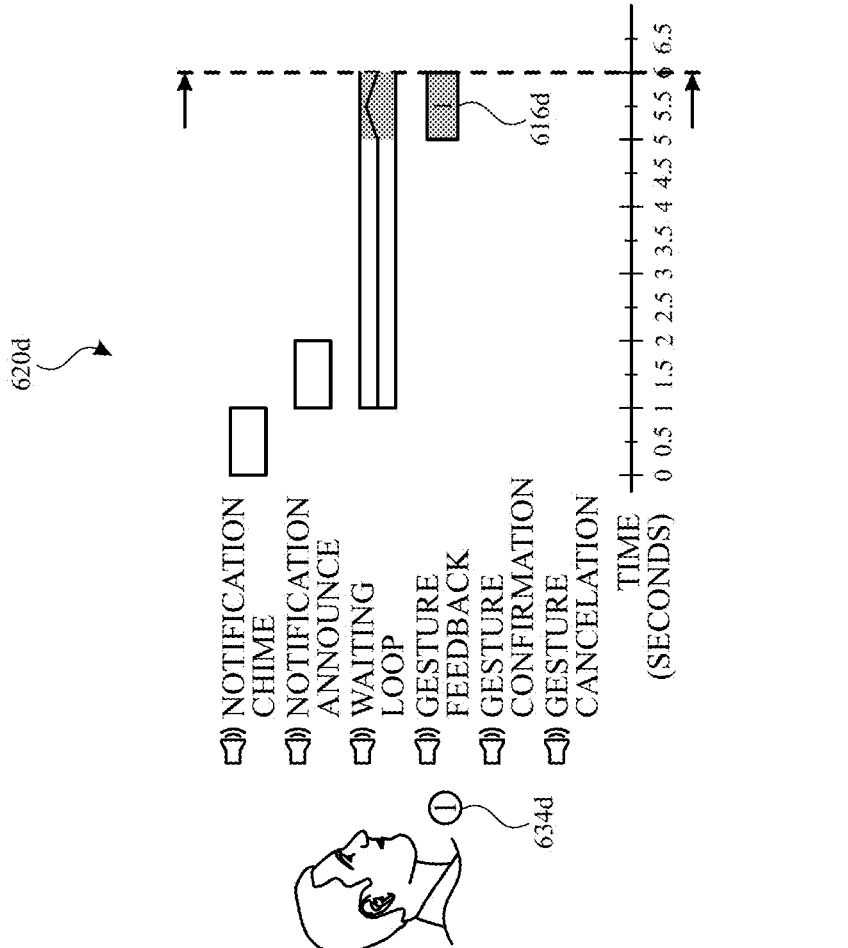
FIG. 6K

700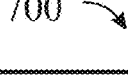

---

702

Output a first audio notification

---

704

Subsequent to outputting the first audio notification, a motion input, based on one or more sensor measurements from one or more sensors in the one or more audio output devices, is detected

---

706

In response to the detected motion input and in accordance with a determination that a first set of criteria are met, wherein the first set of criteria includes a first criterion that is met when the motion input is detected within a threshold time period of outputting the first audio notification, cause performance of a first operation associated with the first audio notification

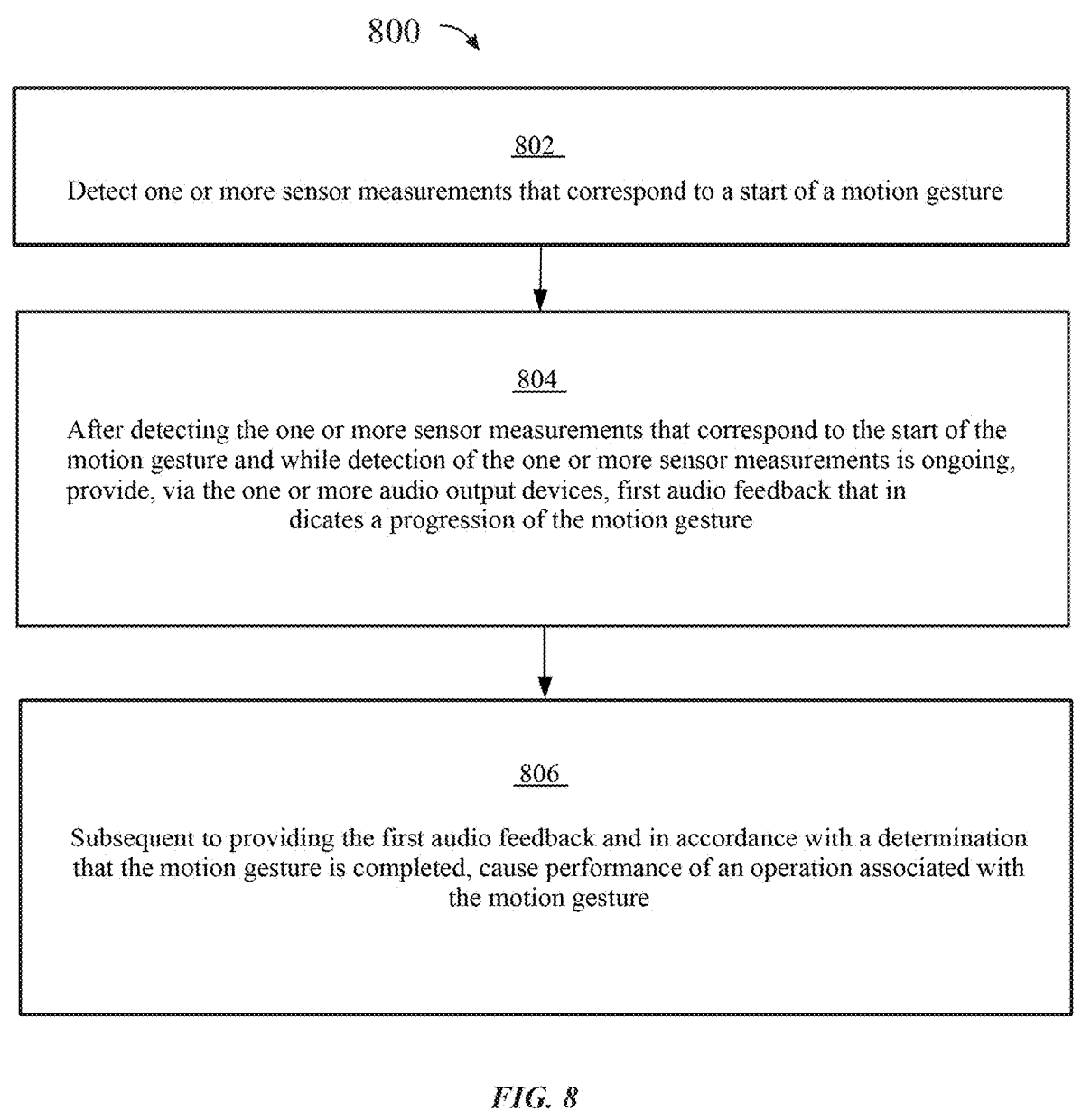

Detect one or more sensor measurements that correspond to a start of a motion gesture

804

After detecting the one or more sensor measurements that correspond to the start of the motion gesture and while detection of the one or more sensor measurements is ongoing, provide, via the one or more audio output devices, first audio feedback that in dicates a progression of the motion gesture

806

Subsequent to providing the first audio feedback and in accordance with a determination that the motion gesture is completed, cause performance of an operation associated with the motion gesture

*FIG. 8*

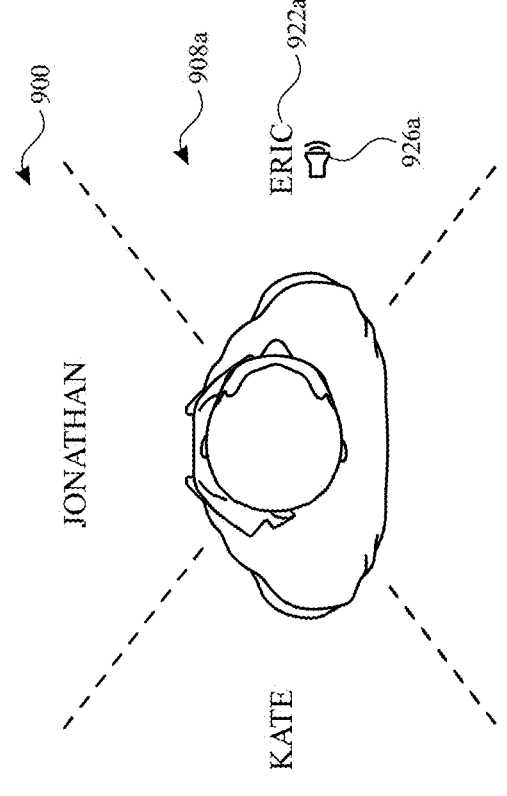
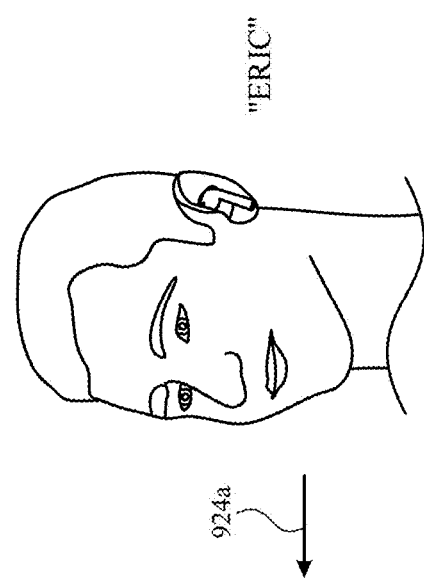
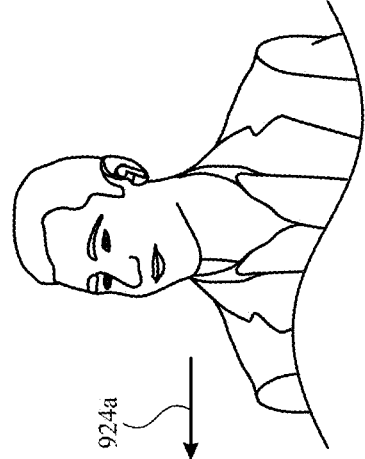
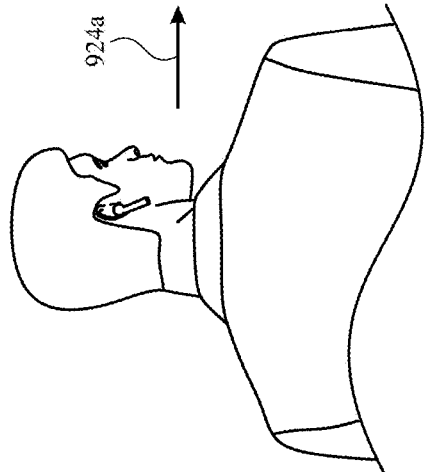
*FIG. 9E*

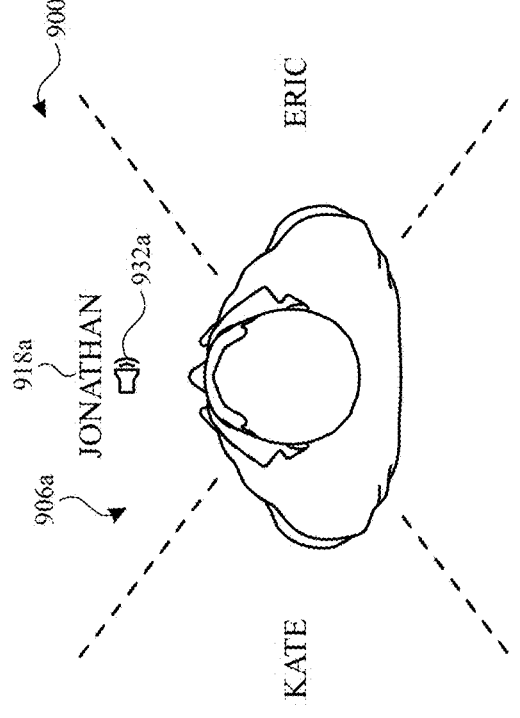
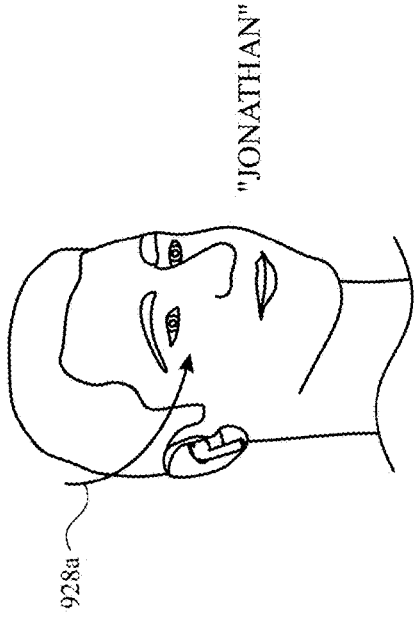
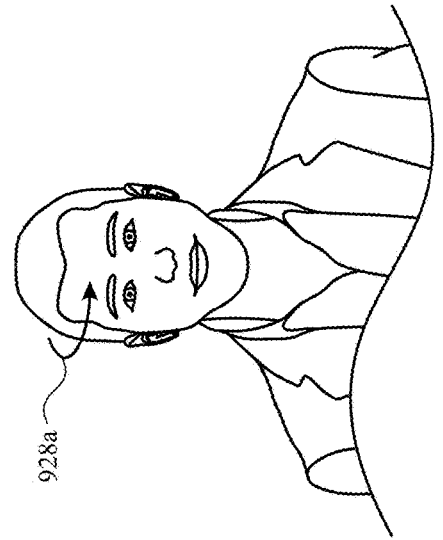
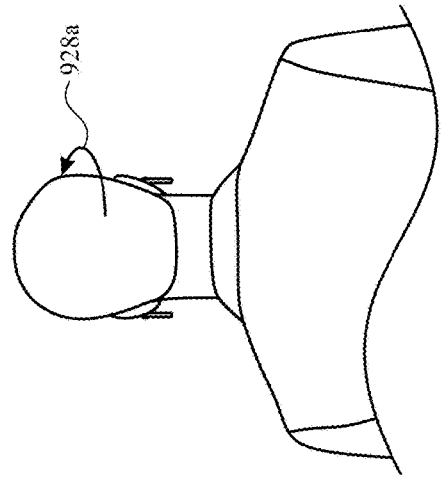
*FIG. 9F*

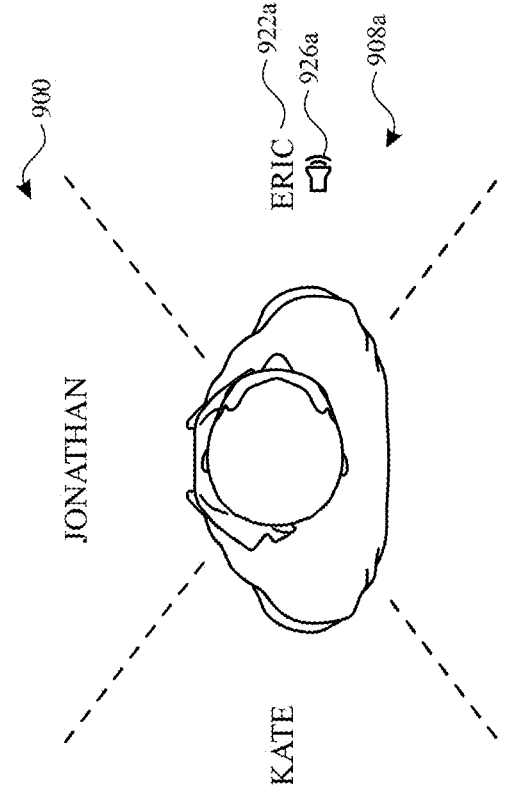
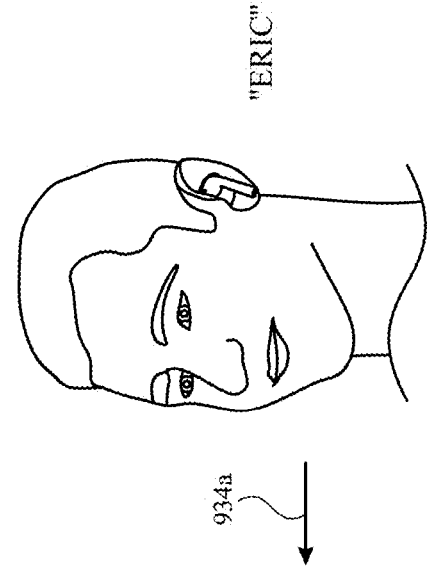
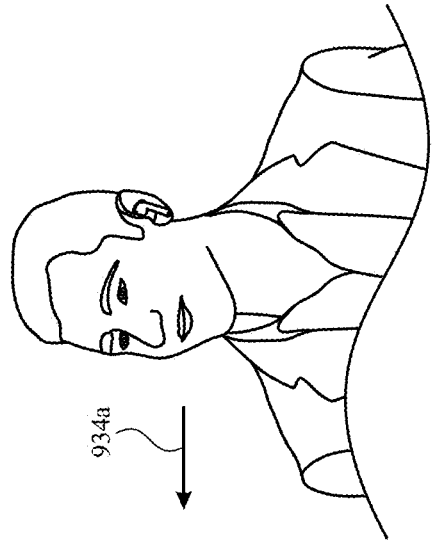
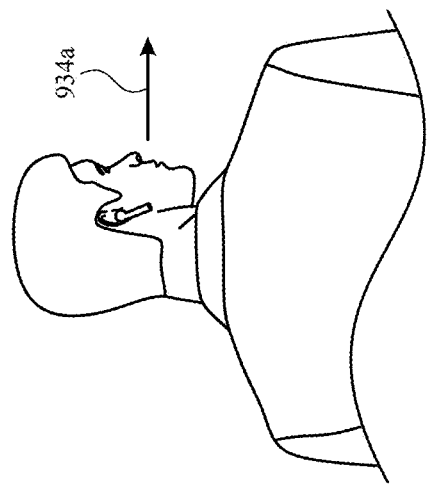
*FIG. 9G*

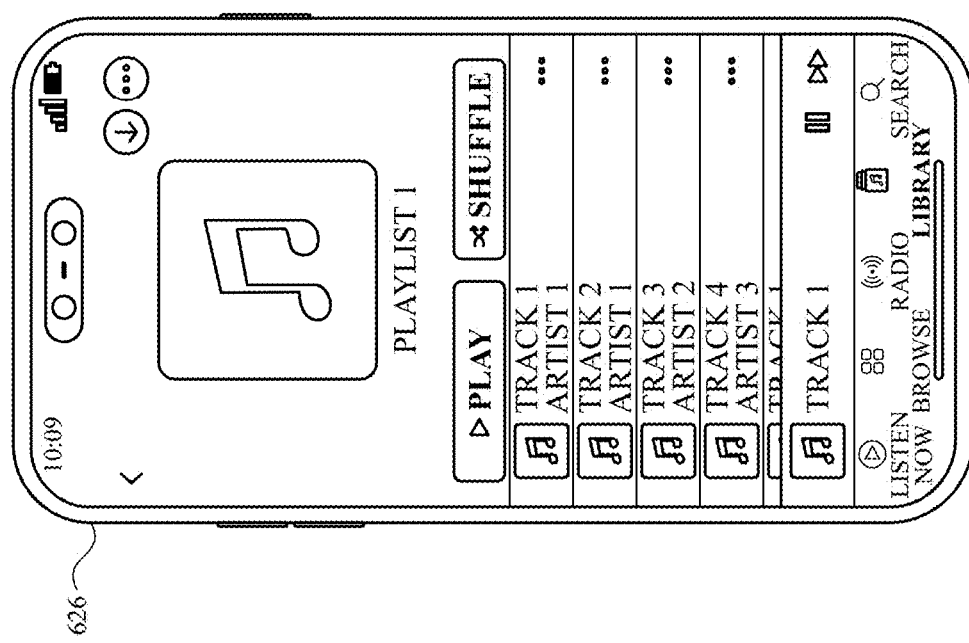
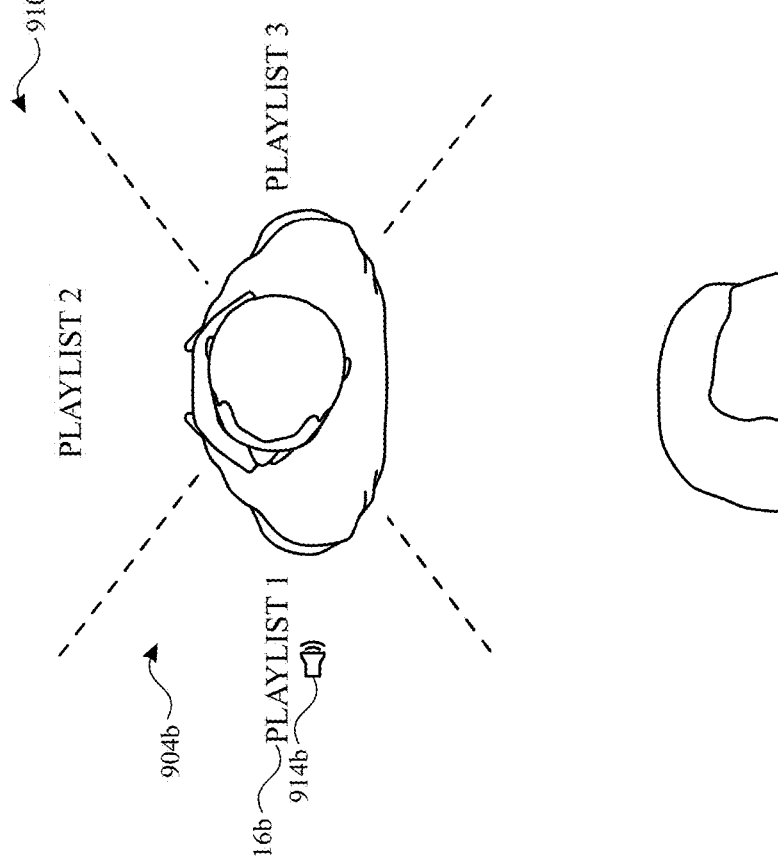
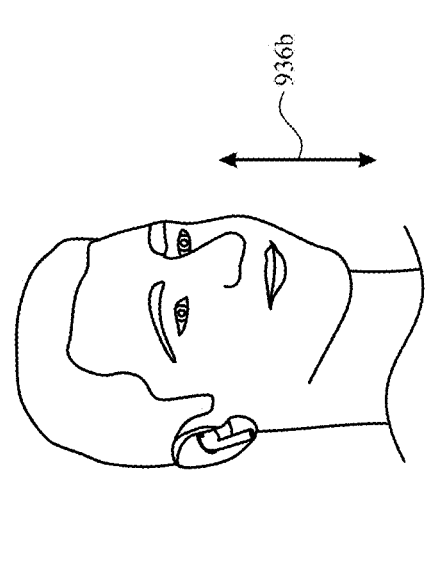
FIG. 9K

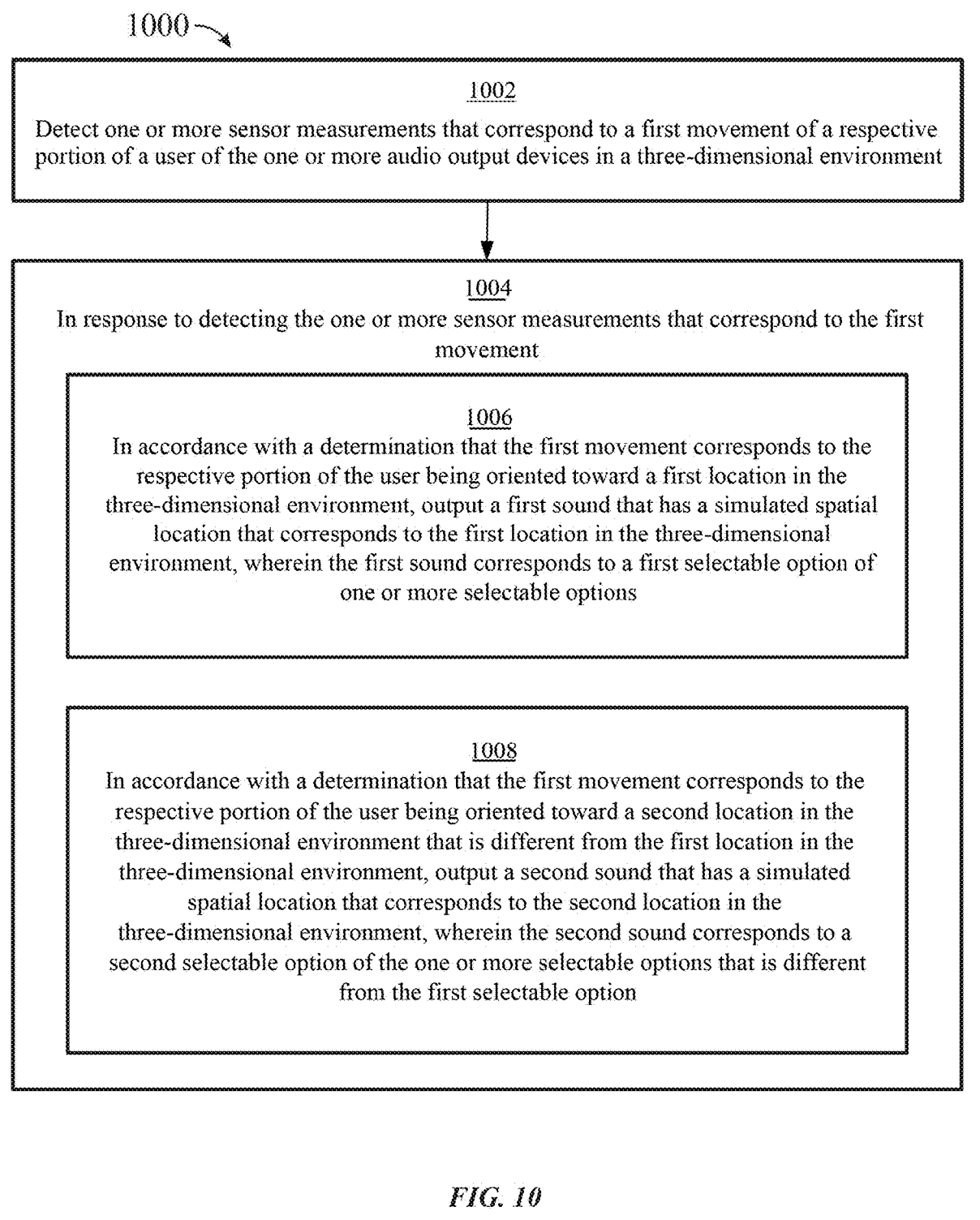

1000 ⟍

1002
Detect one or more sensor measurements that correspond to a first movement of a respective portion of a user of the one or more audio output devices in a three-dimensional environment

1004
In response to detecting the one or more sensor measurements that correspond to the first movement

1006
In accordance with a determination that the first movement corresponds to the respective portion of the user being oriented toward a first location in the three-dimensional environment, output a first sound that has a simulated spatial location that corresponds to the first location in the three-dimensional environment, wherein the first sound corresponds to a first selectable option of one or more selectable options

1008
In accordance with a determination that the first movement corresponds to the respective portion of the user being oriented toward a second location in the three-dimensional environment that is different from the first location in the three-dimensional environment, output a second sound that has a simulated spatial location that corresponds to the second location in the three-dimensional environment, wherein the second sound corresponds to a second selectable option of the one or more selectable options that is different from the first selectable option

*FIG. 10*

METHODS AND SYSTEMS FOR INTERACTING WITH AUDIO EVENTS VIA MOTION INPUTS

CROSS REFERENCE TO RELATED APPLICATIONS

This application claims priority to U.S. Provisional Application No. 63/456,449, filed Mar. 31, 2023, and entitled "METHODS AND SYSTEMS FOR INTERACTING WITH AUDIO EVENTS VIA MOTION INPUTS," the entire disclosure of which is hereby incorporated by reference for all proper purposes.

FIELD

The present disclosure relates generally to audio output devices, and more specifically to techniques for interacting with audio data via motion inputs.

BACKGROUND

Electronic devices can provide audio data via wireless connections to audio output devices such as wireless speakers and wireless headphones. Example audio output devices can interact with audio data using various input techniques.

BRIEF SUMMARY

Some techniques for interacting with audio data using electronic devices and/or audio output devices, however, are generally cumbersome and inefficient. For example, some existing techniques are complex, time-consuming, and limiting, which may require voice inputs and/or multiple key presses or keystrokes. Existing techniques require more time than necessary, wasting user time and device energy. This latter consideration is particularly important in battery-operated devices.

Accordingly, the present technique provides audio output devices with faster and more efficient methods for interacting with audio data. Such methods optionally complement or replace other methods for interacting with audio data. Such methods and interfaces reduce the cognitive burden on a user and produce a more efficient human-machine interface. For battery-operated computing devices, such methods reduce the number of extraneous received inputs, conserve power, and increase the time between battery charges.

In accordance with some embodiments, a method, performed at one or more audio output devices is described. The method includes: outputting a first audio notification; subsequent to outputting the first audio notification, a motion input, based on one or more sensor measurements from one or more sensors in the one or more audio output devices, is detected; and in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, a non-transitory computer-readable storage medium is described. The non-transitory computer-readable storage medium stores one or more programs configured to be executed by one or more processors at one or more audio output devices, the one or more programs including instructions for: outputting a first audio notification; subsequent to outputting the first audio notification, a motion input, based on one or more sensor measurements from one or more sensors in the one or more audio output devices, is detected; and in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, a transitory computer-readable storage medium is described. The transitory computer-readable storage medium stores one or more programs configured to be executed by one or more processors at one or more audio output devices, the one or more programs including instructions for: outputting a first audio notification; subsequent to outputting the first audio notification, a motion input, based on one or more sensor measurements from one or more sensors in the one or more audio output devices, is detected; and in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, one or more audio output devices, comprising: one or more processors; and memory storing one or more programs configured to be executed by the one or more processors is described. The one or more programs include instructions for: outputting a first audio notification; subsequent to outputting the first audio notification, a motion input, based on one or more sensor measurements from one or more sensors in the one or more audio output devices, is detected; and in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, one or more audio output devices is described. The one or more audio output devices comprise: means for outputting a first audio notification; means for, subsequent to outputting the first audio notification, detecting a motion input, based on one or more sensor measurements from one or more sensors in the one or more audio output devices; and means for, in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, a computer program product, comprising one or more programs configured to be executed by one or more processors at one or more audio output devices is described. The one or more programs include instructions for: outputting a first audio notification; subsequent to outputting the first audio notification, a motion input, based on one or more sensor measurements from one or more sensors in the one or more audio output devices, is detected; and in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification.

In accordance with some embodiments, a method, performed at one or more audio output devices is described. The method includes: detecting one or more sensor measurements that correspond to a start of a motion gesture; after detecting the one or more sensor measurements that correspond to the start of the motion gesture and while detection of the one or more sensor measurements is ongoing, providing, via the one or more audio output devices, first audio feedback that indicates a progression of the motion gesture; and subsequent to providing the first audio feedback and in accordance with a determination that the motion gesture is completed, causing performance of an operation associated with the motion gesture.

In accordance with some embodiments, a non-transitory computer-readable storage medium is described. The non-transitory computer-readable storage medium stores one or more programs configured to be executed by one or more processors at one or more audio output devices, the one or more programs including instructions for: detecting one or more sensor measurements that correspond to a start of a motion gesture; after detecting the one or more sensor measurements that correspond to the start of the motion gesture and while detection of the one or more sensor measurements is ongoing, providing, via the one or more audio output devices, first audio feedback that indicates a progression of the motion gesture; and subsequent to providing the first audio feedback and in accordance with a determination that the motion gesture is completed, causing performance of an operation associated with the motion gesture.

In accordance with some embodiments, a transitory computer-readable storage medium is described. The transitory computer-readable storage medium stores one or more programs configured to be executed by one or more processors at one or more audio output devices, the one or more programs including instructions for: detecting one or more sensor measurements that correspond to a start of a motion gesture; after detecting the one or more sensor measurements that correspond to the start of the motion gesture and while detection of the one or more sensor measurements is ongoing, providing, via the one or more audio output devices, first audio feedback that indicates a progression of the motion gesture; and subsequent to providing the first audio feedback and in accordance with a determination that the motion gesture is completed, causing performance of an operation associated with the motion gesture.

In accordance with some embodiments, one or more audio output devices, comprising: one or more processors; and memory storing one or more programs configured to be executed by the one or more processors is described. The one or more programs include instructions for: detecting one or more sensor measurements that correspond to a start of a motion gesture; after detecting the one or more sensor measurements that correspond to the start of the motion gesture and while detection of the one or more sensor measurements is ongoing, providing, via the one or more audio output devices, first audio feedback that indicates a progression of the motion gesture; and subsequent to providing the first audio feedback and in accordance with a determination that the motion gesture is completed, causing performance of an operation associated with the motion gesture.

In accordance with some embodiments, one or more audio output devices is described. The one or more audio output devices comprise: means for detecting one or more sensor measurements that correspond to a start of a motion gesture; means for, after detecting the one or more sensor measurements that correspond to the start of the motion gesture and while detection of the one or more sensor measurements is ongoing, providing, via the one or more audio output devices, first audio feedback that indicates a progression of the motion gesture; and means for, subsequent to providing the first audio feedback and in accordance with a determination that the motion gesture is completed, causing performance of an operation associated with the motion gesture.

In accordance with some embodiments, a computer program product, comprising one or more programs configured to be executed by one or more processors at one or more audio output devices is described. The one or more programs include instructions for: detecting one or more sensor measurements that correspond to a start of a motion gesture; after detecting the one or more sensor measurements that correspond to the start of the motion gesture and while detection of the one or more sensor measurements is ongoing, providing, via the one or more audio output devices, first audio feedback that indicates a progression of the motion gesture; and subsequent to providing the first audio feedback and in accordance with a determination that the motion gesture is completed, causing performance of an operation associated with the motion gesture.

In accordance with some embodiments, a method, performed at one or more audio output devices is described. The method includes: detecting one or more sensor measurements that correspond to a first movement of a respective portion of a user of the one or more audio output devices in a three-dimensional environment; and in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

In accordance with some embodiments, a non-transitory computer-readable storage medium is described. The non-transitory computer-readable storage medium stores one or more programs configured to be executed by one or more processors at one or more audio output devices, the one or more programs including instructions for: detecting one or more sensor measurements that correspond to a first movement of a respective portion of a user of the one or more audio output devices in a three-dimensional environment; and in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

In accordance with some embodiments, a transitory computer-readable storage medium is described. The transitory computer-readable storage medium stores one or more programs configured to be executed by one or more processors at one or more audio output devices, the one or more programs including instructions for: detecting one or more sensor measurements that correspond to a first movement of a respective portion of a user of the one or more audio output devices in a three-dimensional environment; and in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

In accordance with some embodiments, one or more audio output devices, comprising: one or more processors; and memory storing one or more programs configured to be executed by the one or more processors is described. The one or more programs include instructions for: detecting one or more sensor measurements that correspond to a first movement of a respective portion of a user of the one or more audio output devices in a three-dimensional environment; and in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

In accordance with some embodiments, one or more audio output devices is described. The one or more audio output devices comprise: means for detecting one or more sensor measurements that correspond to a first movement of a respective portion of a user of the one or more audio output devices in a three-dimensional environment; and means for, in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

In accordance with some embodiments, a computer program product, comprising one or more programs configured to be executed by one or more processors at one or more audio output devices is described. The one or more programs include instructions for: detecting one or more sensor measurements that correspond to a first movement of a respective portion of a user of the one or more audio output devices in a three-dimensional environment; and in response to detecting the one or more sensor measurements that correspond to the first movement: in accordance with a determination that the first movement corresponds to the respective portion of the user being oriented toward a first location in the three-dimensional environment, outputting a first sound that has a simulated spatial location that corresponds to the first location in the three-dimensional environment, wherein the first sound corresponds to a first selectable option of one or more selectable options; and in accordance with a determination that the first movement corresponds to the respective portion of the user being oriented toward a second location in the three-dimensional environment that is different from the first location in the three-dimensional environment, outputting a second sound that has a simulated spatial location that corresponds to the second location in the three-dimensional environment, wherein the second sound corresponds to a second selectable option of the one or more selectable options that is different from the first selectable option.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with audio data via motion inputs, thereby increasing the effectiveness, efficiency, and user satisfaction with such devices. Such methods and interfaces may complement or replace other methods for interacting with audio data via motion inputs.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a block diagram of a method for detecting motion inputs to interact with audio notifications, in accordance with some embodiments.

FIG. 8 is a block diagram of a method for providing audio feedback for detected motion gestures, in accordance with some embodiments.

FIG. 10 is a block diagram of a method for detecting motion inputs in spatial audio arrangements, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for interacting with audio data. For example, when providing, from an electronic device, an audio notification to a connected audio output device, users must typically provide a set of voice inputs and/or touch input inputs to respond to the audio notification in a desired manner. The disclosed techniques reduce the number of voice inputs and touch inputs needed by the user to respond to an audio notification and provide an additional category of input method—motion inputs—that the user can use to create more accurate responses to audio notifications. Such techniques can reduce the cognitive burden on a user who interacts with audio data, thereby enhancing productivity. Further, such techniques can reduce processor and battery power otherwise wasted on redundant user inputs.

Figures 9A, 9B:
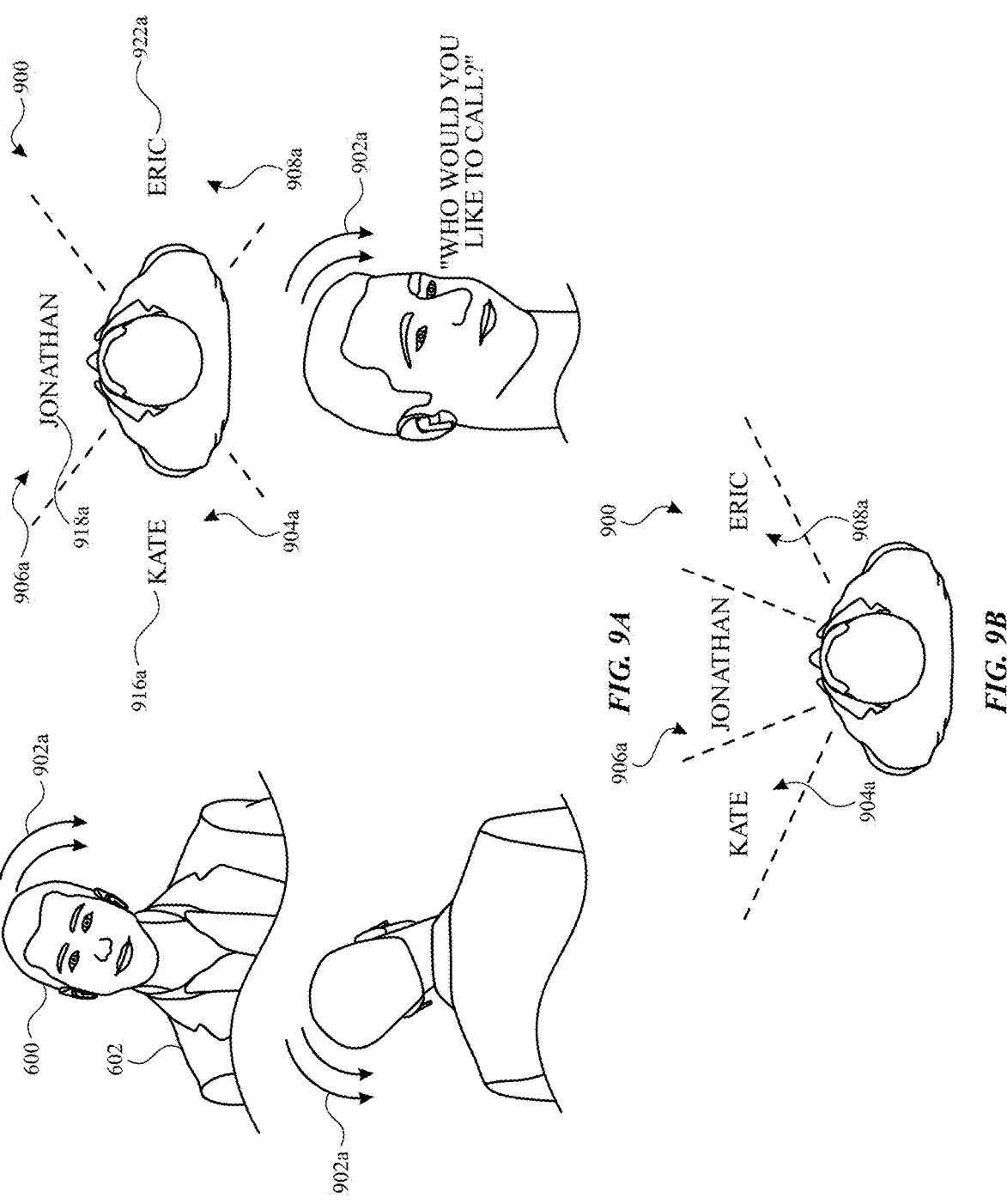
FIGS. 9A-9N illustrate example methods for detecting motion inputs in spatial audio arrangements, in accordance with some embodiments.

Below, FIGS. 1A-1B, 2, 3, 4A-4B, and 5A-5B provide a description of exemplary devices for performing the techniques for interacting with audio data. FIGS. 6A-6R illustrate exemplary methods for detecting motion inputs to interact with audio notifications and providing audio feedback for detected motion gestures. FIG. 7 is a flow diagram illustrating methods for detecting motion inputs to interact with audio notifications in accordance with some embodiments. FIG. 8 is a flow diagram illustrating methods for providing audio feedback for detected motion gestures. FIGS. 6A-6R are used to illustrate the processes described below, including the processes in FIG. 7 and FIG. 8. FIGS. 9A-9N illustrate exemplary methods for detecting motion inputs in spatial audio arrangements. FIG. 10 is a flow diagram illustrating methods for detecting motion inputs in spatial audio arrangements in accordance with some embodiments. The user interfaces in FIGS. 9A-9N are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
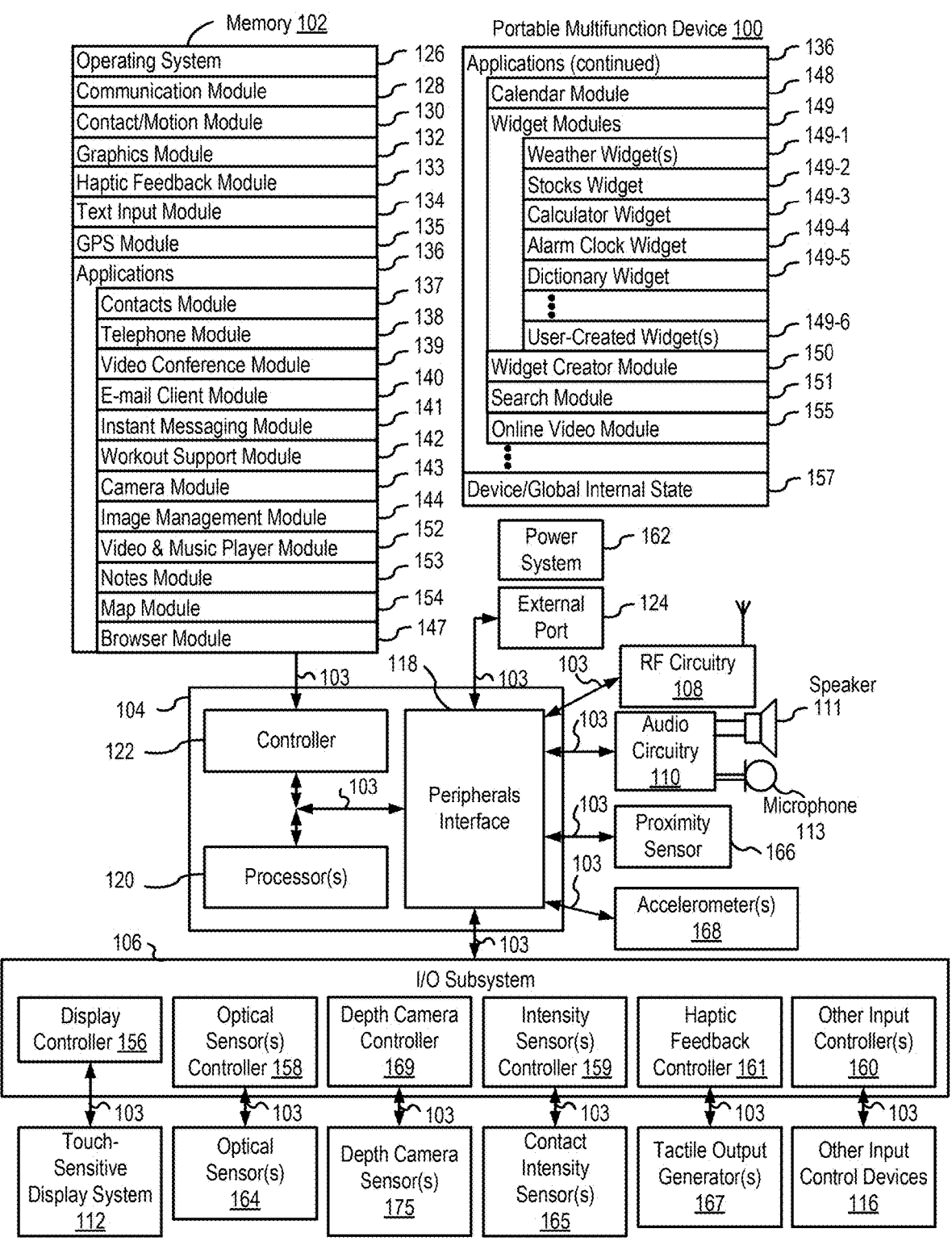
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three-dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
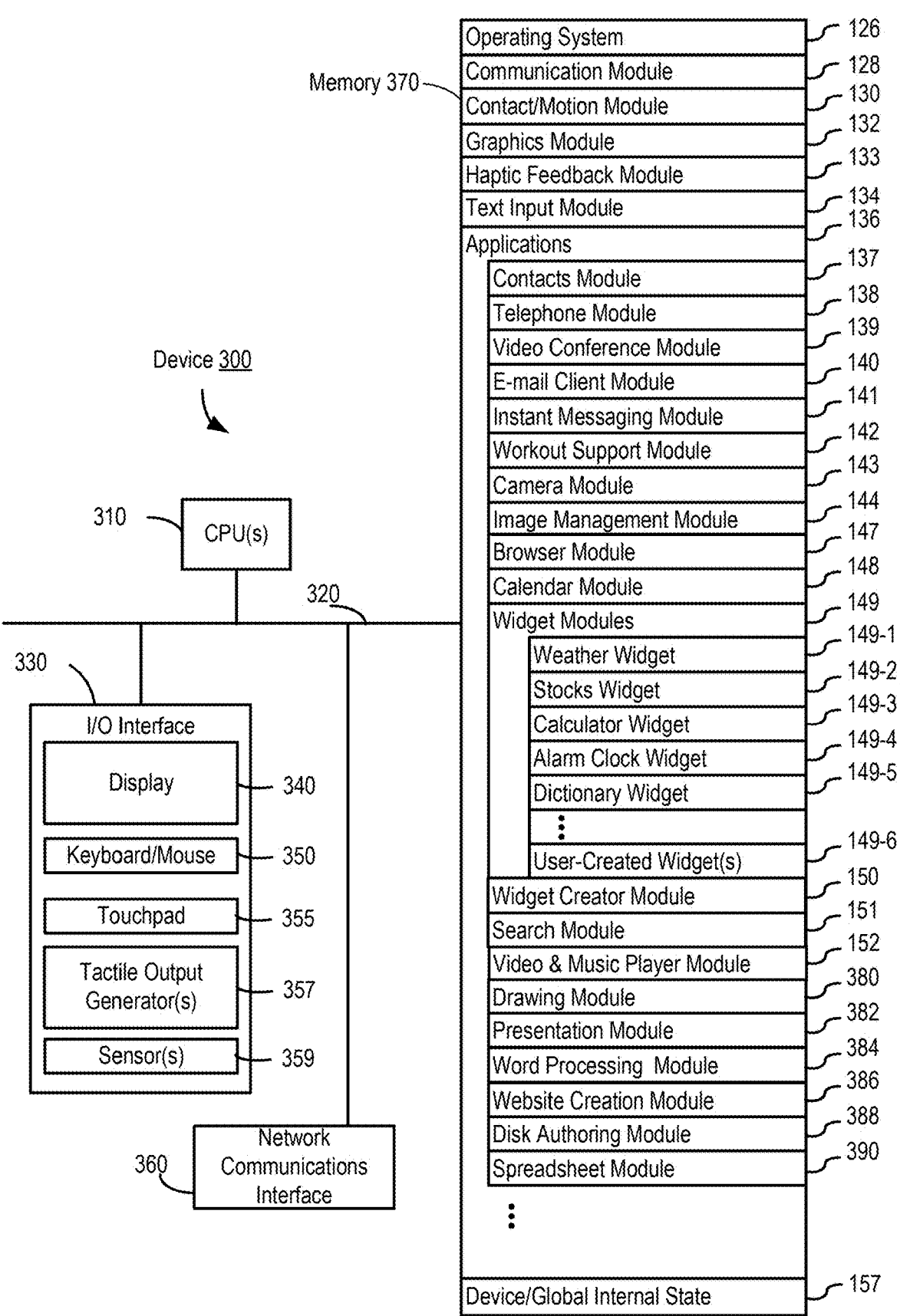
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124.

External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
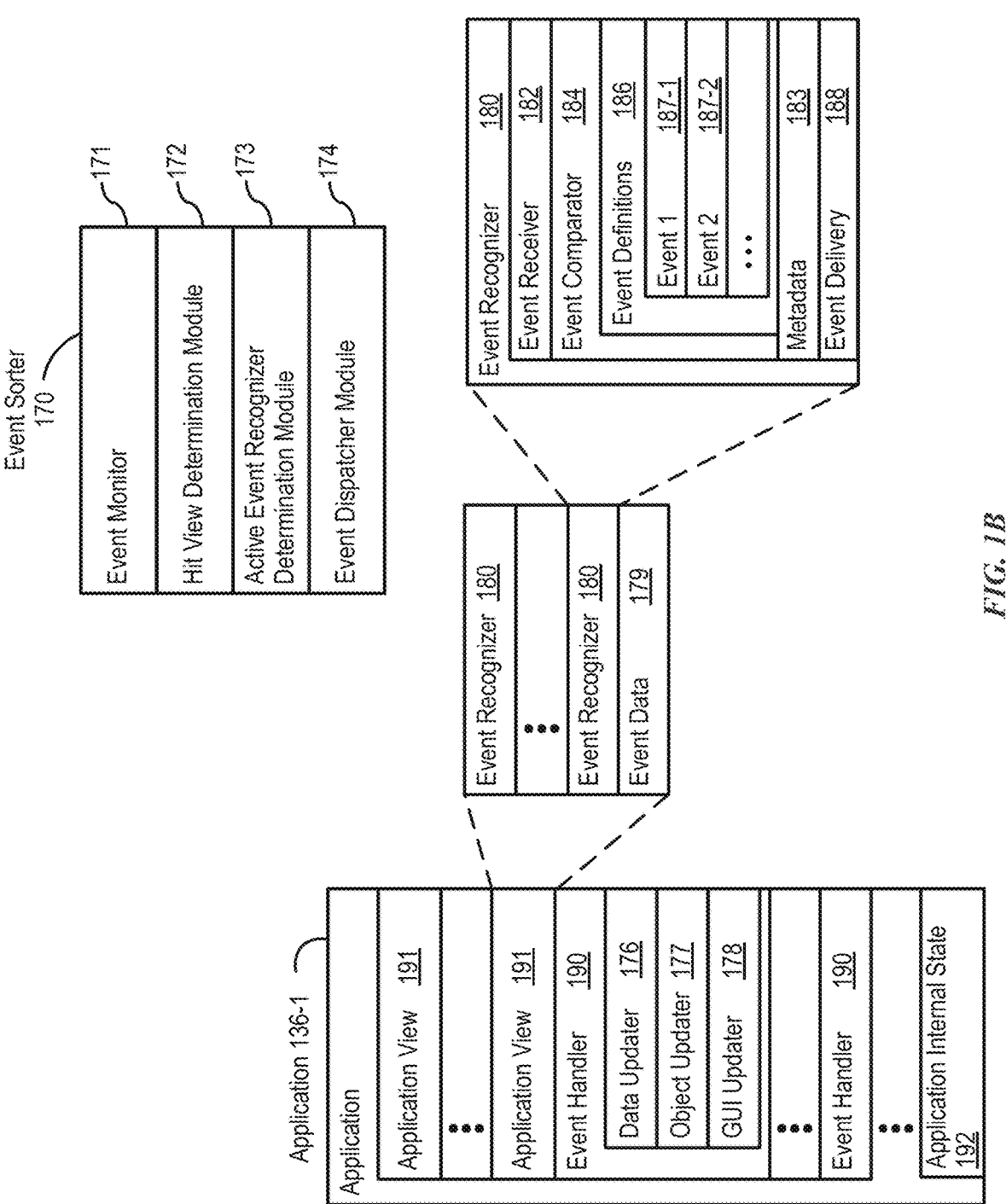
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192.

Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
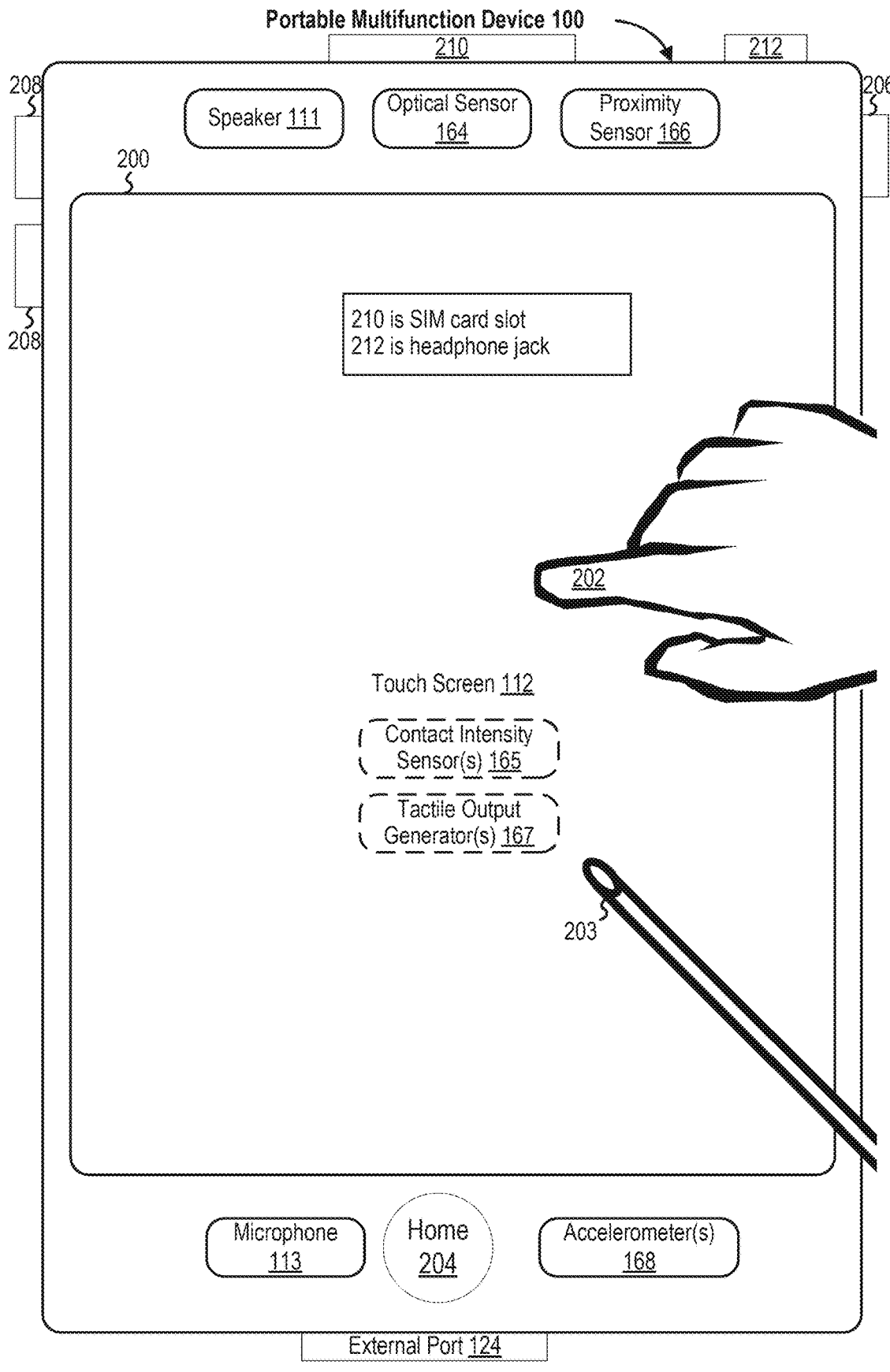
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
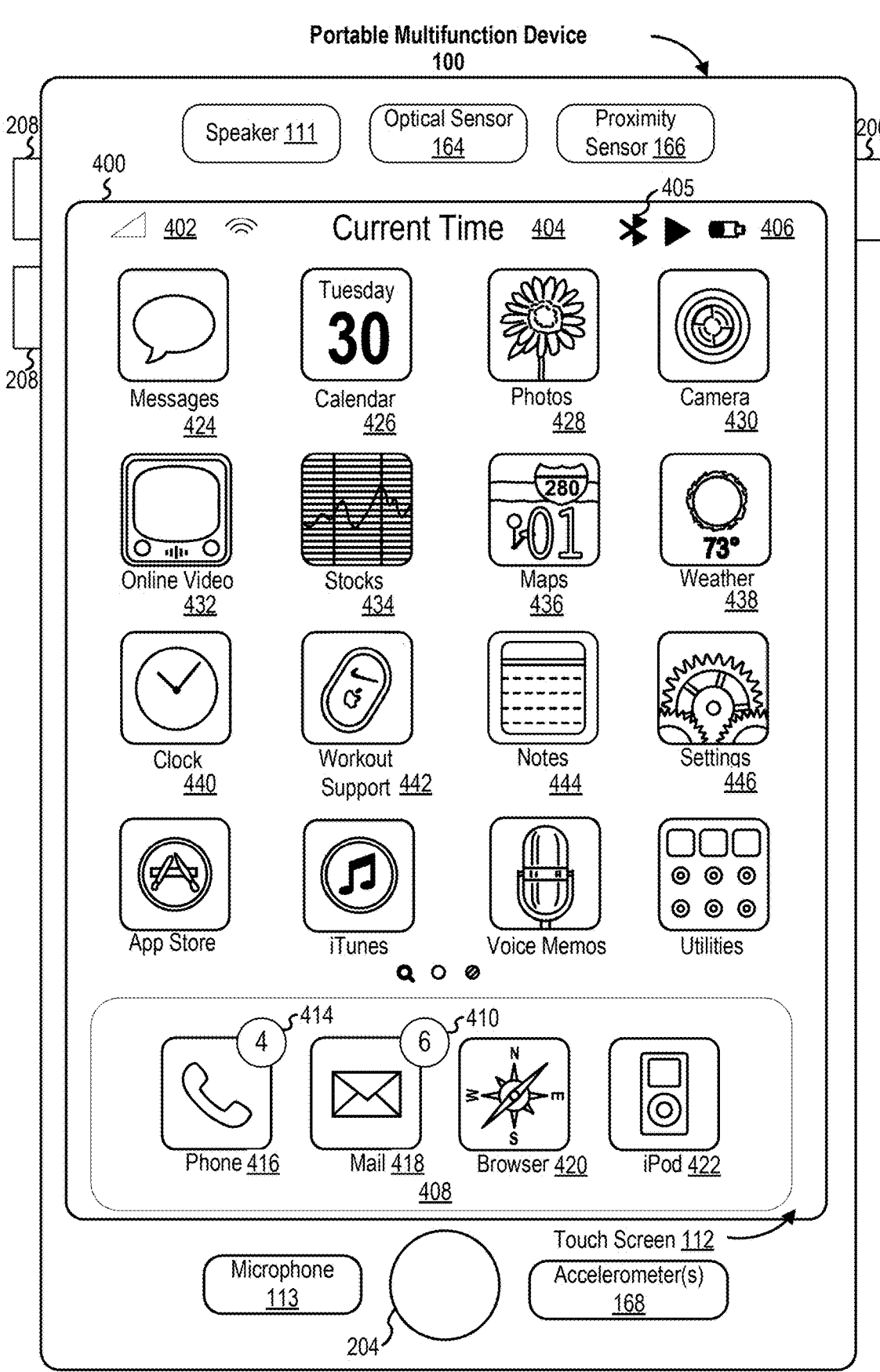
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
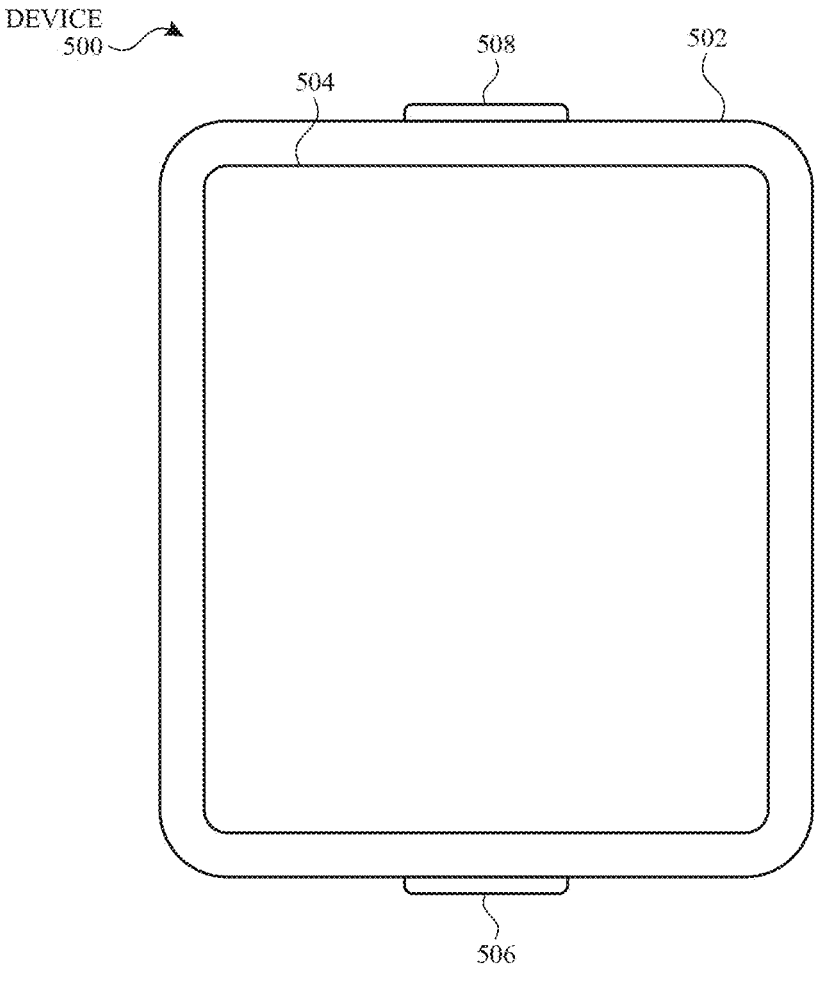
FIG. 5A illustrates a personal electronic device in accordance with some embodiments.
Figure 6A:
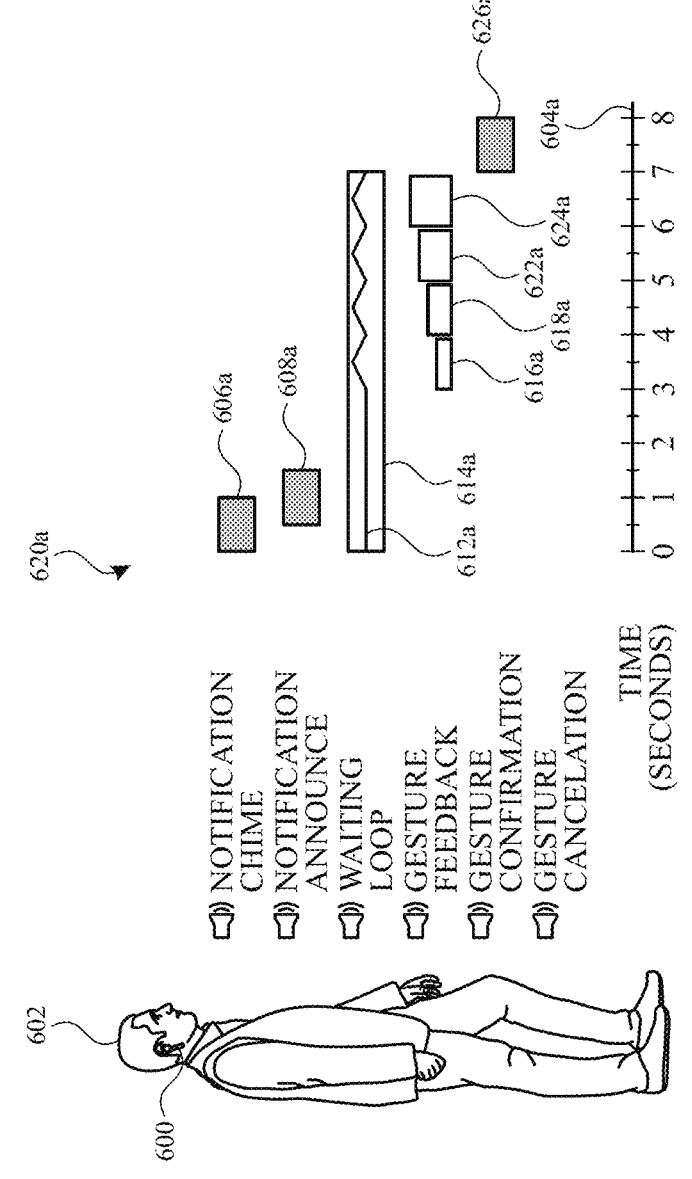
FIGS. 6A-6R illustrate example methods for detecting motion inputs to interact with audio notifications and providing audio feedback for detected motion gestures, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
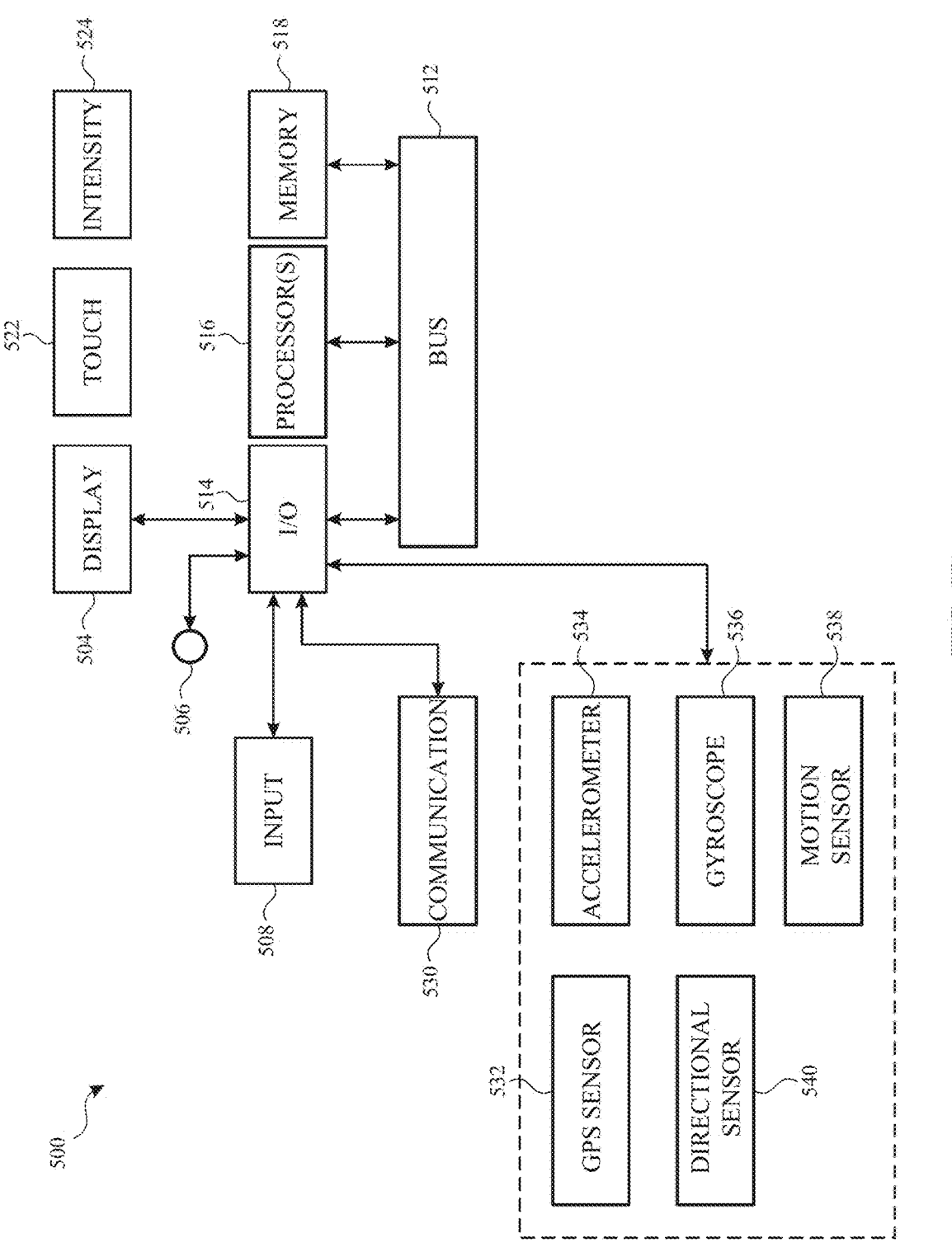
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6R illustrate exemplary methods for detecting motion inputs to interact with audio notifications and providing audio feedback for detected motion gestures, in accordance with some embodiments. The user interfaces in these figures are used to illustrate the processes described below, including the processes in FIG. 7 and FIG. 8.

In FIGS. 6A-6R, device 600 is a pair of wireless earbuds with integrated sensors (e.g., GPS sensor 532, accelerometer 534, directional sensor 540 (e.g., compass), gyroscope 536, motion sensor 538 described with respect to personal electronic device 500) for detecting motion (e.g., motion of the head of user 602) and with integrated speakers (e.g., speaker 111) for outputting audio to user 602. In some embodiments, device 600 is a head-mounted display device or other wearable device (e.g., a pair of earrings or over-ear headphones). In some embodiments, device 600 is connected (e.g., wirelessly (e.g., via Bluetooth) to a mobile computing device (e.g., a smartphone, smart watch, or laptop computer) and outputs audio content and notifications generated at the mobile computing device. In such embodiments, device 600 can operate as an input device (e.g., for motion, audio, and/or touch inputs) for the mobile computing device. In some embodiments, device 600 includes one or more features of devices 100, 300, and/or 500.

Figure 6B:
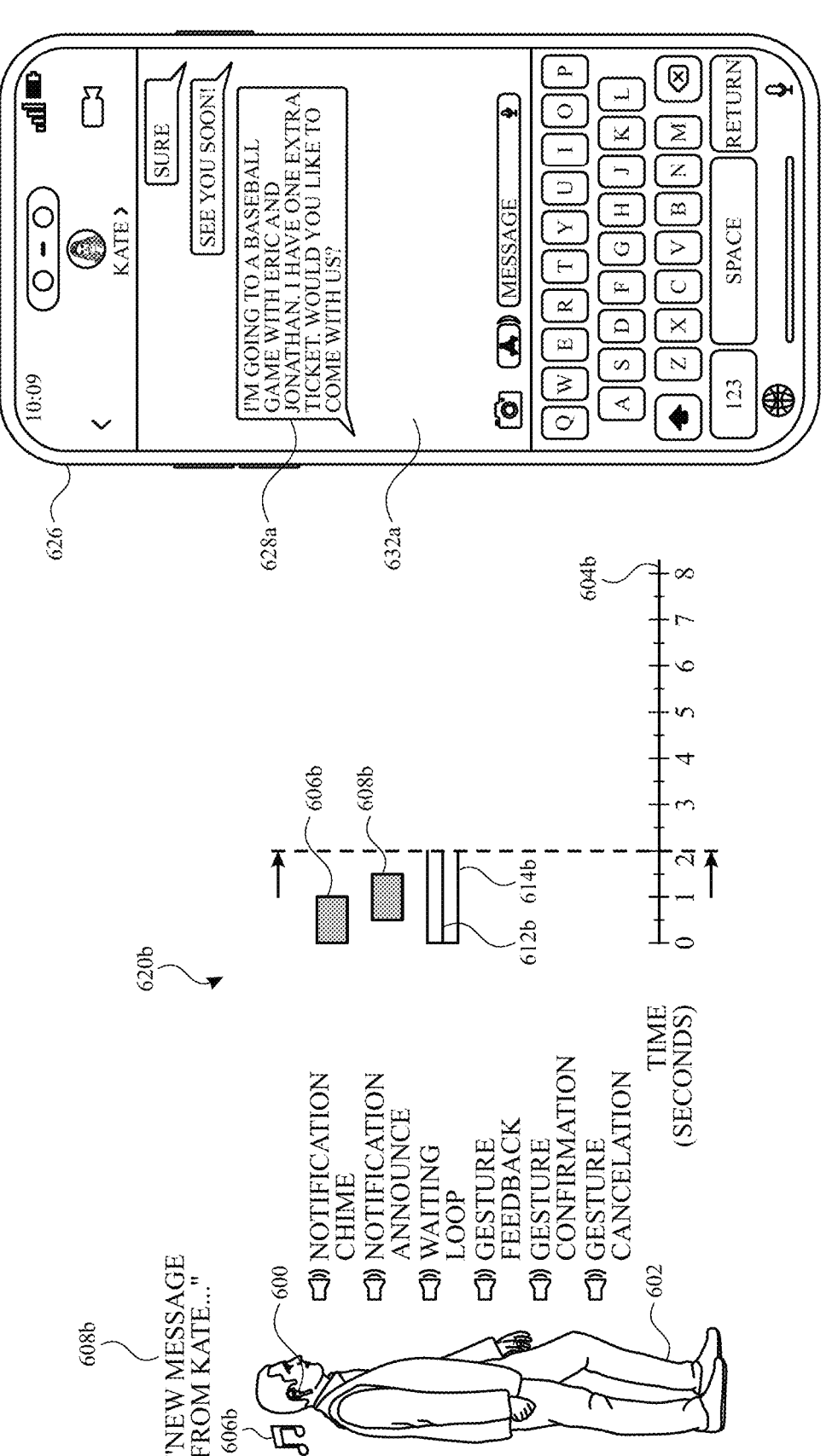
Figure 6I:
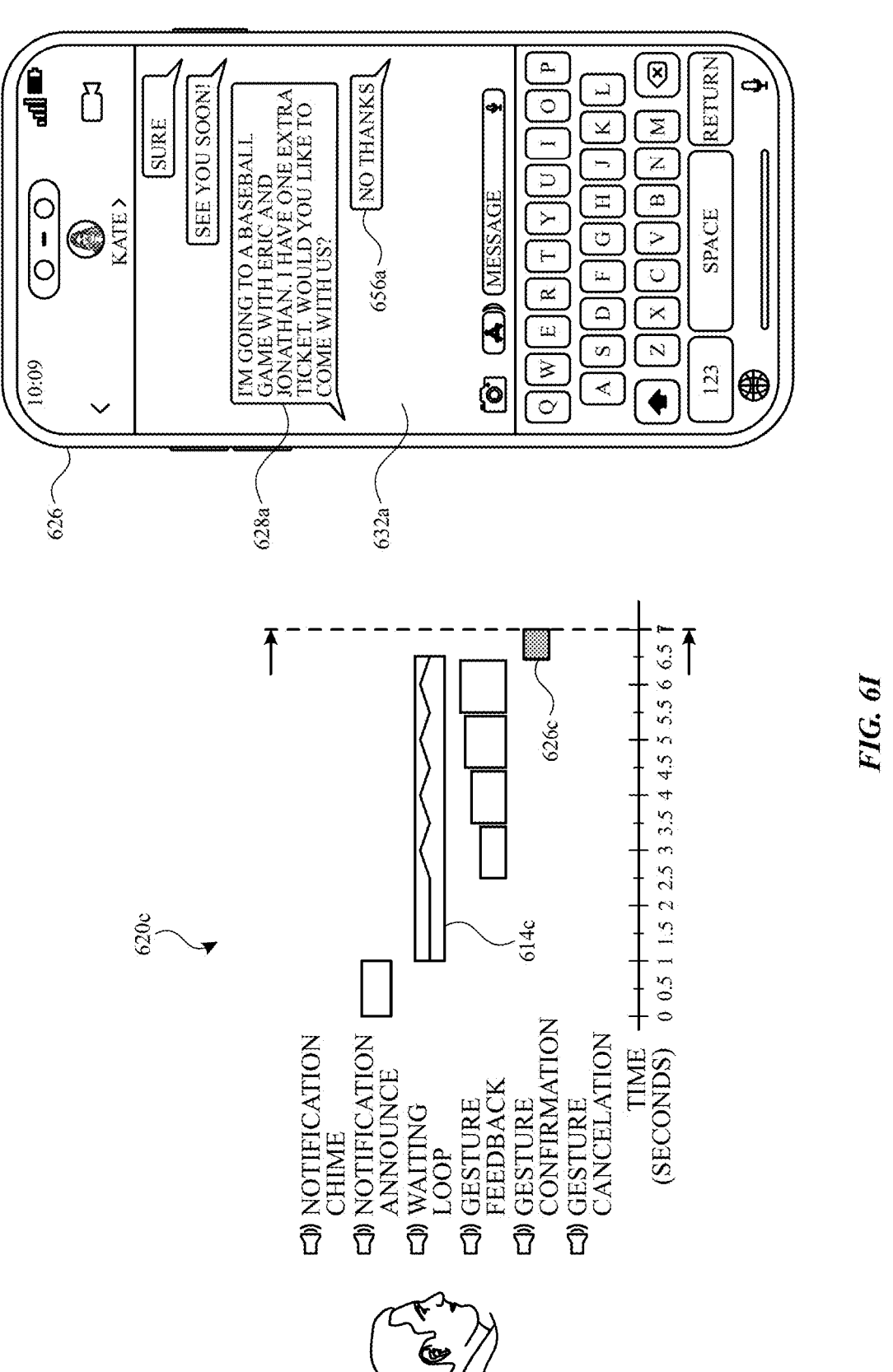
Figure 6L:
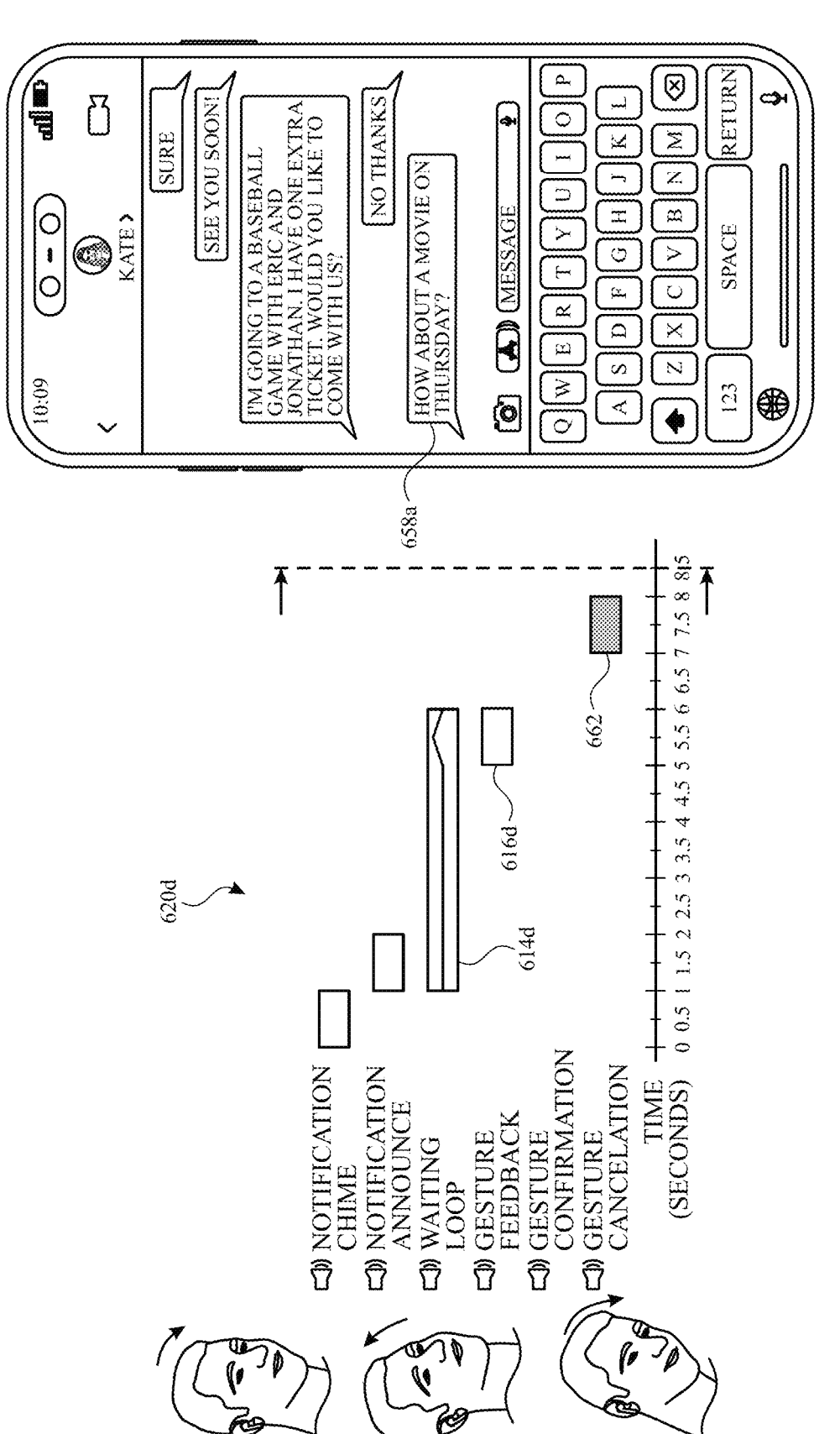
Figure 6M:
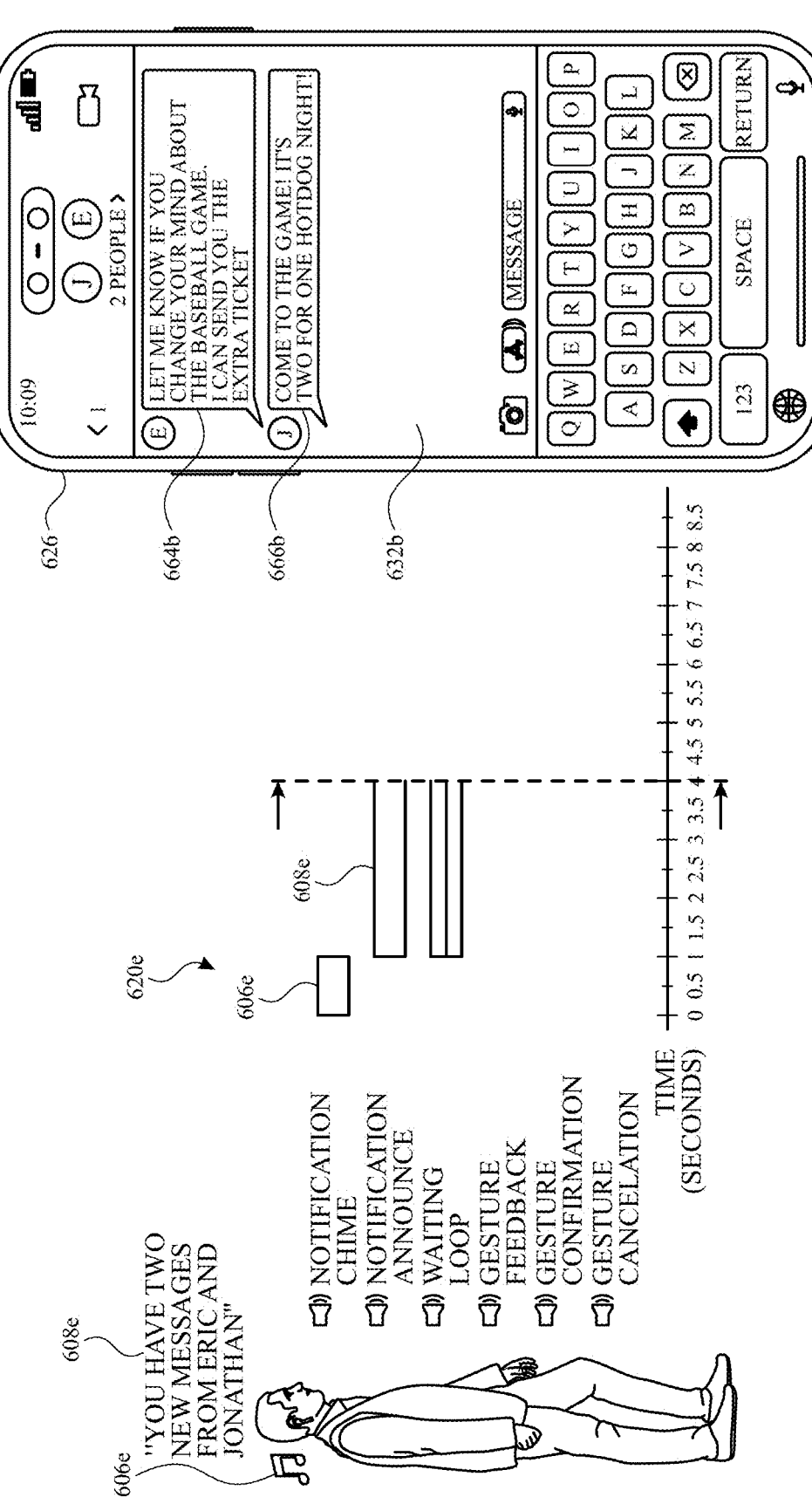
Figure 6N:
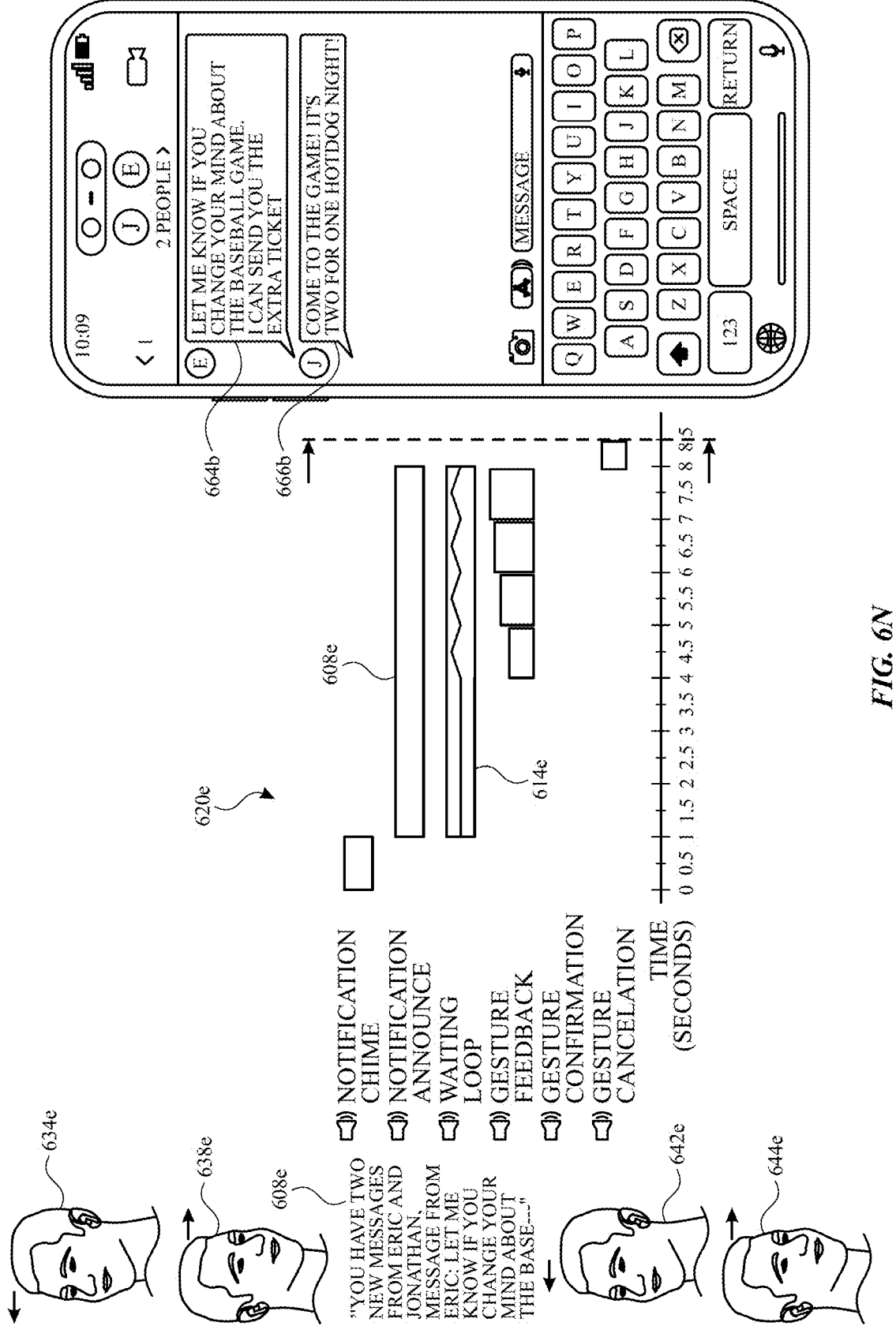
Figure 60:
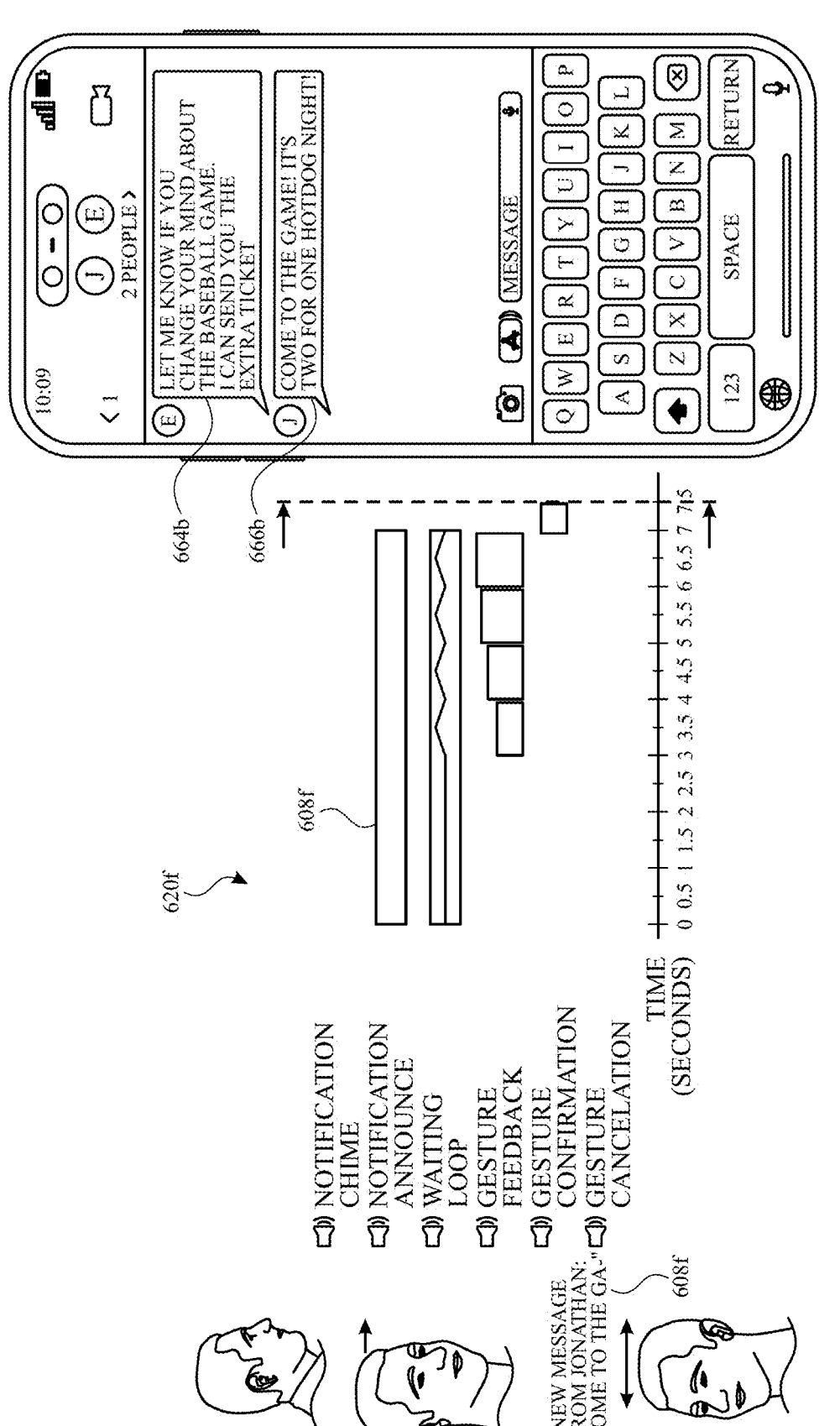
Figure 6P:
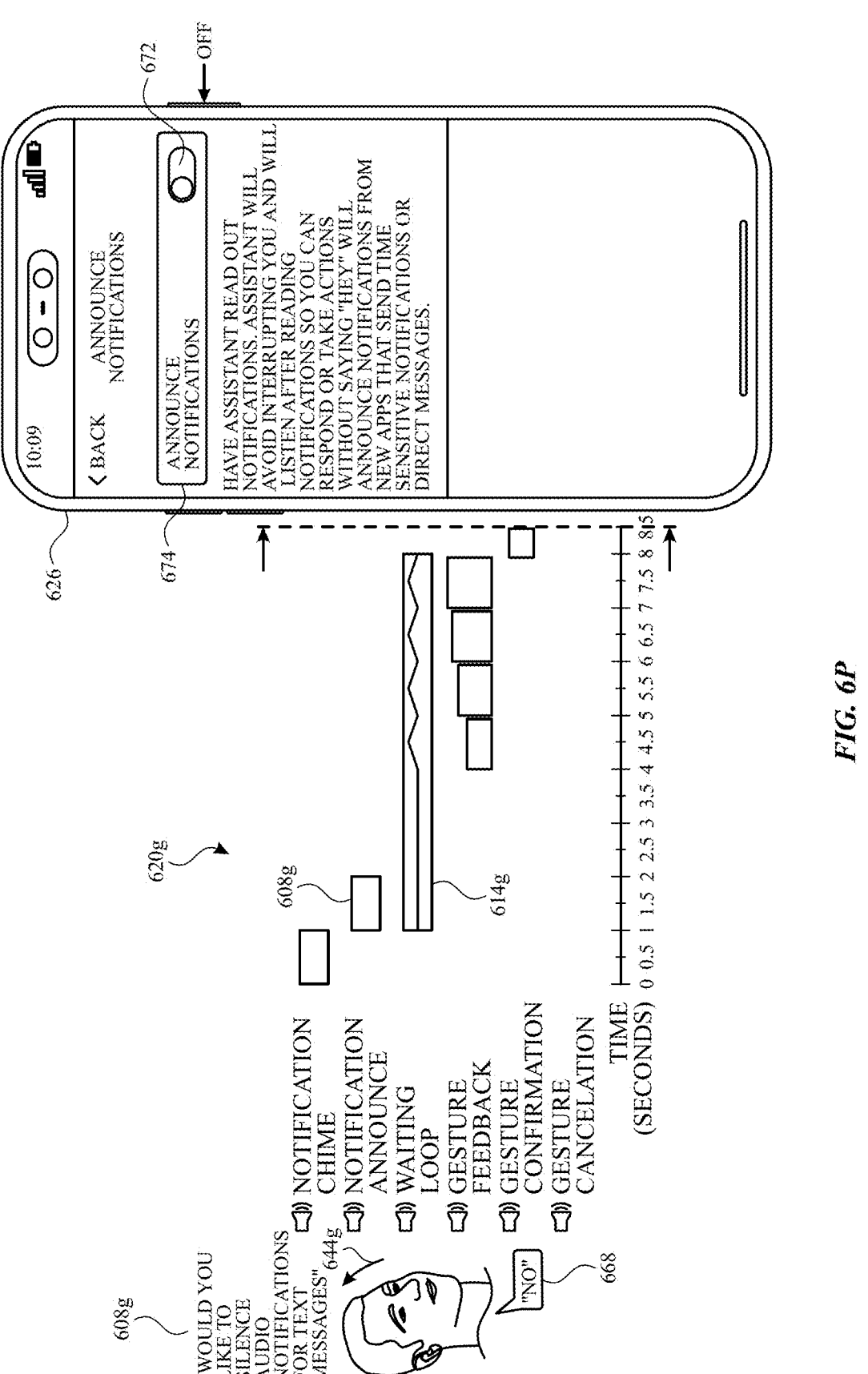
Figure 6Q:
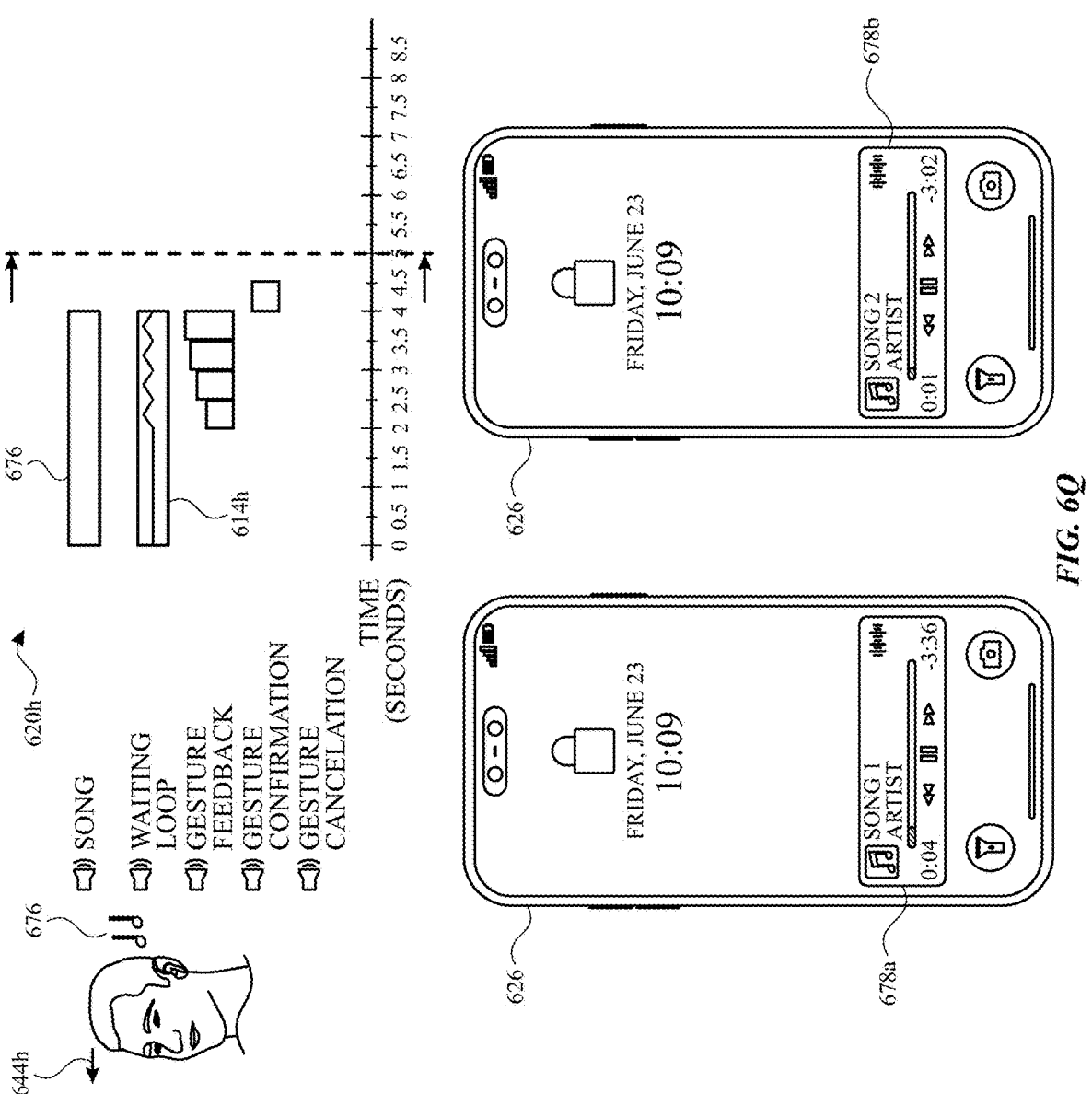
Figure 6R:
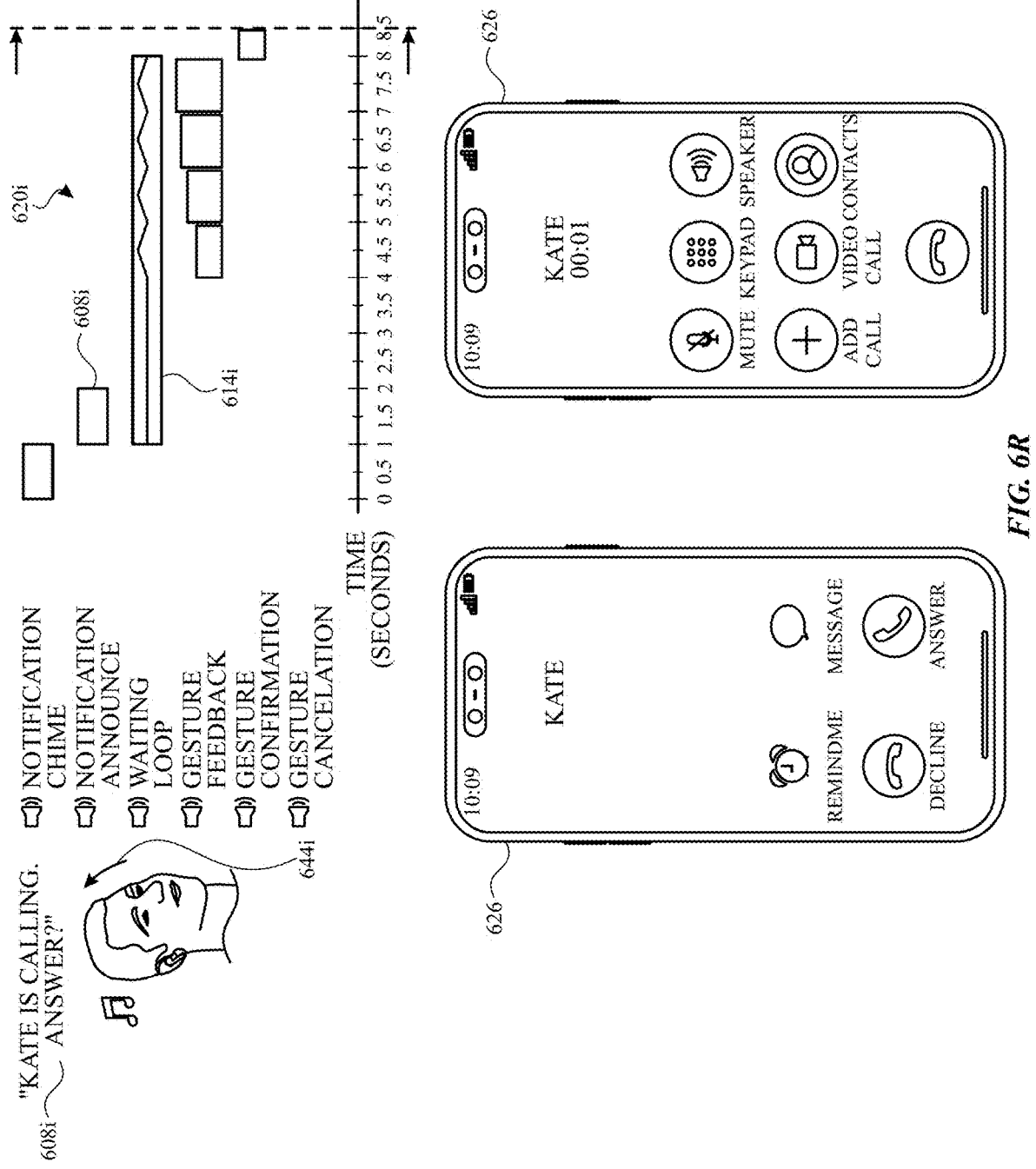

FIGS. 6A-6R additionally include graphs 620a-620i that depict a timeline of audio-related events (e.g., audio outputs) in various states (e.g., at various points in time). For example, in FIG. 6A, graph 620a illustrates a complete state of the audio-related events while graph 640b in FIG. 6B illustrates an initial state of the events.

In FIG. 6A user 602 is wearing device 600, which outputs audio in the ears of user 602. The audio that device 600 outputs is illustrated by various rows of rectangular bars, plotted along an axis for time, on graph 620a. Each bar represents a specific type of audio output event, a duration of each type of audio output event (e.g., length of the output of each audio output type), and a timing of each type of audio output event (e.g., the start of each audio output relative to the start of the graph). For example, graph 620a depicts various audio output events that are discussed in more detail below: notification chime 606a (e.g., as discussed at FIG. 6B); notification announcement 608a (e.g., as discussed at FIG. 6B); waiting loop tone 612a (e.g., as discussed at FIGS. 6B-6E); waiting loop 614a (e.g., as discussed at FIGS. 6B-6F, 6I, 6K, 6L-6P, and 6R); gesture feedback 616a, 618a, 622a, and 624a (e.g., as discussed at FIGS. 6C, 6D, 6G, 6H, and 6K); and gesture confirmation 626a (e.g., as discussed at FIGS. 6E, and 6I). Graph 620a additionally depicts a gesture cancelation row discussed in greater detail in FIG. 6L.

As described above with respect to FIG. 6A, graph 620a illustrates a timeline showing a complete state of the audio-related events (e.g., audio outputs) of varying types. FIGS. 6B-6R, described below, illustrate graphs 620b-620i, which depict similar timelines in various progression states (e.g., at various points in time). Additionally, graphs 620b-620i depict audio output events that are similar (if not the same) as the output events described with respect to graph 620a of FIG. 6A.

FIGS. 6B-6E illustrates graph 620b, which depicts an exemplary timeline of audio output events related to a message exchange between user 602 and Kate, a friend of user 602. In addition, FIGS. 6B-6E illustrate device 626 (e.g., a smart phone in communication with device 600 and/or associated with the user 602), which displays, on user interface 632a (e.g., a text message interface with contact "Kate"), incoming message 628a from Kate. In some embodiments, incoming message 628a is initially received at device 626 (e.g., before transmitting information to device 600 for issuing a notification).

FIG. 6B provides an illustrative and non-limiting example of a timeline for an initial state of audio output events. For example, FIG. 6B depicts an initial stage of audio output events (e.g., from time 0 to 4 seconds) related to the message exchange between Kate and user 602 in which Kate asks a question to arrange a meetup for a baseball game. As depicted in graph 620b of FIG. 6B, device 600 outputs notification chime 606b (e.g., a musical chime for a new message), shown at the 0 second mark on time axis 604b of graph 620b, followed by notification announcement 608b for incoming message 628a. In this example, notification announcement 608b is an announcement that a new message from Kate (e.g., "New message from Kate; read it?") is available to be read aloud (e.g., announced by a virtual assistant associated with device 600). In some embodiments, device 600 outputs notification announcement 606a in lieu of announcing incoming message 628 in its entirety because incoming message 628a is above a threshold length (e.g., exceeds a maximum number of characters and/or words).

Further, at FIG. 6B, device 600 simultaneously outputs, along with notification chime 606b, the start of waiting loop tone 612b (e.g., a low-pitched humming tone), which indicates a period of time (e.g., the full duration of waiting loop 614b, which is partially shown in FIG. 6B) that device 600 is monitoring for motion inputs (e.g., detecting movements of the head of user 602 that is interpreted by device 600 as a request to interact with incoming message 628a and/or notification announcement 606b).

At FIG. 6C, after outputting notification announcement 606b, device 600 detects starting motion 634a of a motion gesture from user 602. In this example, starting motion 634a is a starting movement of a head nod gesture (e.g., a first head nod movement) with which user 602 is attempting to affirmatively respond to notification announcement 606b and requesting device 600 to announce the entirety of message 628a.

At FIG. 6C, in response to detecting starting motion 634a, and while waiting loop period 614b is ongoing, device 600 outputs gesture feedback 616b, which provides a discrete sound (e.g., a musical note and/or a "ding") indicating a starting progression status of the motion gesture. Further, FIG. 6C provides an illustrative and non-limiting example of discrete sounds indicating a starting status of the motion gesture. In this example, the discrete sound in gesture feedback 616b has a low volume (e.g., in a volume range from 1-30 decibels, 5-25 decibels, 10-40 decibels, or in another reasonable volume range) that corresponds to an initial confidence level (e.g., with 1, 5, or 10 decibels, or another reasonable minimum decibel level in a volume range, that corresponds to the lowest level of confidence and 25, 30, or 40 decibels, or another reasonable maximum decibel level in a volume range, that corresponds to the highest level of confidence) that starting motion 634a is a motion that is progressing toward the completion of a head nod gesture.

Further, at FIG. 6C, device 600 outputs modification tone 636b that modifies (e.g., modulates the frequency (e.g., pitch)) the waiting loop tone 612b. Further, device 600 outputs modification tone 636b synchronously (e.g., both at the 5 second mark) with the output of gesture feedback 616b to further indicate a starting progression status of the motion gesture (e.g., a starting status of the head nod gesture progressing towards completion).

At FIG. 6D, device 600 detects continuing motions 638b, 642b, and 644b (e.g., a series of continuing head nod motions) from user 602. In response to continuing motions 638*b*, 642*b*, and 644*b*, and while waiting loop period 614*b* is ongoing, device 600 outputs gesture feedback 618*b*, 622*b*, and 624*b*, respectively, which are a series of discrete sounds with rising volume levels (e.g., rising decibels, each higher than the next) indicating an increasing level of confidence that the detected head motion is continuing to progress towards a completed head nod gesture. Additionally, gesture feedback 618*b*, 622*b*, and 624*b* are output synchronously with modification tones 646*b*, 648*b*, and 65*b*, which further modify waiting loop tone 612*b* and indicate that the detected head motion is continuing to progress towards a completed head nod gesture. In some embodiments, the discrete sounds of gesture feedback 616*b*, 618*b*, 622*b*, and 624*b* are high pitched sounds (e.g., high pitched musical notes or "dings") of increasing volume because they correspond to a progression of a head nod gesture rather than a head shake gesture.

Further, as shown in FIG. 6D, gesture feedback 644*b* is the last discrete sound in the series of discrete sounds of rising volume level (e.g., a decibel level of 25, 30, 40, or another reasonable maximum decibel level in a volume range) and indicates a completion status of the progression of the motion gesture (e.g., corresponds to a highest level of confidence that the detected motion is a head nod gesture).

At FIG. 6E, device 600 determines that the head nod gesture was completed within the time period of waiting loop 614*b*, and in response, outputs gesture confirmation 626*b* (e.g., a musical note or ding), confirming for user 602 that the head nod gesture was successful. In some embodiments, gesture confirmation 626*b* is a high-pitched sound (e.g., high pitched musical note or "ding") because it corresponds to a completion of a head nod gesture rather than a head shake gesture.

Further, at FIG. 6E, in response to detecting the completed head nod gesture (e.g., after detecting motions 634*b*, 638*b*, 642*b*, and 644*b*) within the threshold time period of waiting loop 614*b*, device 600 outputs the message in its entirety, represented by message output 654 (e.g., "I'm going to a baseball game with Eric and Jonathan. I have one extra ticket. Would you like to come with us?").

FIGS. 6F-6I illustrate graph 620*c*, which depicts an exemplary timeline of audio output events related to user 602 providing a response to the announced message from Kate.

At FIG. 6F, device 600 determines that message output 654 (as shown in FIG. 6E) contains a yes or no question, and in response, outputs notification announcement 608*c*. In this example, notification announcement 608*c* is an inquiry (e.g., by a virtual assistant associated with device 600) asking if the user would like to send a message in response to message output 654. After outputting notification announcement 608*c*, device 600 initiates a time period for response, represented by waiting loop 614*c*, in which device 600 is monitoring for motion inputs.

FIG. 6G and FIG. 6H illustrate device 600 detecting a head shake gesture by user 602 for responding "No" to Kate's message. For example, in FIG. 6G and FIG. 6H, device 600 detects a sequence of head motions (e.g., starting motion 634*c*, and continuing motions 638*c*, 642*c*, and 644*c*) from user 602 for a head shake gesture, similar to the sequence of head motions for a head nod gesture illustrated in FIG. 6C and FIG. 6D. Further, in FIG. 6G and FIG. 6H, device 600 provides gesture feedback (e.g., 616*c*, 618*c*, 622*c*, and 624*c*) similar to the gesture feedback described with respect to FIG. 6C and FIG. 6D. However, in this example, the gesture feedback is series of low-pitched discrete sounds (e.g., low-pitched musical notes and/or "dings") with progressively higher volumes (e.g., indicating increased confidence of the head shake gesture) because they correspond to a progression of a head shake gesture rather than a head nod gesture.

At FIG. 6I, device 600 determines that the head shake gesture was completed within the time period of waiting loop 614*c* and, in response, outputs gesture confirmation 626*c* confirming for user 602 that the head shake gesture was successfully detected. In some embodiments, gesture confirmation 626*c* is a low-pitched sound (e.g., low-pitched musical note or "ding") because it corresponds to a completion of a head shake gesture rather than a head nod gesture.

Further, at FIG. 6I, in response to detecting the completed head shake gesture (e.g., after detecting motions 634*c*, 638*c*, 642*c*, and 644*c*) within the threshold time period of waiting loop 614*c*, device 600 causes device 626 to send message 656*a* that is a negative response to Kate's invitation. For example, user interface 632*b* on device 626 displays message 656*a* as a "sent" text message to Kate (e.g., transmitted to Kate's smart phone), which recites "No thanks".

FIGS. 6J-6L illustrate graph 620*d*, which depicts an exemplary timeline of audio output events related to user 602 receiving a follow-up message from Kate and device 600 detecting motions after a threshold time period for detecting motion has ended, which does not initiate sending a response to Kate's message.

As shown in FIG. 6J, device 626 receives follow-up message 658*a* asking user 602 "How about a movie on Thursday?" In response to follow-up message 658*a* being received (e.g., at device 600 and/or device 626), device 600 outputs notification chime 606*d* followed by notification announcement 608*d*, which, similar to notification announcement 608*c*, provides an inquiry (e.g., by a virtual assistant associated with device 600) asking if user 602 would like to send a message in response. Further, after outputting notification announcement 606*d*, device 600 initiates a time period for response, represented by waiting loop 614*d*, in which device 600 is monitoring for motion inputs. FIGS. 6J-6L provide an illustrative and non-limiting example of a time period for responding an audio notification. In the example of FIGS. 6J-6L, device 600 monitors for motions that are potentially responsive to notification announcement 608*d* for a total period of 5 seconds (e.g., the maximum duration of the waiting loop in this example).

At FIG. 6K, after 5 seconds have elapsed from the start of waiting loop 614*d*, device 600 detects starting motion 634*d* from user 602. In this example, user 602 did not intend to respond to Kate, thus starting motion 634*d* represents a coincidental head motion by user 602 (e.g., the user provides an accidental head nod motion during a physical activity such as a run or jog) that device 600 determines to be a first motion in a series of motions progressing toward a head nod gesture. Further, in response to detecting starting motion 634*d* device 600 outputs gesture feedback 616*d*. Similar to gesture 616*b*, as described with respect to FIG. 6C, gesture feedback 616*d* is a discrete sound with a low volume that corresponds to an initial confidence level that starting motion 634*d* is a head nod motion by user 602 that is progressing toward the completion of a head nod gesture.

At FIG. 6L, the time period for reply (e.g., 5 seconds) expires, as represented by the end of waiting loop 614 at the 6 second mark. After the end of waiting loop 614*d*, user 602 makes another series of coincidental head nod motions (e.g., accidental head nod motions). Device 600 detects this series of head nod motions but does not process the motion as a completed head nod gesture (e.g., ignores the accidental head nod motions) because the threshold time period of waiting loop 614*d* in which device 600 is monitoring for motion inputs has already expired. In other words, because the motion is detected outside of waiting loop 614*d*, there is no increase in confidence that the head motion is progressing towards completion of an intentional head nod gesture by user 602. As a result, device 600 does not send a reply to follow-up message 658*a* from Kate and outputs gesture cancellation 662. Gesture cancellation 662 is a sound (e.g., musical note or "ding" different from that of gesture confirmation 626*b*) indicating that the head nod gesture has been cancelled.

FIG. 6M and FIG. 6N illustrate graph 620*e* and FIG. 6O illustrates graph 620*f*. Graphs 620*e* and 620*f* depict respective exemplary timelines of audio output events related to user 602 interrupting the announcement of messages received in a group-message chat between user 602, Eric, and Jonathan. FIGS. 6M-6O also illustrated device 626, which displays, on user interface 632*b* (e.g., a text message interface for a group-chat with contacts "Eric" and "Jonathan"), message 664*b* from Eric and 666*b* from Jonathan.

As shown in FIG. 6M, device 626 receives two consecutive messages from Eric and Jonathan, messages 664*a* and 666*a*, respectively. Further, FIG. 6M provides an illustrative and non-limiting example of a threshold time period for responding to an audio notification. For example, as shown in FIG. 6M in response to messages 664*b* and 666*b* being received consecutively (e.g., received within a threshold time period (e.g., 3 seconds, 4 seconds, 5 seconds, or another reasonable threshold time period)) at device 626, device 600 outputs notification chime 606*e* followed by notification announcement 608*e*. In this example, notification announcement 608*e* begins with an announcement that user 602 has two messages in a queue of messages to be announced consecutively (e.g., "You have two new messages from Eric and Jonathan").

In FIG. 6N, device 600 continues the output of notification announcement 608*e* in which a beginning portion of the first message in the queue (e.g., message 664*b* from Eric) is announced. While the output of notification announcement 608*e* is ongoing, device 600 detects a complete sequence of head motions (e.g., starting motion 634*e*, and continuing motions 638*e*, 642*e*, and 644*e*) from user 602 for a head shake gesture, similar to the sequence of head motions for a head shake gesture illustrated in FIG. 6G and FIG. 6H.

Further, at FIG. 6N, device 600 determines that the head shake gesture was completed within the time period of waiting loop 614*e* (e.g., a period of time that matches the duration of time announcement 608*e* is being output) and, in response, interrupts the ongoing output of notification announcement 608*e* and skips to an announcement of the next message in the queue (e.g., message 666*b* from Jonathan).

FIG. 6O depicts a similar exemplary timeline of audio output events as shown in FIG. 6N. In this example, notification announcement 608*f* is an announcement of a beginning portion of the second message in the queue (e.g., message 666*a* from Jonathan). Again, device 600 detects a complete sequence of head motions for a head shake gesture and, in response, device 600 interrupts the ongoing output of notification announcement 608*f*, thus concluding the announcement of the messages in the queue.

FIG. 6P illustrates graph 620*g*, which depicts a completed exemplary timeline of audio output events related to a request (e.g., by a virtual assistant associated with device 600) to change an operating mode of device 600. For example, in response to detecting multiple consecutive head shake gestures for skipping audio notifications (as shown in FIG. 6M and FIG. 6O), device 600 outputs notification announcement 608*g*. Notification announcement 608*g* is a prompt to silence audio notifications for text messages.

Further, in FIG. 6P, device 600 detects completed head nod gesture 644*g* (e.g., a completed sequence of head motions for a head nod gesture) within a threshold time period (e.g., waiting loop 614*g*) similar to those described with respect to FIGS. 6C-6D. However, device 600 also detects audio input 668 from user 602 during the same threshold time period. In this example, audio input 668 is a negative response (e.g., "No") to the prompt, which conflicts with completed head nod gesture 644*g* that represents an intention by user 602 to respond affirmatively (e.g., "Yes") to the prompt. As a result of detecting conflicting inputs during the same threshold time period, device 600 identifies one of the inputs as the intended input by user 602, based on a set of conflict criteria. In this example, device 600 identifies that completed head nod gesture 644*g* reflects the intended input by user 602 because the beginning of completed head nod gesture 644*g* (e.g., a first head motion in a completed sequence of head nod motions) was detected before audio input 668. As a result, device 600 changes the status of an audio notification mode in which future audio notifications for text messages are silenced. In some embodiments, in response to the completed head nod gesture, device 600 transmits a signal to device 626 which causes device 626 to change a setting (e.g., via toggle 672 on announce notifications interface 674) for "Announce Notifications" from an "ON" position to an "OFF" position.

FIG. 6Q illustrates graph 620*h*, which depicts a completed exemplary timeline of audio output events related to a motion input for changing media playback while user 602 is listening to music. For example, device 600 outputs song 676, which is a beginning portion of a media file (e.g., "Song 1") currently being played. In some embodiments, song 676 is a media file being played on device 626 in which the associated audio is transmitted to device 600. In some embodiments, as illustrated in FIG. 6Q, the playback status for song 676 (e.g., "Song 1") is displayed on media playback interface 678*a* on device 626.

Further, FIG. 6Q provides an illustrative and non-limiting example of a time period for changing the playback status of a media file. For example, as shown in FIG. 6Q, after outputting the beginning portion of Song 1 and before the playback status of Song 1 has reached the 5 second mark, device 600 detects completed head shake gesture 644*h* (e.g., a completed sequence of head motions for a head shake gesture) within a threshold time period of waiting loop 614*h* (e.g., 5 seconds) similar to those described with respect to FIGS. 6G-6H. In response to detecting completed head shake gesture 644*h*, device 600 interrupts the media playback of Song 1, and skips to a second song (e.g., "Song 2" as depicted in media playback interface 678*b*).

FIG. 6R illustrates graph 620*i*, which depicts a completed exemplary timeline of audio output events related to joining an incoming real-time communication (e.g., an incoming phone call). For example, device 600 outputs notification announcement 608*i*, which is a request (e.g., by a virtual assistant associated with device 600) to answer an incoming phone call from Kate (e.g., "Kate is calling. Answer?"). In some embodiments, the incoming phone call is being received at device 626 and the related audio associated with the incoming phone call (e.g., the request to join, the ring tone of the incoming phone call, and/or the audio of the live communication session after joining) is transmitted to device 600.

Further, in FIG. 6R, after outputting notification announcement 608i, device 600 detects completed head nod gesture 644i within a threshold time period of waiting loop 614i. In response to detecting completed head nod gesture 644i, device 600 joins the incoming phone call to initiate a real-time communication session between user 602 and Kate. In some embodiments, had device 600 detected a negative response (e.g., a completed head shake gesture) during the threshold time period of waiting loop 644i, the call would have been declined.

FIG. 7 is a flow diagram illustrating a method for detecting motion inputs to interact with audio notifications using one or more audio output devices in accordance with some embodiments. Method 700 is performed at a one or more audio output devices (e.g., 600 (e.g., speakers, headphones, and/or earbuds)). Some operations in method 700 are, optionally, combined, the orders of some operations are, optionally, changed, and some operations are, optionally, omitted.

In some embodiments, the one or more audio output devices (e.g., 600) are integrated into a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for interacting with audio notifications. The method reduces the cognitive burden on a user for interacting with audio notifications, thereby creating a more efficient human-machine interface. For battery-operated computing devices, enabling a user to interact with audio notifications faster and more efficiently conserves power and increases the time between battery charges.

The one or more audio output devices (e.g., 600) (e.g., speakers, headphones, and/or earbuds) (in some embodiments, the one or more audio output devices are in communication with an external electronic device and/or computer system (e.g., a smart phone, a smart watch, a tablet computer, and/or a personal computer)) output (702) a first audio notification (e.g., an audio tone, a verbal notification, and/or an audio notification announced by a virtual assistant associated with the one or more audio output devices) (in some embodiments, the first audio notification is a first sub-portion of an ongoing audio notification) (in some embodiments, the first audio notification is generated by an external electronic device and/or computer system and transmitted to the one or more audio output devices for output).

Subsequent to outputting the first audio notification (e.g., 608a, 608b, 608c, 608d, 606e, 606f, 606g, 606h, and/or 606i) (in some embodiments, subsequent to outputting at least the starting portion of the first audio notification) (in some embodiments, detection of the motion input occurs subsequent to outputting the entirety of the first audio notification), a motion input (e.g., a motion input corresponding to one or more head rotations along a lateral axis (e.g., pitch rotation) indicative of a head nod gesture or one or more head rotation along a vertical axis (e.g., yaw rotation) indicative of a head shake gesture), based on one or more sensor measurements from one or more sensors (e.g., one or more accelerometers, gyroscopes, magnetometers, inertial measurement units, optical sensors and/or other sensors that are capable of detecting movement of the one or more audio output devices in space) in the one or more audio output devices, is detected (704) (e.g., based on processing of the sensor measurements at the one or more audio output devices and/or based on processing of the sensor measurements at a companion device such as a smartphone, smartwatch, tablet, wearable computing device, laptop computer, and/or desktop computer).

In response to the detected motion input and in accordance with a determination that a first set of criteria are met, wherein the first set of criteria includes a first criterion that is met when the motion input is detected within a threshold time period (e.g., a waiting loop (e.g., 614a, 614b, 614c, 614d, 614e, 614f, 614g, 614h, and/or 614i) and/or a predetermined time period (e.g., 0.05, 0.1, 0.2, 0.3, 0.4, 0.5, 1, 2, 4, or 8 seconds)) of outputting the first audio notification (e.g., within a predetermined time period from the start, a mid-point, or an end of the first audio notification), the one or more audio output devices cause (706) performance (in some embodiments, causing performance of a first operation includes transmitting a command and/or instruction to an external device (e.g., a companion device) to cause that device to perform an operation associated with the first audio notification) of a first operation (e.g., an audio output operation (e.g., playback of a message) that can be performed, via the one or more audio output devices, based on a head gesture (e.g., head nod or head shake)) associated with the first audio notification (e.g., as illustrated in FIGS. 6E, 6I, 6N, 6O, 6P, 6Q, and 6R). In some embodiments, the first set of criteria includes a second criterion that is met when the first audio notification is an actionable audio notification (e.g., a notification associated with an operation that can be performed based on the detection of a head motion gesture) (e.g., the second criterion is not met when the first audio notification is a non-actionable audio notification (e.g., a notification that is not associated with an operation that can be performed based on the detection of a head motion gesture))). In some embodiments, in accordance with a determination that the first notification is an actionable audio notification of a first type (e.g., a notification announcement that only has one associated operation type (e.g., skip/interrupt the announcement) corresponding to one type of motion input (e.g., head shake gesture), the first set of criteria includes a third criterion that is met when the detected motion input is of a first type (e.g., the third criterion is not met when the detected motion input is of a second type (e.g., head nod gesture)) (e.g., as illustrated in FIGS. 6N and 6O). Causing performance of the first operation associated with the first audio notification in response to the detected motion input, provides a user with greater control over the one or more audio output devices by allowing the user to perform operations associated with incoming audio notifications without the use of a visually displayed UI and without requiring the user to provide a responsive voice command. Further, causing performance of the first operation in accordance with a determination that a first set of criteria are met, wherein the first set of criteria includes a first criterion that is met when the motion input is detected within the threshold time period of outputting the first audio notification, facilitates a precise operating window for motion inputs, thereby providing additional control over the one or more audio output devices by increasing the accuracy of correctly associating detected motion inputs with an operation associated with the first audio notification and reduces false positives corresponding to user motion that occurs outside the threshold time period. Providing additional control of the one or more audio output devices enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to the detection of the motion input and in accordance with a determination that the first set of criteria are not met, the one or more audio output devices (e.g., 600) forgo causing performance of the first operation associated with the first audio notification (e.g., as illustrated in FIG. 6L). In some embodiments, in response to the detection of the motion input and in accordance with a determination that the first set of criteria are not met, the one or more audio output devices outputs a second audio notification indicating that the first operation has been cancelled (e.g., a cancellation tone (e.g., 662)). Forgoing causing performance of the first operation in accordance with a determination that the first set of criteria are not met (e.g., the motion input is not detected within a threshold time period of outputting the first audio notification) provides additional control over the one or more audio output devices by further reducing user mistake. For example, requiring the motion input to be detected within a time period following the first audio notification reduces false positive results for coincidental motion by the user that was not intended to correspond to a predefined motion input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, causing performance of the first operation associated with the first audio notification (in some embodiments, the first audio notification (e.g., a prompt to announce a message) has multiple associated operations of different types (e.g., announce message and dismiss announcement of message) that are actionable) includes: in accordance with a determination that the detected motion input is a motion input of a first type (e.g., head nod gesture) (e.g., 634*b*, 638*b*, 642*b*, 644*b*, 634*b*, 644*g*, and/or 644*i*) (e.g., as illustrated in FIGS. 6C, 6D, 6P, and 6R), causing performance of an operation of a first type (e.g., announce message) associated with the first audio notification; and in accordance with a determination that the detected motion input is a motion input of a second type (e.g., head shake gesture) (e.g., 634*c*, 638*c*, 642*c*, 644*c*, 634*e*, 638*e*, 643*e*, 644*e*, and/or 644*h*) (e.g., as illustrated in FIGS. 6G, 6H, 6N, and 6Q) that is different from the motion input of the first type, causing performance of an operation of a second type (dismiss announcement of message), different from the first type, associated with the first audio notification. Causing performance of the operation of the first type in accordance with a determination that the detected motion input is a motion input of a first type, and causing performance of the operation of the second type, different from the first type, in accordance with a determination that the detected motion input is a motion input of a second type provides the user with control over a larger range of operations associated with the first audio notification without the use of a visually displayed UI and without requiring the user to provide a responsive voice command. Doing so enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first audio notification includes an actionable prompt (e.g., 608*b*, 608*c*, 608*d*, 608*e*, 608*f*, and 608*g*) (e.g., a query that can be responded to via an operation corresponding to the detection of a head motion gesture (e.g., a query asking whether the user of the one or more audio output devices would like to respond to a received message from an external device)); and the motion input of the first type (e.g., a head nod gesture) corresponds to an affirmative response to the actionable prompt (a head nod gesture causes performance of a "Yes" response being sent to the external device in response to the prompt) (e.g., as illustrated in FIGS. 6C, 6D, 6P, and 6R). Causing performance of the operation in response to an affirmative response to an actionable prompt provides the user with control over a larger range of operations associated with the first audio notification without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first audio notification includes an actionable prompt (e.g., 608*b*, 608*c*, 608*d*, 608*e*, 608*f*, and/or 608*g*) (e.g., a query that can be responded to via an operation corresponding to the detection of a head motion gesture (e.g., a query asking whether the user of the one or more audio output devices would like to respond to a received message from an external device)); and the motion input of the second type (e.g., a head shake gesture) corresponds to a negative response to the actionable prompt (a head shake gesture causes performance of a "No" message sent to the external device in response to the actionable prompt) (e.g., as illustrated in FIGS. 6G, 6H, 6N, and 6Q). Causing performance of the operation in response to an affirmative response to an actionable prompt provides the user with control over a larger range of operations associated with the first audio notification without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first audio notification is a first sub-portion (e.g., a first portion of a full message (e.g., 644*b*) being announced) of a first ongoing audio notification (e.g., 608e) (e.g., being output by the one or more audio devices); the motion input (e.g., 634e, 638e, 642e, and/or 644e) is detected during (e.g., while the full message is still being announced) the output of the first ongoing audio notification; and causing performance of the first operation includes interrupting (e.g., pausing and/or stopping) the output of the first ongoing audio notification (e.g., ceasing output of the first ongoing audio notification without outputting a second sub-portion of the first ongoing audio notification). In some embodiments, performance of the first operation is caused in accordance with a determination that the motion input is a no gesture (e.g., a head shake gesture) (e.g., as illustrated in FIG. 6M). Causing performance of the first operation for interrupting the output of the ongoing audio notification, allows the user to quickly and efficiently filter the through incoming notifications by providing the user with a mechanism for interrupting and/or skipping to a next notification based on the detected motion input. This added efficiency increases the usability of the device by allowing the user to avoid unwanted audio notifications and skip to important audio notifications without having to independently view the visual representations of incoming audio notifications on a UI display on a companion device. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, interrupting the output of the first ongoing audio notification (e.g., 608e) includes: ceasing the output of the first ongoing audio notification; and outputting a second audio notification (e.g., 608f) (e.g., announcing a second message notification in a queue of message notifications (e.g., 664b and 666b)). Causing performance of the first operation for interrupting the output of the first ongoing audio notification, wherein interrupting the output of the first ongoing audio notification includes, allows the user to quickly and efficiently filter the through incoming notifications by providing the user with a mechanism for interrupting and/or skipping to a next notification based on a motion input. This added efficiency increases the usability of the device by allowing the user to avoid unwanted audio notifications and skip to important audio notifications without having to independently view the visual representations of incoming audio notifications on a UI display on a companion device. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first audio notification includes a prompt to change a mode (e.g. 608g) (e.g., a control status (e.g., toggled ON/OFF (e.g., 672)) of a programmed functionality (e.g., a function for announcing/suppressing audio notifications (e.g., 674))) associated with (e.g., change a mode of the one or more audio devices and/or change a mode of one or more companion devices such as a smartphone, smartwatch, tablet, wearable computing device, laptop computer, and/or desktop computer) the one or more audio output devices (in some embodiments, the prompt is a first sub-portion of an ongoing prompt to change a mode associated with the one or more audio output devices); and causing performance of the first operation includes changing the mode associated with the one or more audio output devices from a first mode associated with the one or more audio output devices to a second mode associated with the one or more audio output devices that is different from the first mode (e.g., as illustrated in FIG. 6P). In some embodiments, causing performance of the first operation that corresponds to changing the mode associated with the one or more audio output devices includes: in accordance with a determination that the motion input is a motion input of a first type (e.g., a head nod gesture), changing the mode associated with the one or more audio output devices (e.g., announcing/suppressing audio notifications); and in accordance with a determination that the motion input is a motion input of a second type (e.g., a head shake gesture), forgoing changing the mode (e.g., dismissing the first audio notification) associated with the one or more audio output devices. Causing performance of the first operation includes changing the mode associated with the one or more audio output devices from a first mode associated with the one or more audio output devices to a second mode associated with the one or more audio output devices increases usability of the device by allowing the user to change an operating mode of the one or more audio devices and/or one or more companion devices via a single motion input without having to physically touch the one or more audio devices or interact with the visually displayed UI associated with the one or more audio devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first mode associated with the one or more audio output devices is a first notification mode that includes a first set of notification settings (e.g., settings that affect grouping, output, and/or suppression of notifications); and the second mode associated with the one or more audio output devices is a second notification mode that includes a second set of notification settings that are different from the first set of notification settings (e.g., one or more characteristics of notifications are different when in the first mode as compared to the second mode) (e.g., as illustrated in FIG. 6P). In some embodiments, the first mode and/or the second mode are modes that affect the operation of the one or more audio output devices and of a companion device (e.g., a smart phone, smart watch, and/or computer that is in communication with the one or more audio output devices) (e.g., notifications in the first mode are grouped based on a set of grouping criteria). Causing performance of the first operation includes changing the mode associated with the one or more audio output devices from a first mode associated with the one or more audio output devices to a second mode associated with the one or more audio output devices increases usability of the device by allowing the user to change an operating mode of the one or more audio devices and/or one or more companion devices via a single motion input without having to physically touch the one or more audio devices or interact with the visually displayed UI associated with the one or more audio devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first mode associated with the one or more audio output devices is a first audio notification mode that includes a first set of audio notification output settings (e.g., settings that affect how audio notifications are output (e.g., timing of output, suppression of output, grouping of output, types of notification that are output)) that affect the output of audio notifications via the one or more audio output devices; and the second mode associated with the one or more audio output devices is a second audio notification mode that includes a second set of audio notification output settings that affect the output of audio notifications via the one or more audio output devices, wherein the second set of audio notification output settings are different from the first set of audio notification settings (e.g., as illustrated in FIG. 6P). Causing performance of the first operation includes changing the mode associated with the one or more audio output devices from a first mode associated with the one or more audio output devices to a second mode associated with the one or more audio output devices increases usability of the device by allowing the user to change an operating mode of the one or more audio devices and/or one or more companion devices via a single motion input without having to physically touch the one or more audio devices or interact with the visually displayed UI associated with the one or more audio devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first audio notification that includes the prompt to change the mode associated with the one or more audio output devices is output after a plurality of previous motion inputs were detected (e.g., as illustrated in FIGS. 6N and 6O), wherein the plurality of previous motion inputs satisfied a second set of criteria. In some embodiments, the second set of criteria includes a first criterion that is satisfied when the plurality of motion inputs are of the same type (e.g., head shake gestures) and/or that the plurality of previous operations associated with the plurality of previous motion inputs are of the same type (e.g., and were skip operations). In some embodiments, the second set of criteria includes a second criterion that is met when the plurality of previous motion inputs are detected consecutively (e.g., there are no intervening inputs of different types (e.g., head nod gestures) in between two previous motion inputs of the same type). Causing performance of the first operation includes changing the mode associated with the one or more audio output devices from a first mode associated with the one or more audio output devices to a second mode associated with the one or more audio output devices, increases usability of the device by allowing the user to change an operating mode of the one or more audio devices and/or one or more companion devices via a single motion input without having to physically touch the one or more audio devices or interact with the visually displayed UI associated with the one or more audio devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, causing performance of the first operation includes changing a playback status (e.g., pausing, unpausing, skipping, and/or restarting) of a media item (e.g., as illustrated in FIG. 6Q). In some embodiments, the media item is a first media item in a queue (e.g., song playlist) of one or more media items, and performance of the first operation includes ceasing playback of the first media item and initiating playback of a second media item (e.g., skipping to next song) in the queue of one or more media items. In some embodiments, the first audio notification is an audio output of a first sub-portion of a media item (e.g., a media playback file (e.g., 676) (e.g., song and/or movie) stored on the one or more audio output devices and/or a media playback file (e.g., song and/or movie) stored on the one or more companion devices such as a smartphone, smartwatch, tablet, wearable computing device, laptop computer, and/or desktop computer) being played (in some embodiments, the motion input is detected while the media item is being played). In some embodiments, changing the playback status of the media item includes: in accordance with a determination that the motion input is a motion input of a first type (e.g., a head nod gesture), changing the playback status of the media item to a first status (e.g., pausing the media item); and in accordance with a determination that the motion input is a motion input of a second type (e.g., a head shake gesture), changing the playback status of the media item to a second status (e.g., ceasing and/or skipping the media item and initiating playback of a second media item). Causing performance of the first operation for changing the playback status of a media item increases usability and provides greater control of the one or more audio devices while engaged in a media playback operating mode. Specifically, the user can efficiently change a playback status of a media item (e.g., pausing, unpausing, skipping, restarting of a song), via a single motion input, without having to independently interact with a visual UI associated with the media item on a separate device. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first audio notification is associated with an inquiry (in some embodiments, a prompt) to join a real-time communication session (e.g., 608i) (e.g., a ring tone for an incoming call initiated by a user of an external device and/or an announced inquiry, by a virtual assistant associated with the one or more audio output devices, asking whether the user would like to answer the incoming call, video chat, or other real-time communication session); and causing performance of the first operation includes joining the real-time communication session (e.g., answering the incoming phone call, video chat, or other real-time communication session) (e.g., as illustrated in FIG. 6R). Causing performance of the first operation that includes joining the real-time communication session increases usability and provides greater control of the one or more audio devices while engaged in an operating mode related to a real-time communication. Specifically, the user can efficiently join or decline a real-time communication session via a motion input, without having to independently interact with a visual UI associated with the media item on a separate device. Doing so enhances the operability of the devices and makes the user-device interface more efficient (e.g., by helping the user to provide proper inputs and reducing user mistakes when operating/interacting with the devices)

which, additionally, reduces power usage and improves battery life of the devices by enabling the user to use the devices more quickly and efficiently.

In some embodiments, the first audio notification includes a prompt (e.g., 608*c*) (e.g., as illustrated in FIG. 6F) (e.g., a query asking whether the user of the one or more audio output devices would like to respond to a received message (e.g., 628*a*) from an external device (e.g., 626)) to send (e.g., transmit to an external device) a message (e.g., text message) (in some embodiments, the first audio notification is output in accordance with a determination that a received message contains a question that can be answered with a yes or no response) (in some embodiments, the prompt is a first sub-portion of an ongoing prompt to send a message); and causing performance of the first operation includes sending the message (e.g., 656*a*) (e.g., as illustrated in FIG. 6I) (in some embodiments, the first audio notification is integrated into a computer system comprising one or more companion devices, and performance of the first operation includes displaying a visual representation (e.g., display of a sent text message) of the sent message on the one or more companion devices (e.g., 626) (e.g., smart phone and/or smart watch)). In some embodiments, sending the message includes: in accordance with a determination that the motion input is a motion input of a first type (e.g., a head nod gesture), sending a message that represents an affirmative response (e.g., "YES" message); and in accordance with a determination that the motion input of a second type (e.g., 634*c*, 638*c*, 643*c*, and 644*c*) (e.g., a head shake gesture), sending a message representing a negative response (e.g., 656*a*) (e.g., "NO" message). Causing performance of the first operation that includes sending a message increases usability and provides greater control of the one or more audio devices while engaged in an operating mode related to sending a message to an external device. Specifically, the user can efficiently send a message to an external device via a single motion input, without having to independently interact with a visual UI associated with a message sending platform on a separate device and without needing to provide a verbal command to produce the message to be sent. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, causing performance of the first operation includes outputting an announcement (e.g., 654) (e.g., as illustrated in FIG. 6E) corresponding to a received message (e.g., a recitation of the contents of a received message). In some embodiments, the first audio notification is a first sub-portion of the announcement (e.g., 608*b*) (e.g., an announcement indicating that a received message is above a threshold length (e.g., a long message) and/or a recitation of the contents of a first portion of the message) corresponding to a received message (in some embodiments, the first audio notification is output in accordance with a determination that a received message is above a threshold length to be read in its entirety); and causing performance of the first operation includes outputting a second sub-portion (e.g., the remaining portion) of the announcement (e.g., 654). In some embodiments, causing performance of the first operation that corresponds to outputting the announcement corresponding to a received message: in accordance with a determination that the motion input is a motion input of a first type (e.g., 634*b*, 638*b*, 642*b*, and 644*b*) (e.g., a head nod gesture), causing output of the announcement that corresponds to the received message; and in accordance with a determination that the motion input is of a second type (e.g., a head shake gesture), causing dismissal of the first audio notification and causing forgoing output of the announcement that corresponds to the received message. Causing performance of the first operation wherein causing performance of the first operation includes outputting an announcement corresponding to a received message increases usability and provides greater control of the one or more audio devices while engaged in an operating mode related to announcing received messages from an external device. For example, the user can filter through received messages in an efficient manner by providing selective motion inputs to choose which messages to have announced in their entirety without having to independently interact with a visual UI associated with a message sending platform on a separate device. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, in response to the detection of the motion input, the one or more audio output devices provide first audio feedback (e.g., confirmation tone (e.g., 626*b*) (e.g., as illustrated in FIG. 6E) for a yes gesture or dismissal tone for a no gesture (e.g., 626*c*) (e.g., as illustrated in FIG. 6I)) indicating that the motion input is recognized (e.g., the motion input is identified as a motion input from a predefined (e.g., preprogrammed) set of one or more motion inputs (e.g., head gestures) associated with the one or more audio output devices). Providing first audio feedback indicating that the motion input is recognized provides improved audio feedback for the user. Providing feedback to the user that indicates when a motion input is successful informs the user how to effectively produce recognized motion inputs, thereby leading to more efficient control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, providing the first audio feedback includes: in accordance with a determination that the detected motion input is a motion input of a third type (e.g., 634*b*, 638*b*, 642*b*, and 644*b*) (e.g., head nod gesture), providing audio feedback of a first type (e.g., 626*b*) (e.g., a confirmation tone); and in accordance with a determination that the detected motion input is a motion input of a fourth type (e.g., 634*c*, 638*c*, 642*c*, and 644*c*) (e.g., head shake gesture), providing audio feedback of a second type (e.g., 626*c*) (e.g., a dismissal tone), different from the first type (e.g., the dismissal tone includes sounds of a different (e.g., higher or lower) pitch (e.g., different frequency sound waves) than the sounds included in the confirmation tone). Providing audio feedback of a first type in accordance with a determination that the motion input is a first type of motion input and providing audio feedback of a second type in accordance with a determination that the that the motion input is a second type of motion input provides improved audio feedback for the user. Specially, providing feedback based on the type of motion input informs the user how to effectively produce recognized types of motion inputs, thereby leading to more efficient control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, performance of the first operation is caused without a speech input from a user of the one or more audio output devices (in some embodiments, the first operation is not performed based on and/or in response to a speech input from a user) (e.g., as illustrated in FIGS. 6E, 6I, 6N, 6O, 6P, 6Q, and 6R). Causing performance of the first operation associated with the first audio notification in response to the detected motion input, wherein performance of the first operation is caused without a speech input from the user of the one or more audio devices provides the user with greater control over the one or more audio output devices by allowing the user to perform operations associated with incoming audio notifications without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first set of criteria includes a second criterion that is met when: in accordance with a determination that a conflicting speech input (e.g., 668) is detected during a second threshold time period (e.g., 0.05, 0.1, 0.2, 0.3, 0.4, 0.5, 1, 2, 4, or 8 seconds) (in some embodiments, the threshold time period and the second threshold time period are the same (e.g., 614g)) of outputting the first audio notification, the detected motion input is identified as an intended input (e.g., the correct input) (in some embodiments, the conflicting speech input is identified as an unintended input) based on a set of conflict resolution criteria (e.g., as illustrated in FIG. 6P). (In some embodiments, the first set of criteria are not met when a conflicting speech input is detected during the second threshold time period and the detected motion input is not identified as the intended input (e.g., the conflicting speech input is identified as the intended speech input) and an operation that corresponds to the conflicting speech input is caused to be performed. In some embodiments, the set of conflict resolution criteria includes a first conflict criterion that is met when the motion input was detected before the conflicting speech input). In some embodiments, the set of conflict resolution criteria is met when there are no other motion inputs detected during the threshold time period (e.g., the motion input will always be recognized as the intended input instead of a conflicting speech input so long as no additional motion inputs are conflicting). Causing performance of the first operation in accordance with a determination that the first set of criteria is satisfied, wherein the first set of criteria includes a second criterion that is met when, in accordance with a determination that a conflicting speech input is detected during a second threshold time period of outputting the first audio notification, the detected motion input is identified as an intended input based on a set of conflict resolution criteria provides additional control over the one or more audio output devices by further reducing user mistake. For example, requiring that the detected motion input is identified as an intended input when there is a recently detected conflicting speech input reduces false positive results for a coincidental user utterance that was not intended to perform an operation associated with the audio notification. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

Note that details of the processes described above with respect to method 700 (e.g., FIG. 7) are also applicable in an analogous manner to the methods described below. For example, methods 800 and 1000 optionally include one or more of the characteristics of the various methods described above with reference to method 700. For example, using the techniques described in methods 800 and 1000, the one or more audio output devices can cause performance of the operations described in relation to method 700. For example, method 800 can be used to provide feedback for the progression of a motion gesture that causes performance of a first operation per method 700. As an additional example, sounds that have a simulated spatial arrangement in accordance with method 1000 can be audio notifications in method 700. For brevity, these details are not repeated below.

FIG. 8 is a flow diagram illustrating a method for providing audio feedback for detected motion gestures using one or more audio output devices in accordance with some embodiments. Method 800 is performed at one or more audio output devices (e.g., 600) (e.g., speakers, headphones, and/or earbuds). Some operations in method 800 are, optionally, combined, the orders of some operations are, optionally, changed, and some operations are, optionally, omitted.

In some embodiments, the one or more audio output devices (e.g., 600) are integrated into a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an intuitive way for interacting with audio feedback. The method reduces the cognitive burden on a user for interacting with audio feedback, thereby creating a more efficient human-machine interface. For battery-operated computing devices, enabling a user to interact with audio feedback faster and more efficiently conserves power and increases the time between battery charges.

The one or more audio output devices (e.g., speakers, headphones, and/or earbuds) (in some embodiments, the one or more audio output devices are in communication with an external electronic device and/or computer system (e.g., a smart phone, a smart watch, a tablet computer, and/or a personal computer)) detect (802) (e.g., based on processing of the sensor measurements at the one or more audio output devices and/or based on processing of the sensor measurements at a companion device such as a smartphone, smartwatch, tablet, wearable computing device, laptop computer, and/or desktop computer) one or more sensor measurements (e.g., via one or more sensors (e.g., one or more accelerometers, gyroscopes, magnetometers, inertial measurement units, optical sensors and/or other sensors that are capable of detecting movement of the one or more audio output devices in space)) that correspond to a start of a motion gesture (e.g., 634*b* and/or 634*c*) (e.g., wherein a complete motion gesture requires the detection of multiple subportions (e.g., an initial subportion (e.g., 634*b* and/or 634*c*), an intermediate subportion (e.g., 638*b* and 642*b*, and/or 638*c* and 642*c*), and an end subportion (e.g., 644*b* and/or 644*c*)) of a motion (e.g., head rotation) of the user of the computer system, wherein, for each sequential subportion of motion that is detected, the computer system has an increasing level of confidence that the motion being detected corresponds to a predefined motion gesture (e.g., a head motion gesture (e.g., one or more head rotations along a lateral axis (e.g., pitch rotation) indicative of a head nod gesture or one or more head rotations along a vertical axis (e.g., yaw rotation) indicative of a head shake gesture)) (e.g., as illustrated in FIGS. 6C, 6D, 6G, and 6H)) (in some embodiments, detecting the start of a motion gesture corresponds to the detection of an initial subportion of motion (e.g., a start of a head rotation), wherein the computer system has an initial threshold level of confidence that motion being detected corresponds to a predefined motion gesture) (in some embodiments, the one or more sensors detect motion (e.g., slight head movement) that does not meet an initial threshold level of confidence that the motion being detected corresponds to a predefined motion gesture).

After detecting the one or more sensor measurements that correspond to the start of the motion gesture and while detection of the one or more sensor measurements (e.g., by the one or more audio output devices and/or by a companion device such as a smartphone, smartwatch, tablet, wearable computing device, laptop computer, and/or desktop computer) is ongoing (e.g., detecting an intermediate subportion of the motion), the one or more audio output devices provide (804) (e.g., output), via the one or more audio output devices, first audio feedback that indicates a progression of the motion gesture (e.g., 616*b*, 618*b*, 622*b*, 624*b*, 616*c*, 618*c*, 622*c*, and/or 624*c*) (e.g., as illustrated in FIGS. 6C, 6D, 6G, and 6H) (e.g., a status of progression towards completion) (e.g., audio feedback corresponding to a relative confidence level that the motion being detected corresponds to a predefined motion gesture).

Subsequent to providing the first audio feedback and in accordance with a determination (e.g., by the one or more audio output devices and/or by a companion device such as a smartphone, smartwatch, tablet, wearable computing device, laptop computer, and/or desktop computer) that the motion gesture is completed (e.g., a confirmed determination that the detected motion corresponds to the motion gesture) (e.g., detecting an end subportion of the motion), the one or more audio output devices cause (806) performance of an operation (e.g., by the one or more audio output devices and/or by a companion device such as a smartphone, smartwatch, tablet, wearable computing device, laptop computer, and/or desktop computer) (e.g., interrupting an audio notification) (e.g., sending a response to a message (e.g., yes or no text response)) associated with the motion gesture (e.g., as illustrated in FIGS. 6E, 6I, 6N, 6O, 6P, 6Q, and 6R). Providing first audio feedback that indicates a progression of the motion gesture while detection of the one or more sensor measurements is ongoing provides improved feedback to a user regarding the real-time status of a motion gesture progressing towards completion. Providing real-time feedback corresponding to a progression status of the motion gesture allows the user to effectively assess the amount of additional motion is required to successfully perform an intended motion input. Providing improved feedback to the user enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently. Causing performance of an operation associated with the motion gesture in accordance with a determination that the motion gesture is completed provides a user with greater control over the one or more audio output devices by allowing the user to perform operations associated with the motion gesture without the use of a visually displayed UI and without requiring the user to provide a responsive voice command. Providing additional control of the one or more audio output devices enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, subsequent to providing the first audio feedback (e.g., 616*d*) (e.g., as illustrated in FIG. 6K) and in accordance with a determination that the motion gesture is not completed (e.g., all of the required subportions (an initial subportion, an intermediate subportion, and/or an end subportion) of the motion are not detected within a threshold time period), the one or more audio output devices forgo causing performance of the operation associated with the motion gesture (e.g., as illustrated in FIG. 6L). Forgoing causing performance of the operation in accordance with a determination that the motion gesture is not completed provides additional control over the one or more audio output devices by further reducing user mistake. For example, requiring multiple subportions of motion that correspond to the motion gesture to be detected within a threshold time period in order to cause performance of the operation reduces false positive results for coincidental motion by the user that was not intended to correspond to the motion gesture. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, subsequent to providing the first audio feedback and in accordance with the determination that the motion gesture is not completed, the one or more audio output devices provide a first audio output (e.g., 662) (e.g., a cancellation tone and/or cancellation announcement) indicating that the operation associated with the motion gesture was cancelled (e.g., an indication that the threshold time period (e.g., 614*d*) for detecting all of the required subportions of motion associated with the motion gesture has ended (e.g., subsequent subportions of motion will no longer progress this motion gesture)) (e.g., as illustrated in FIG. 6L). Providing the first audio output indicating that the operation was cancelled provides improved audio feedback for the user. In particular, the feedback provides a real-time indication that the threshold time period for detecting the motion gesture has ended, thereby allowing the user to operate the one or more audio output devices (e.g., using a second motion input) without inadvertently performing the operation associated with the motion gesture. Further, providing feedback to the user that indicates when a motion input is unsuccessful informs how to effectively produce future motion inputs, thereby leading to more efficient control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, subsequent to providing the first audio feedback and in accordance with the determination that the motion gesture is completed, the one or more audio output devices provide an audio output (e.g., 626b and/or 626c) (e.g., confirmation tone and/or confirmation announcement) indicating that the motion gesture was completed successfully (e.g., as illustrated in FIGS. 6E and 6I). Providing a first audio output indicating that the motion gesture was completed successfully provides improved audio feedback for the user. In particular, the feedback provides a real-time indication that the necessary subportions of motion required for triggering completing the motion gesture have been detected, thereby allowing the user to cease motion associated with the motion gesture, which reduces the likelihood of the user inadvertently triggering a second motion gesture in an attempt to complete the motion gesture. Further, providing feedback to the user that indicates when a motion input is completed successfully informs how to effectively produce future motion inputs, thereby leading to more efficient control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more sensor measurements are detected (e.g., based on processing of the sensor measurements at the one or more audio output devices) via one or more sensors (e.g., one or more accelerometers, gyroscopes, magnetometers, inertial measurement units, optical sensors and/or other sensors that are capable of detecting movement of the one or more audio output devices in space) of the one or more audio output devices (e.g., 600); and the one or more audio output devices are included in one or more wearable devices (e.g., wearable headphones, earbuds, and/or a head-mounted display device with integrated audio) (e.g., as illustrated in FIGS. 6A-6R). Providing first audio feedback that indicates the progression of the motion gesture, wherein the one or more sensor measurements at detected at the one or more audio output devices, wherein the one or more audio output devices are part of a wearable device provides the user with greater control over the one or more audio devices, by allowing the user to perform operations associated with the motion gesture without the use of touch-based inputs on the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more wearable devices is a set of one or more earbuds or headphones (e.g., as illustrated in FIGS. 6A-6R). Providing first audio feedback that indicates the progression of the motion gesture, wherein the one or more sensor measurements at detected at the same one or more audio output devices, and wherein the one or more audio output devices are a set of one or more earbuds or headphones provides the user with greater control over the one or more audio devices, by allowing operations to be performed via a head gesture in a hands-free manner (e.g., with the use of touch-based inputs and without requiring motion gesture to correspond to an arm or hand gesture). Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, providing the first audio feedback that indicates the progression of the motion gesture includes outputting a plurality of discrete sounds (e.g., 616b, 618b, 622b, 624b, 616c, 618c, 622c, and/or 624c) (e.g., as illustrated in FIGS. 6C, 6D, 6G, and 6H) (e.g., each sound of the plurality sounds includes one or more tones that end after a respective amount of time without further input from the user) (in some embodiments, the discrete sounds are different sounds (e.g., sounds having different tone, pitch, and/or volume)). Providing the first audio feedback that indicates the progression of the motion gesture, wherein providing the first audio feedback includes outputting a plurality of discrete sounds improves feedback for the user of the one or more audio devices. Providing real-time feedback corresponding to a progression status of the motion gesture allows the user to assess the amount of additional motion is required to successfully perform an intended motion input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, progression of the motion gesture includes a first intermediate subportion (e.g., a first intermediate subportion of motion (e.g., 638b and/or 638c) required for a complete motion gesture) (in some embodiments, the progression of the motion gesture includes the start of the motion gesture that was detected and the first intermediate subportion of motion includes an initial subportion of motion (e.g., 634b and/or 634c) required for a compete motion gesture) of the motion gesture that is detected and a second intermediate subportion (e.g., 642b and/or 642c) of the motion gesture that is detected; the plurality of discrete sounds includes a first discrete sound (e.g., 618b and 618c, and/or 616b and 616c) (e.g., one or more tones of a first pitch/volume that ends after a respective amount of time without further input from the user) that is output in response to the first intermediate subportion of the motion gesture that is detected; and the plurality of discrete sounds includes a second discrete sound (e.g., 622*b* and 622*c* and/or 618*b* and 618*c*) (e.g., one or more tones of a second pitch/volume that ends after a respective amount of time without further input from the user) that is output in response to the second intermediate subportion of the motion gesture that is detected (e.g., as illustrated in FIGS. 6C, 6D, 6G, and 6H). In some embodiments, each discrete sound is output in accordance with a determination that a respective sensor measurement, of the one or more sensor measurements, satisfies a respective threshold level of confidence that the motion gesture is progressing towards completion. Providing the first audio feedback, wherein providing the first audio feedback includes outputting a plurality of discrete sounds, wherein the plurality of discrete sounds includes a first discrete sound that is output in response to the first intermediate subportion of the motion gesture that is detected; and the plurality of discrete sounds includes a second discrete sound that is output in response to the second intermediate subportion of the motion gesture that is detected improves feedback for the user of the one or more audio devices. Providing real-time feedback corresponding to a progression status of the motion gesture allows the user to assess the amount of additional motion is required to successfully perform an intended motion input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first discrete sound indicates a starting status of the progression of the motion gesture (in some embodiments, the first discrete sound corresponds a first sensor measurement of the one or more sensor measurements satisfying a first threshold level of confidence that the motion gesture is progressing towards completion); and the second discrete sound indicates a continuing status of the progression of the motion gesture (in some embodiments, the second discrete sound corresponds to a second sensor measurement of the one or more sensor measurements satisfies a second threshold level of confidence, higher than the first threshold level of confidence) (e.g., as illustrated in FIGS. 6C, 6D, 6G, and 6H). Providing the first audio feedback, wherein providing the first audio feedback includes outputting a plurality of discrete sounds, wherein the plurality of discrete sounds includes a first discrete sound that is output in response to the first intermediate subportion of the motion gesture that is detected; and the plurality of discrete sounds includes a second discrete sound that is output in response to the second intermediate subportion of the motion gesture that is detected improves feedback for the user of the one or more audio devices. Providing real-time feedback corresponding to a progression status of the motion gesture allows the user to assess the amount of additional motion is required to successfully perform an intended motion input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, progression of the motion gesture includes a final subportion of the motion gesture that is detected (e.g., 644*b* and/or 644*c*); the plurality of discrete sounds includes a third discrete sound (e.g., 624*b* and/or 624*c*) (e.g., one or more tones of a third pitch/volume that ends after a respective amount of time without further input from the user) that is output in response to the final subportion of motion that is detected; the third discrete sound indicates a completion status of the progression of the motion gesture (in some embodiments, the third discrete sound corresponds to a third sensor measurement of the one or more sensor measurements that satisfies a third threshold level of confidence, higher than the second threshold level of confidence, that the motion gestures is progressing towards completion) (e.g., as illustrated in FIGS. 6D and 6H). Providing the first audio feedback, wherein providing the first audio feedback includes outputting a plurality of discrete sounds, wherein the plurality of discrete sounds includes a first discrete sound that is output in response to the first intermediate subportion of the motion gesture that is detected; and the plurality of discrete sounds includes a second discrete sound that is output in response to the second intermediate subportion of the motion gesture that is detected improves feedback for the user of the one or more audio devices. Providing real-time feedback corresponding to a progression status of the motion gesture allows the user to assess the amount of additional motion is required to successfully perform an intended motion input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first intermediate subportion of the motion gesture is detected before the second intermediate subportion of the motion gesture is detected; the first intermediate subportion of the motion gesture corresponds to (e.g., is determined and/or identified as corresponding to) a first level of confidence that the motion gesture is progressing towards completion (in some embodiments, the level of confidence that the motion gesture is progressing towards completion increases as a greater portion of the completed gesture is detected); the second intermediate subportion of the motion gesture corresponds to (e.g., is determined and/or identified as corresponding to) a second level of confidence that the motion gesture is progressing towards completion that is higher than the first level of confidence; and the first discrete sound has a first value of an audio characteristic (e.g., tone, pitch, and/or volume) in a range of values of the audio characteristic that corresponds to the first level of confidence that the motion gesture is progressing towards completion (e.g., the volume ranges from 1-30 decibels, with 1 corresponding to the lowest level of confidence and 30 corresponding to the highest level of confidence); and the second discrete sound has a second value of the audio characteristic that is further along in the range of values of the audio characteristic than the first value of the audio characteristic and the second discrete sound corresponds to the second level of confidence that the motion gesture is progressing towards completion (e.g., the first value is 5 decibels and the second value is 10 decibels) (e.g., as illustrated in FIGS. 6C, 6D, 6G, and 6H). Providing audio feedback that includes discrete sounds that have an audio characteristic that progresses as the level of confidence in the motion gesture progressing towards completions increases improves the feedback provided to the user of the one or more audio devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first intermediate subportion of the motion gesture is detected before the second intermediate subportion of the motion gesture is detected; the first intermediate subportion of the motion gesture corresponds to (e.g., is determined and/or identified as corresponding to) a first level of confidence that the motion gesture is progressing towards completion (in some embodiments, the level of confidence that the motion gesture is progressing towards completion increases as a greater portion of the completed gesture is detected); the second intermediate subportion of the motion gesture corresponds to (e.g., is determined and/or identified as corresponding to) the first level of confidence that the motion gesture is progressing towards completion (e.g., the second intermediate subportion does not indicate a greater level of confidence (e.g., a second level of confidence) that the motion gesture is progressing towards completion); and the first discrete sound has a first value of an audio characteristic (e.g., tone, pitch, and/or volume) in a range of values of the audio characteristic that corresponds to the first level of confidence that the motion gesture is progressing towards completion (e.g., the volume ranges from 1-30 decibels, with 1 corresponding to the lowest level of confidence and 30 corresponding to the highest level of confidence); and the second discrete sound has the first value of the audio characteristic and the second discrete sound corresponds to the first level of confidence that the motion gesture is progressing towards completion (e.g., the both the first and second discrete sounds are output at 5 decibels). Providing audio feedback that includes discrete sounds that have an audio characteristic that does not progress as the level of confidence in the motion gesture progressing towards completions remains the same improves the feedback provided to the user of the one or more audio devices and can signal to the user that the motion gesture should be modified/progressed in order to complete the motion gesture. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, providing the first audio feedback that indicates a progression of the motion gesture includes: in accordance with a determination that the motion gesture is a motion gesture of a first type (e.g., a yes gesture (e.g., head nod gesture)) (e.g., as illustrated in FIGS. 6C and 6D) providing first audio feedback of a first type (e.g., a first sequence of tones of progressing pitch/volume corresponding to a head nod gesture); and in accordance with a determination that the motion gesture is a motion gesture of a second type (e.g., a no gesture (e.g., head shake gesture) (e.g., as illustrated in FIGS. 6G and 6H), different from the first type, providing first audio feedback of a second type (e.g., a second sequence of tones of progressing/pitch volume corresponding to a head shake gesture). In some embodiments, subsequent to providing the first audio feedback and in accordance with a determination that the motion gesture is completed: in accordance with a determination that the motion gesture is a motion gesture of a first type (e.g., head nod gesture), second audio feedback of a first type (e.g., one or more confirmation tones) is provided. In some embodiments, subsequent to providing the first audio feedback and in accordance with a determination that the motion gesture is completed: in accordance with a determination that the motion gesture is a motion gesture of a second type (e.g., head shake gesture), second audio feedback of a first type (e.g., one or more dismissal tones) is provided. Providing first audio feedback of a first type in accordance with a determination that the motion gesture is of a first type of motion input and providing first audio feedback of a second type in accordance with a determination that the motion gesture is of a second type provides improved audio feedback for the user. Specially, providing feedback based on the type of motion gesture informs the user how to effectively produce recognized types of motion gesture, thereby leading to more efficient control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, prior to detecting the one or more sensor measurements that corresponds to the start of the motion gesture, the one or more audio output devices provide a first portion of an ongoing audio effect (e.g., as illustrated in FIG. 6C) (e.g., a waiting loop tone (e.g., 612b) that continues and/or is repeated until respective conditions are met (e.g., a condition that is satisfied when a predetermined time period associated with the waiting loop (e.g., 614b) expires, a condition that is satisfied when a completed motion gesture is detected before the expiration of the waiting loop period, a condition that is satisfied when a voice input is detected before the expiration of the waiting loop period, a condition that is satisfied when a touch input on the one or more audio output devices is detected before the expiration of the waiting loop, and/or a condition that is satisfied when an input on a companion device is detected before the expiration of the waiting loop period)).

In some embodiments, providing the first audio feedback includes providing a second portion of the ongoing audio effect by modifying one or more audio characteristics (e.g., 636b, 646b, 648b, and/or 652b) (e.g., tone, pitch, and/or volume) of the ongoing audio effect (e.g., as illustrated in FIGS. 6C and 6D). Causing one or more modifications of the audio effect based on the first audio feedback provides improved audio feedback to the user of the one or more audio devices by outputting feedback that signifies a correlation between the audio effect (e.g., the waiting loop tone) and the progression of the head motion gesture. Providing feedback that signifies this correlation assists the user in understanding that the progressing head motion gestures are appropriately responding to an actionable prompt associated with the waiting loop tone. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more audio output devices are in communication with an audio input device (e.g., an integrated and/or connected microphone); and the ongoing audio effect indicates a period of time (duration of a waiting loop period) that the one or more audio output devices are listening (e.g., based on recording and/or processing one or more user utterances at the one or more audio output devices and/or based on recording and/or processing one or more user utterances at a companion device such as a smartphone, smartwatch, tablet, wearable computing device, laptop computer, and/or desktop computer), via the audio input device, for one or more audio inputs (e.g., verbal commands to a virtual assistant of the one or more output devices and/or a companion devices). In some embodiments, the audio effect indicates a period of time when the audio output devices are detecting one or more sensor measurements that correspond to the motion gesture (e.g., the same period of time when the one or more audio output devices are listening for one or more audio inputs) (e.g., as illustrated in FIGS. 6C and 6D). Providing a first portion of an ongoing audio effect prior to detecting one or more sensor measurements, wherein the audio effect indicates a period of time that the audio output devices are listening for one or more audio inputs further improves the feedback provided to the user of the one or more audio output devices by signaling to the user that the motion gesture is being detected and/or progressing during a prescribed time period when the audio output devices are listening for specific inputs. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, providing the first audio feedback includes outputting one or more sounds, wherein a respective sound, of the one or more sounds, is output in accordance with a determination that a respective sensor measurement, of the one or more sensor measurements, satisfies a respective threshold level of confidence that the motion gesture is progressing towards completion; and the one or more modifications of the audio effect (e.g., 636*b*, 646*b*, 648*b*, and/or 652*b*) correspond to (e.g., are synchronized with) the output of the one or more sounds, wherein a respective modification of the one or more modifications of the audio effect indicates a respective status (e.g., a relative confidence levels that the motion being detected corresponds to a predefined motion gesture) of the progression of the motion gesture. Causing one or more modifications of the audio effect based on the first audio feedback, wherein different modifications of the one or more modifications of the audio effect indicates a corresponding status of the progression of the motion gesture improves feedback for the user. Providing real-time feedback corresponding to a progression status of the motion gesture allows the user to effectively assess the amount of additional motion is required to successfully perform an intended motion input and simultaneously provides feedback that signifies a correlation between the audio effect (e.g., the waiting loop tone) and the progression of the head motion gesture. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, causing performance of the operation associated with the motion gesture includes: in accordance with a determination that the motion gesture is a motion gesture of a first type (e.g., head nod gesture), causing performance of an operation of a first type (e.g., as illustrated in FIGS. 6C, 6D, 6P, and 6R) (e.g., as described above in relation to method 700) (e.g., send a "YES" message); and in accordance with a determination that the motion gesture is a motion gesture of a second type, different from the motion gesture of the second type (e.g., head shake gesture), causing performance of an operation of a second type (e.g., as illustrated in FIGS. 6G, 6H, 6N, and 6Q) (e.g., as described above in relation to method 700) (e.g., send a "NO" message or forgoing sending a message), different from the operation of the first type. Causing performance of the operation of the first type, different from the operation of the second type, in accordance with a determination that the motion input is a motion input of a second type, different from the motion input of the first type, provides the user with control over a larger range of operations associated with the one or more audio devices without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

Note that details of the processes described above with respect to method 800 (e.g., FIG. 8) are also applicable in an analogous manner to the methods described below/above. For example, method 700 and 1000 optionally includes one or more of the characteristics of the various methods described above with reference to method 800. For example, using the techniques described in methods 800 and 1000, the one or more audio output devices can cause performance of the operations described in in relation to method 700. For example, method 800 can be used to provide feedback for the progression of a motion gesture that causes performance of a first operation per method 700. As an additional example, method 800 can be used to provide feedback for the progression of a motion gesture that causes performance of an operation for a selectable option in a simulated spatial arrangement in accordance with method 1000. For brevity, these details are not repeated below.

FIGS. 9A-9N illustrate exemplary methods for detecting motion inputs in spatial audio arrangements, in accordance with some embodiments. The user interfaces in these figures are used to illustrate the processes described below, including the processes in FIG. 10.

Generally, the implementation of the various techniques for providing audio described below relate to spatial audio (e.g., binaural audio). In some embodiments, spatial audio is audio that has been manipulated in a headphone's two audio channels (e.g., left and right) so that they resemble directional sounds arriving in the ear-canal (e.g., spatial audio experiences). For example, the headphones can reproduce spatial audio signals that simulate spatial locations around the listener (e.g., user 602) that are different from the locations of the physical speakers on the headphones and are optionally adjusted based on head movement. An effective spatial location simulation can render a spatial location that appears to be fixed in space (e.g., the listener perceives the sound as coming from a fixed location) even as the audio output components themselves move in space (e.g., as the listener's head is moving).

Generally, FIGS. 9A-9N illustrate various spatial audio arrangements (e.g., produced via spatial audio experience) in which device 600 is outputting sounds simulated in spatial regions of the various spatial audio arrangements and detecting motion inputs from user 602 while interacting with the various spatial audio arrangements.

FIGS. 9A-9H illustrate spatial audio arrangement 900 for interacting with a menu of phone contacts that user 602 can select to call. Specifically, FIGS. 9A-9I depict device 600 detecting head movements by user 602 to engage with different phone contact options in select spatial regions of spatial audio arrangement 900 and outputting spatialized sound options for each selectable option that user 602 interacts with.

At FIG. 9A device 600 detects head gesture 902a, which is a double head tilt (e.g., roll rotation along a longitudinal axis (e.g., an axis directed in the forward-facing direction of the face of user 602)) to the left of user 602. FIG. 9A depicts multiple views of user 602 performing a double head tilt gesture. The top left illustration of FIG. 9A depicts a front facing view of user 602, the bottom left illustration shows a back facing view of user 602, and the bottom right figure shows an isometric view of user 602.

In response to detecting head gesture 902a, and because head gesture device 902a is a specific type of gesture (e.g., double head tilt to the left rather than the right), device 600 invokes (e.g., produces via a spatial audio experience) spatial audio arrangement 900. Spatial audio arrangement 900 is depicted in the top right illustration of FIG. 9A, which shows a top-down view of the user facing forward as spatial audio arrangement 900 is activated. In some examples, head gesture 902a is a double head tilt along a longitudinal axis that is positioned relative to the body pose of user 602. For example, device 600 will register a double head tilt rotation from user 602 as head gesture 902a, regardless of whether user 602 is lying down or standing up.

Further, as illustrated in FIG. 9A, spatial audio arrangement 900 contains spatial regions 904a (e.g., left of user 602), spatial region 906a (e.g., front of user), and spatial region 908a (e.g., right of user) that correspond to three selectable options (e.g., 916a, 918a, and 922a) for calling (e.g., initiating a real-time communication session via device 626) contacts "Kate," "Jonathan," and "Eric," respectively. The spatial regions are located apart from user 602, such that simulated sounds coming from spatial regions 904a, 906a, and 908a are perceived by user 602 to be coming from those respective locations, rather than the location of the physical speakers on device 602. Further, simulated sounds produced in spatial regions 904a, 906a, and 908a, are fixed relative to an initial front facing position of the head of user 602, such that user 602 will perceive sounds in spatial regions 904a, 906a, and 908a as coming from constant locations even as the head of user 602 shifts and rotates. For example, as the head of user 602 rotates 90 degrees to the left from the initial position depicted in FIG. 9A, a simulated sound at spatial region 904a is perceived by user 602 as coming from a location directly in front of user's 602 face.

Figures 9C, 9D:
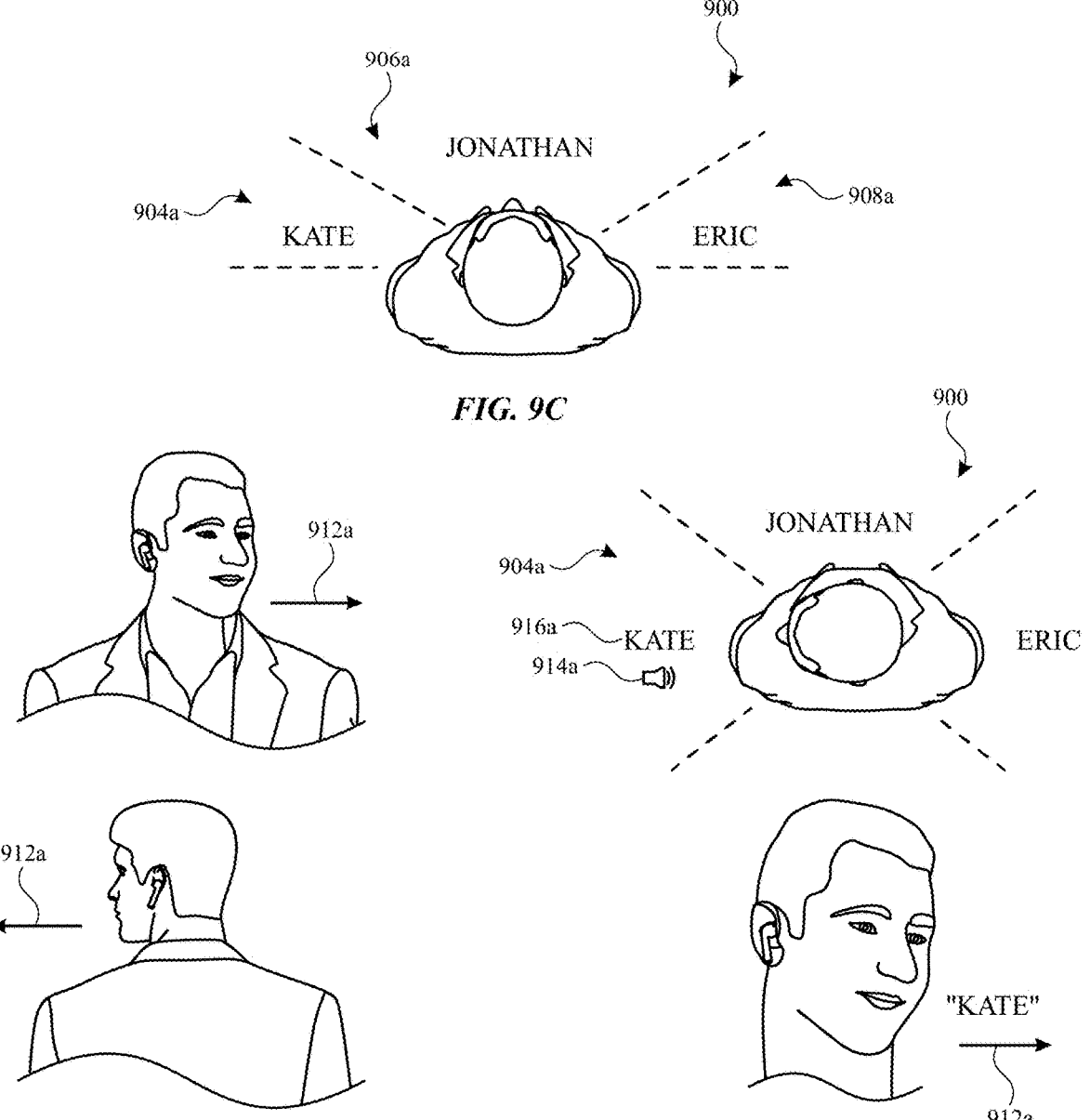

In some embodiments, as illustrated in FIG. 9B and FIG. 9C, spatial regions 904a, 906a, and 908a of spatial audio arrangement 900 can be arranged in a variety of ways, such that they occupy different locations relative to the front facing position of user 602 and/or that they have different relative sizes and shapes.

In FIG. 9D, device 600 detects first head movement 912a, which is a head rotation (e.g., head tilt or head turn) to the left towards spatial region 904a. In response to detecting head movement 912a, device 600 outputs simulated sound 914a at spatial region 904a. In this example simulated sound 914a is an announcement (e.g., by a virtual assistant associated with device 600) of selectable option 916a, which is an option to initiate a phone call with Kate.

In FIG. 9E, device 600 detects first head movement 924a, which is a head rotation (e.g., head tilt or head turn) to the right (e.g., toward spatial region 908a), rather than the left. In response to detecting second head movement 924a, device 600 outputs simulated sound 926a at spatial region 908a. In this example simulated sound 926a is an announcement (e.g., by a virtual assistant associated with device 600) of selectable option 922a, which is an option to initiate a phone call with Eric.

In FIG. 9F, device detects second head movement 928a, which is head rotation (e.g., head tilt or head turn) from spatial region 908a toward spatial region 906a (e.g., front of user 602). In response to detecting second head movement 928a, device 600 outputs simulated sound 918a at spatial region 906a. In this example simulated sound 932a is an announcement of selectable option 918a, which is an option to initiate a phone call with Jonathan.

In FIG. 9G, device 600 detects third head movement 934a, which is head rotation (e.g., head tilt or head turn) from spatial region 906a back toward spatial region 908a (e.g., right of user 602). In response to detecting third head movement 934a, device 600 repeats the output of simulated sound 926a at spatial region 908a (e.g., repeat of announcement to initiate a phone call with Eric).

Figure 9H:
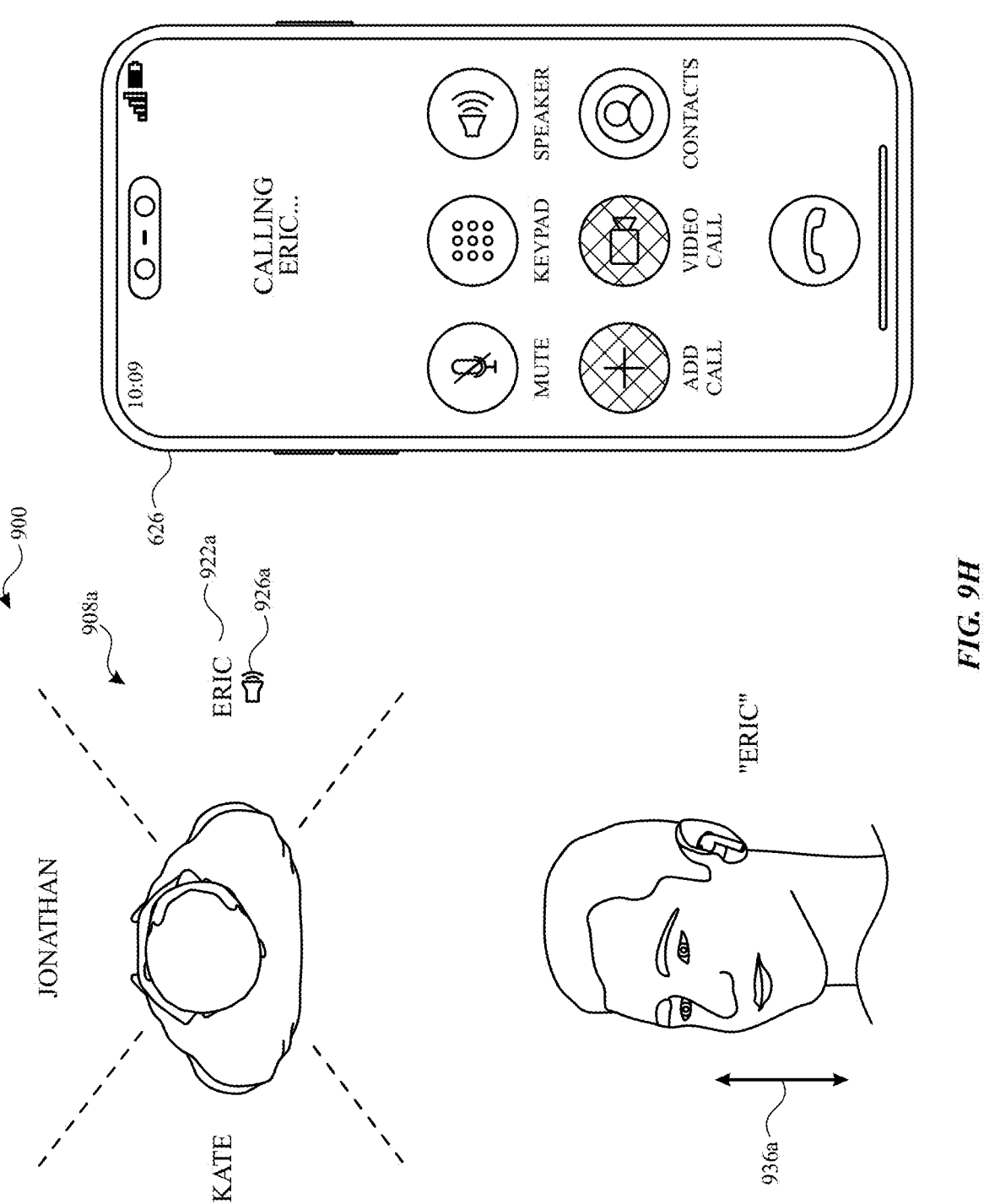

In FIG. 9H, while user 602 is oriented (e.g., facing the direction) toward spatial region 908a, device 600 detects motion gesture 936a, which is a head nod gesture. In response to detecting motion gesture 936a while user 602 is in a right facing orientation, device 600 initiates a real-time communication session (e.g., phone call) between user 602 and Eric. In some embodiments, device 600 transmits a signal to device 626 to initiate the phone call, and the related audio associated with the initiated phone call is outputted at device 600. Thus, in the embodiment shown in FIGS. 9A-9H, user 602 can select between different potential call recipients and then initiate a call by providing an appropriate gesture after the desired recipient is announced. In some embodiments, motion gesture 936a is detected by device 600 in a similar manner as described in FIGS. 6B-6E. In some embodiments, device 600 provides audio feedback in response to 936a, similar to the audio feedback provided in response to the detection of the head nod gesture in FIGS. 6B-6E.

FIGS. 9I-9N illustrate various spatial audio arrangements (e.g., 910 and 920) for interacting with a menu of song playlists that user 602 can select to play. For example, FIGS. 9A-9I depict device 600 detecting head movements by user 602 to navigate from a menu of playlist in a spatial audio arrangement (e.g., 910), to a menu of songs (e.g., 920) within that playlist that user 602 can individually select to play.

Figure 9I:
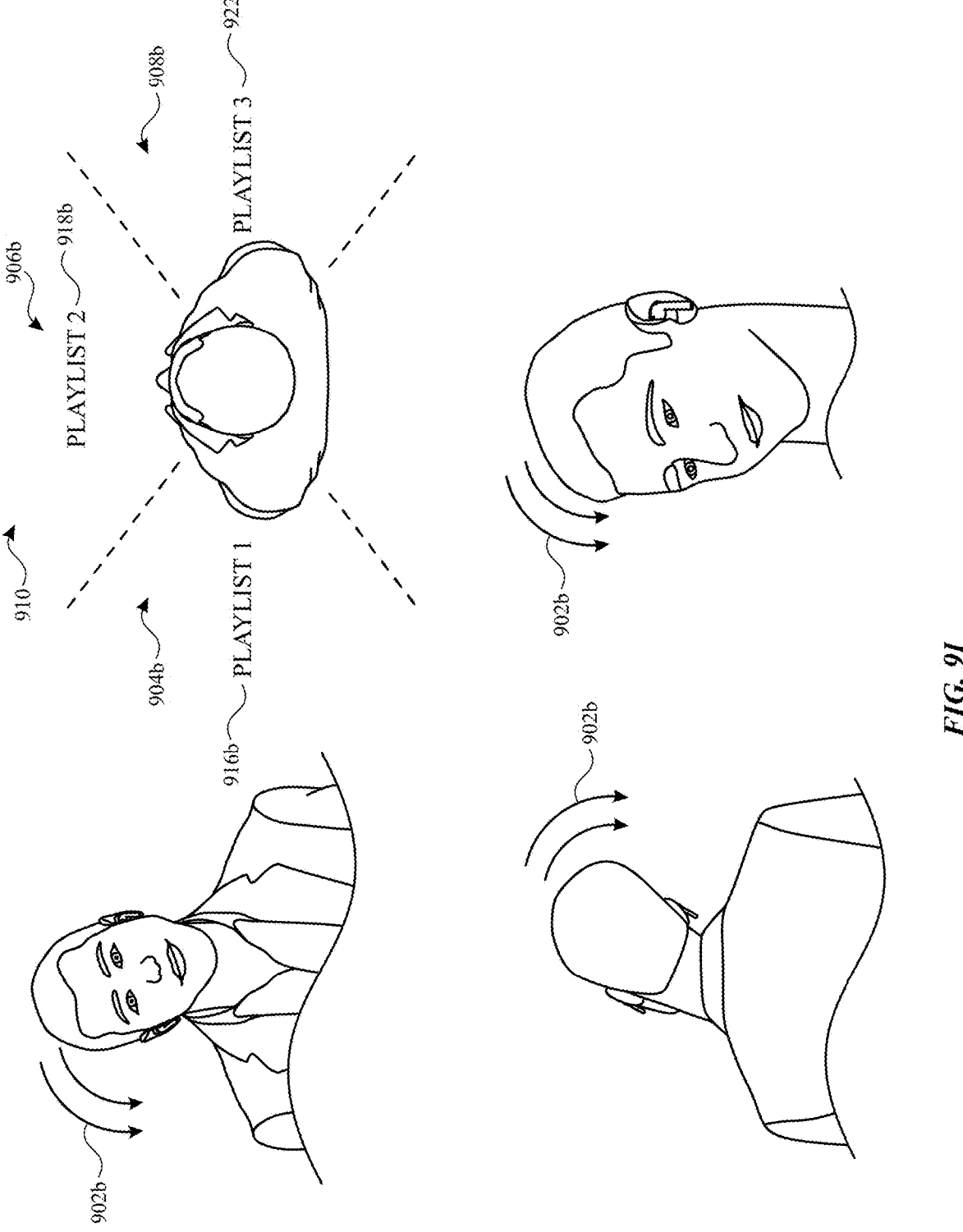

At FIG. 9I device 600 detects head gesture 902b, which is a double head tilt (e.g., roll rotation along a longitudinal axis (e.g., an axis directed in the forward-facing direction of the face of user 602)) to the right by user 602. In response to detecting head gesture 902b, and because head gesture device 902b is a specific type of gesture (e.g., double head tilt to the right rather than the left), device 600 invokes (e.g., produces via a spatial audio experience) spatial audio arrangement 910.

Further, as illustrated in FIG. 9I, spatial audio arrangement 900 contains spatial regions 904b (e.g., left of user 602), spatial region 906b (e.g., front of user), and spatial region 908b (e.g., right of user) that correspond to three selectable options (e.g., 916b, 918b, and 922b) for initiating media playback (e.g., starting and/or shuffling a playlist of songs) of "Playlist 1," "Playlist 2," "Playlist 3," respectively.

Figure 9J:
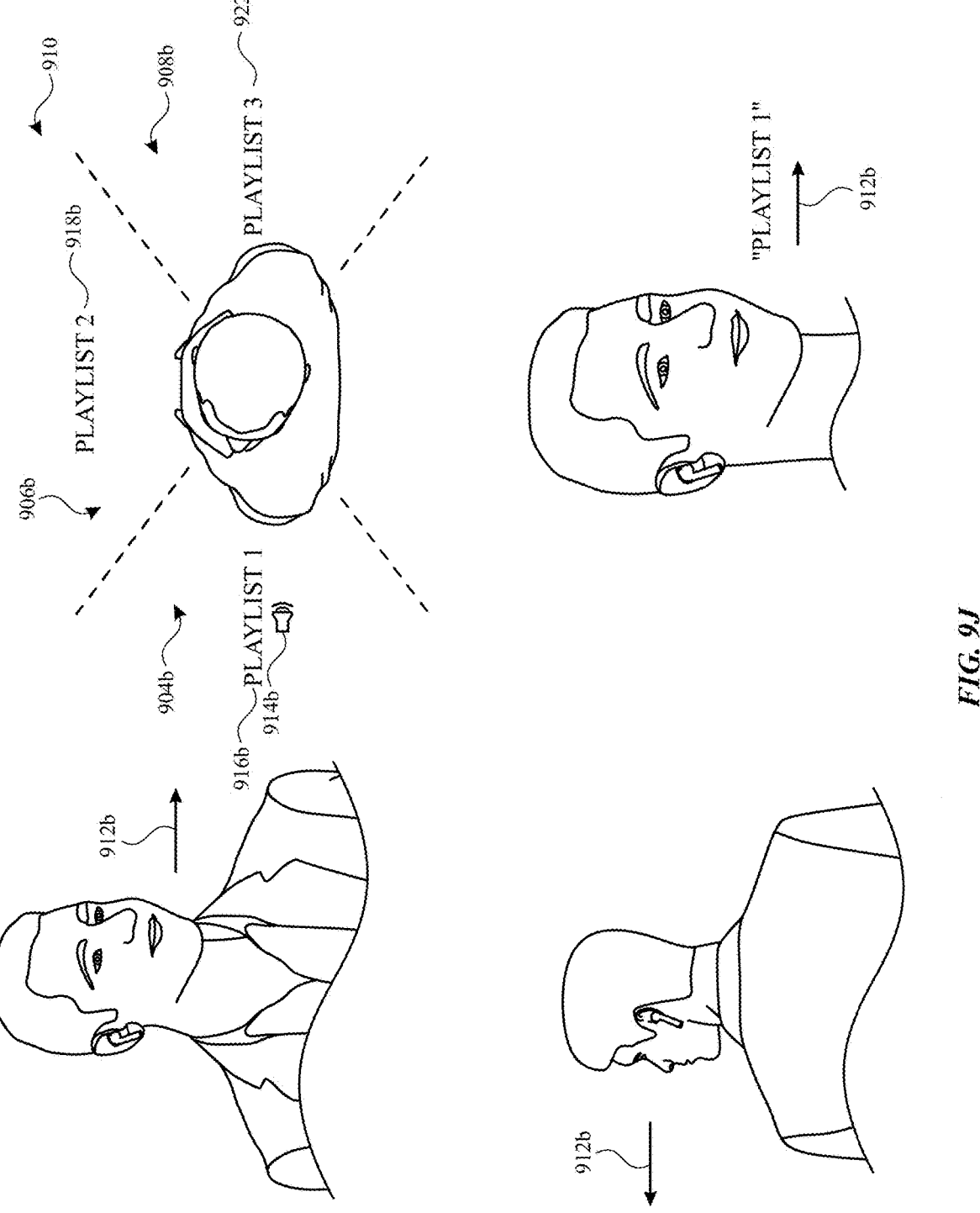

In FIG. 9J, device 600 detects first head movement 912*b*, which is a head rotation (e.g., head tilt or head turn) to the left towards spatial region 904*b*. In response to detecting head movement 912*b*, device 600 outputs simulated sound 914*b* at spatial region 904*b*. In this example, simulated sound 914*b* is an announcement (e.g., by a virtual assistant associated with device 600) of selectable option 916*a*, which is an option to initiate media playback (e.g., start playback and/or shuffle a playlist of songs) for "Playlist 1."

In FIG. 9K, while user 602 is oriented (e.g., facing the direction) toward spatial region 904*b*, device 600 detects head nod gesture 936*b*. In response to detecting motion gesture 936*b* while user 602 is in a right facing orientation, device 600 initiates playback of "Playlist 1". In some embodiments, device 600 transmits a signal to device 626 to initiate playback of "Playlist 1", which is a playlist of media files (e.g., songs) stored on device 626, and the associated audio from "Playlist 1" is output on device 600. In some embodiments, motion gesture 936*b* is detected by device 600 in a similar manner described in FIGS. 6B-6E. In some embodiments, device 600 provides audio feedback in response to 936*a*, similar to the audio feedback provided in response to the detection of the head nod gesture in FIGS. 6B-6E.

Figure 9L:
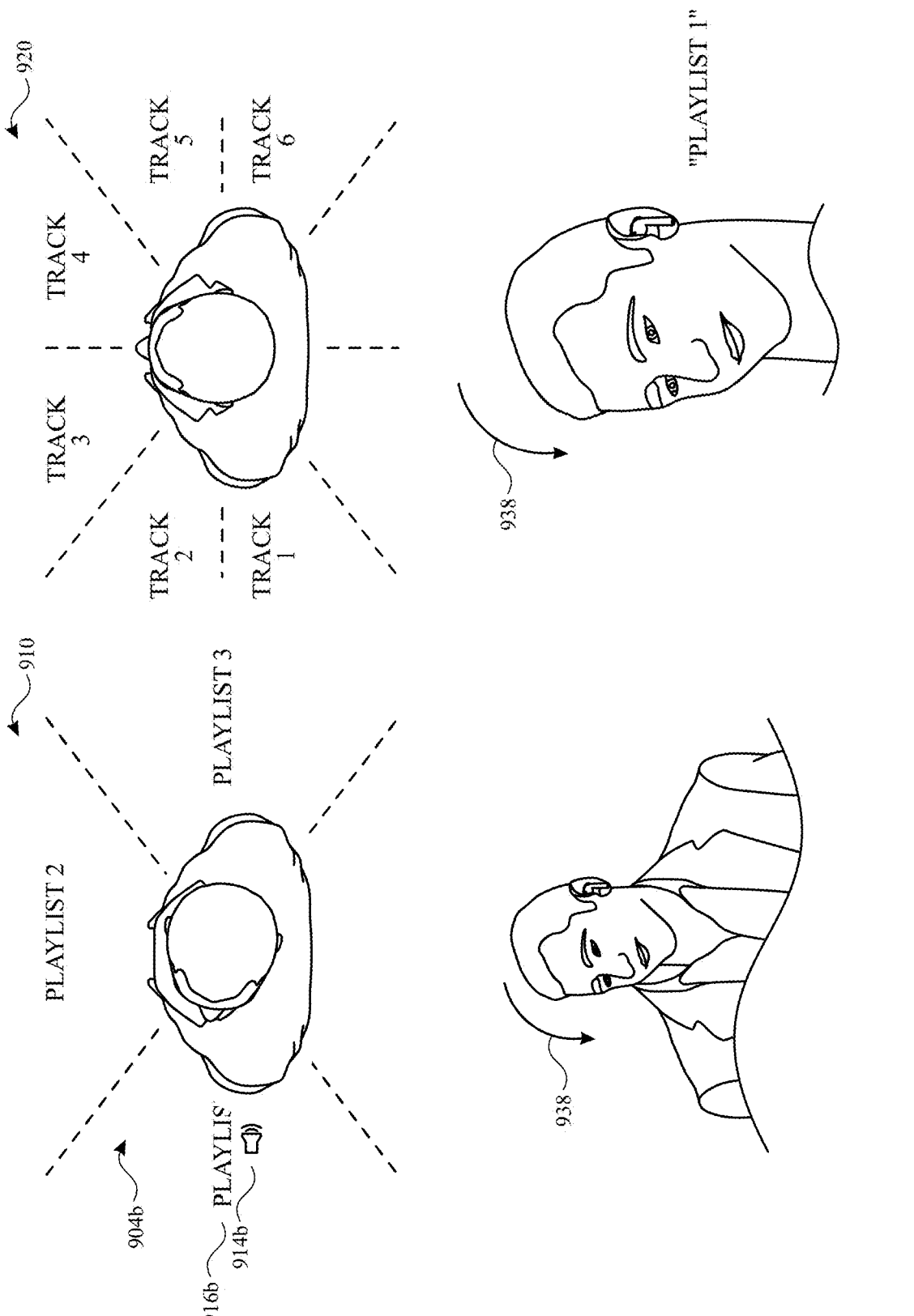

FIG. 9L represents an alternative embodiment to FIG. 9K in which device 600 detects tilt gesture 938 (e.g., instead of head nod gesture 936*b*) while user 602 is facing spatial region 904*b*, to navigate to a menu of selectable options within selectable option 916*b* (e.g., a list of playable songs or "Tracks" within Playlist 1). In response to detecting tilt gesture 938 while user 602 is facing spatial region 904*b*, device 600 invokes (e.g., produces via a spatial audio experience) spatial audio arrangement 920 (e.g., a sub-menu of selectable songs).

As illustrated in FIG. 9L, spatial audio arrangement 920 has a different arrangement of spatial regions than those of spatial audio arrangements 900 and 910. For example, in this arrangement, there are six spatial regions surrounding user 602, each with associated selectable options (e.g., Tracks 1-6 of Playlist 1), which are grouped closer together (e.g., have less separation) than the regions associated with spatial audio arrangements 900 and 910. Further, the manner in which device 600 announces options to user 602 in spatial audio arrangement 920, is different than that of spatial audio arrangements 900 and 910. For instance, upon invoking spatial audio arrangement 920, device 600 begins automatically announcing the selectable options (e.g., in a clockwise order, starting with Playlist 1) in their respective spatial regions without user 602 making a head movement (e.g., as opposed to spatial audio arrangements 900 and 910 in which device 600 detects a head rotation by user 602 before announcing a selectable option).

Figure 9M:
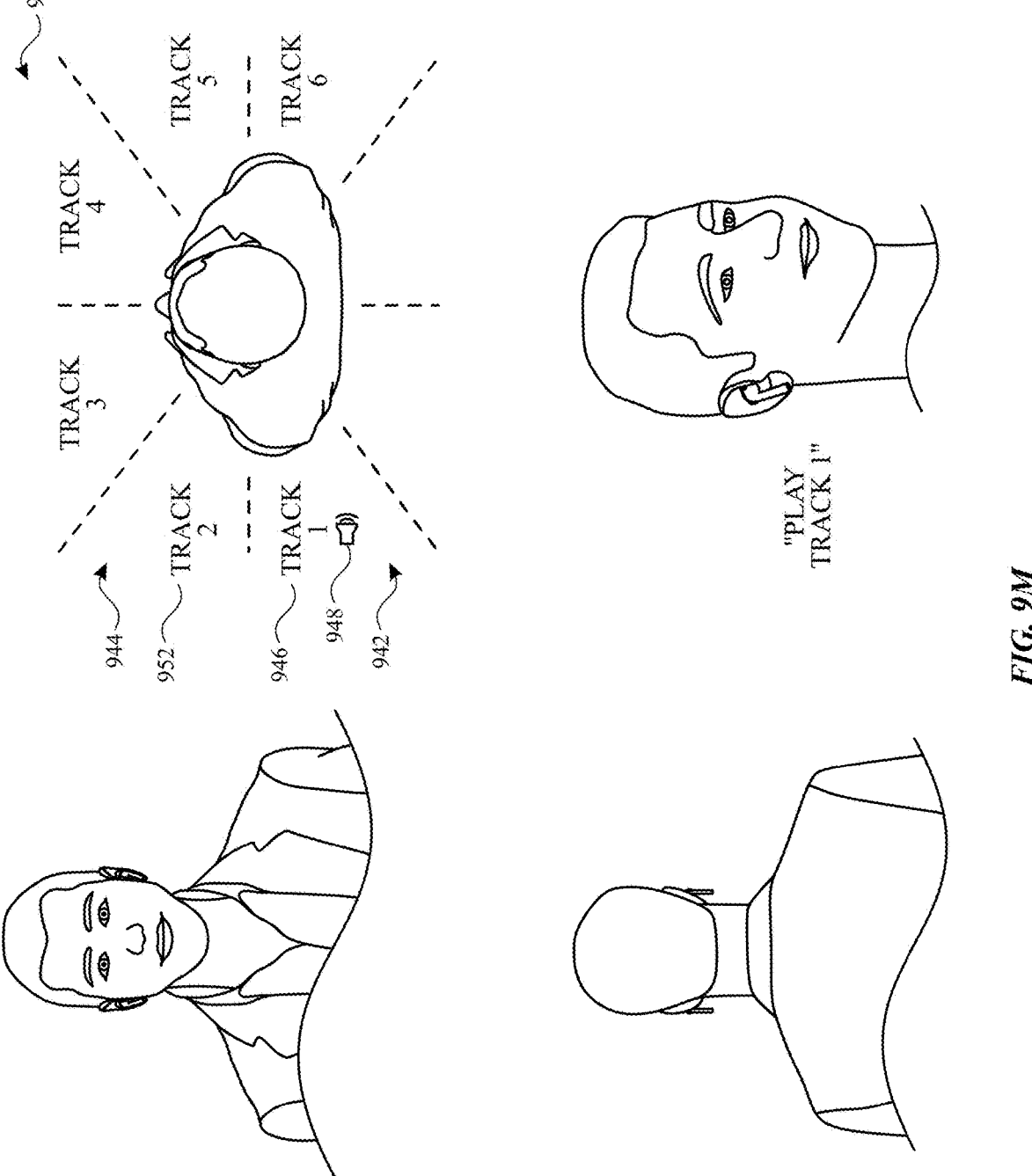
Figure 9N:
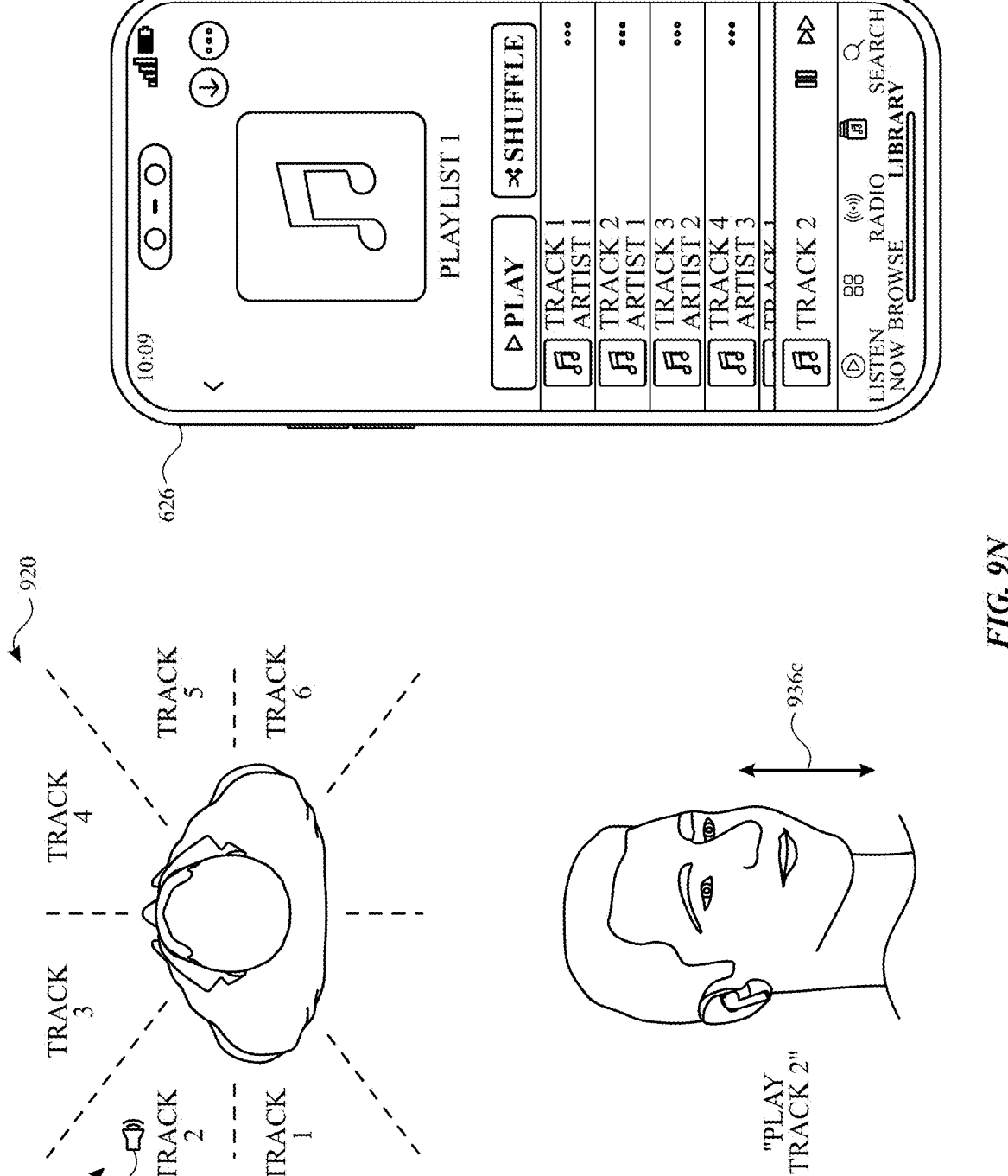

Turning to FIG. 9M, after invoking spatial audio arrangement 920, device 600 outputs simulated sound 948 at spatial region 942. In this example simulated sound 948 is an announcement (e.g., by a virtual assistant associated with device 600) of selectable option 946, which is an option to "Play Track 1" of "Playlist 1." If device 600 does not detect a motion gesture from user 602 within in a threshold time period of outputting simulated sound 948 (e.g., while device 600 is still announcing the selectable option and/or before the next selectable option is announced), device 600 proceeds to output the next simulated sound in the menu of options.

At FIG. 9N, device 600 outputs simulated sound 954 at spatial region 944. In this example simulated sound 954 is an announcement (e.g., by a virtual assistant associated with device 600) of selectable option 952, which is an option to "Play Track 2" of "Playlist 1." While device 600 is announcing the option to "Play Track 2" (e.g., before announcing the next option in the menu (e.g., "Play Track 3")), device 600 detects head nod gesture 936*c*. In response to detecting head nod gesture 936*c* during the output of sound 954, device 600 initiates playback of Track 2 in Playlist 1.

FIG. 10 is a flow diagram illustrating a method for detecting motion inputs in spatial audio arrangements using one or more audio output devices in accordance with some embodiments. Method 1000 is performed at a one or more audio output devices (e.g., 600) (e.g., speakers, headphones, and/or earbuds). Some operations in method 1000 are, optionally, combined, the orders of some operations are, optionally, changed, and some operations are, optionally, omitted.

In some embodiments, the one or more audio output devices (e.g., 600) are integrated into a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1000 provides an intuitive way interacting with audio data via spatial audio arrangements. The method reduces the cognitive burden on a user for interacting with audio data, thereby creating a more efficient human-machine interface. For battery-operated computing devices, enabling a user to interact with audio data faster and more efficiently conserves power and increases the time between battery charges.

The one or more audio output devices (e.g., 600) (e.g., speakers, headphones, and/or earbuds) (in some embodiments, the one or more audio output devices are in communication with an external electronic device and/or computer system (e.g., a smart phone, a smart watch, a tablet computer, and/or a personal computer)) detect (1002) (e.g., based on processing of the sensor measurements at the one or more audio output devices and/or based on processing of the sensor measurements at a companion device such as a smartphone, smartwatch, tablet, wearable computing device, laptop computer, and/or desktop computer) one or more sensor measurements (e.g., via one or more sensors (e.g., one or more accelerometers, gyroscopes, magnetometers, inertial measurement units, optical sensors and/or other sensors that are capable of detecting movement of the one or more audio output devices in space)) that correspond to a first movement (e.g., 912*a* and 912*b*) of a respective portion (e.g., an appendage (e.g., head, arm, and/or leg) of the user and/or an extension thereof (an object held, worn, and/or attached to an appendage of the user)) of a user of the one or more audio output devices in a three-dimensional environment (e.g., 900 and 910) (e.g., an environment of an extended reality environment, an augmented reality environment, and/or a virtual reality environment) (in some embodiments, the three-dimensional environment is visually imperceptible to the user).

In response to detecting the one or more sensor measurements that correspond to the first movement (1004) and in accordance with a determination (e.g., by the one or more audio output devices and/or by a companion device such as a smartphone, smartwatch, tablet, wearable computing device, laptop computer, and/or desktop computer) that the first movement corresponds to the respective portion of the user being oriented toward a first location (e.g., 904a and/or 904b) in the three-dimensional environment, the one or more audio output devices output (1006) a first sound (e.g., 914a and/or 914b) that has a simulated spatial location that corresponds to the first location in the three-dimensional environment (e.g., a sound is simulated within the three-dimensional environment, via a spatial audio experience, so that the user (e.g., listener) perceives the sound as coming from a specific direction associated with a selectable option), wherein the first sound corresponds to a first selectable option (e.g., 916a and/or 916b) of one or more selectable options (e.g., an option to initiate a phone call with a first contact from a list of contacts) (in some embodiments, the determination that the first movement corresponds to a respective portion of the user is a determination that a portion of the user (e.g., head) is moved (e.g., rotated to the left) (e.g., tilted to the left) so that its orientation angle, position, and/or direction of movement corresponds to the same location (e.g., the first location) associated with the simulated spatial location of the first sound (e.g., a head rotation to the left that causes the user's face to be facing the first location) (e.g., a head tilt to the left that causes directed movement of the head towards the first location)) (in some embodiments, the determination that the first movement is a movement of a first type is a determination that the first movement is associated with a first predefined motion gesture (e.g., head gesture (e.g., double head tilt))) (e.g., as illustrated in FIGS. 9D and 9J).

In response to detecting the one or more sensor measurements that correspond to the first movement (1004) and in accordance with a determination (e.g., by the one or more audio output devices and/or by a companion device such as a smartphone, smartwatch, tablet, wearable computing device, laptop computer, and/or desktop computer) that the first movement (e.g., 924a) corresponds to the respective portion of the user being oriented toward a second location (e.g., 908a) in the three-dimensional environment that is different from the first location in the three-dimensional environment (e.g., movement of a portion of the user (e.g., head) is moved (e.g., rotated to the right) (e.g., tilted to the right) so that its angle of orientation, position, and/or direction of movement corresponds to the same location (e.g., the second location) associated with the simulated spatial location of the second sound (e.g., a head rotation to the left that causes the user's face to be facing the first location) (e.g., a head tilt to the left that causes directed movement of the head towards the first location)), the one or more audio output devices output (e.g., 1008) a second sound (e.g., 926a) that has a simulated spatial location that corresponds to the second location in the three-dimensional environment, wherein the second sound corresponds to a second selectable option (e.g., 922a) (e.g., an option to initiate a phone call with a second contact from a list of contacts) of the one or more selectable options that is different from the first selectable option (e.g., as illustrated in FIG. 9E).

In some embodiments, spatial audio experiences in headphones are produced by manipulating sounds in the headphone's two audio channels (e.g., left and right) so that they resemble directional sounds arriving in the ear-canal. For example, the headphones can reproduce spatial audio signals that simulate spatial locations around the listener (e.g., the user) that are different from the locations of the physical speakers on the headphones and are optionally adjusted based on head movement. An effective spatial location simulation can render a spatial location that appears to be fixed in space (e.g., the listener perceives the sound as coming from a fixed location) even as the audio output components themselves move in space (e.g., as the listener's head is moving). Outputting a first sound that has simulated spatial location that corresponds to the first location in the three-dimensional environment in accordance with a determination that the first movement corresponds to a respective portion of the user being oriented toward a first location in the three-dimensional environment or outputting a second sound that has a simulated spatial location that corresponds to the second location in the three-dimensional environment in accordance with a determination that the first movement corresponds to the respective portion of the user being oriented toward a second location in the three-dimensional environment that is different from the first location in the three-dimensional environment provides the user with a non-visual user interface for navigating a one or more selectable options, thereby improving control of the one or more audio output devices. For example, providing different simulated spatialized sounds based on the orientation of the user towards different locations in the three-dimensional environment allows the user to effectively navigate through a set of selectable options without the use of a visually displayed UI and without requiring the user to produce a voice input. Improving control of the one or more audio output devices enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently. Further, outputting sounds with different simulated spatial locations based on the orientation of the user towards different locations in the three-dimensional environment, improves the feedback for the user. The sound outputs provide the user with feedback that allows the user to associated specific simulated spatial locations with specific selectable options and, in addition, provides the user with real-time feedback that the orientation of the respective portion of the user (e.g., head position/orientation/movement of direction) triggers the output of the respective sound in that respective simulated spatial region of the three-dimensional environment. Providing improved feedback to the user enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, subsequent to detecting the one or more sensor measurements that correspond to the first movement, the one or more audio output devices detect one or more sensor measurements that correspond to a second movement (e.g., 928a) of the respective portion of the user of the one or more audio output devices in the three-dimensional environment (in some embodiments, the second movement is a continuation of the first movement (e.g., an ongoing rotation of the user's head, such that the user's face shifts from facing a first or second direction to a third direction during the same ongoing rotation)).

In some embodiments, in response to detecting the one or more sensor measurements that correspond to the second movement and in accordance with a determination that the second movement corresponds to the respective portion of the user being oriented toward a third location in the three-dimensional environment that is different from a respective location (e.g., different from a first location or different from a second location) in the three-dimensional environment that corresponds to the first movement, the one or more audio output devices output a third sound (e.g., 932a) that has a simulated spatial location that corresponds to the third location (e.g., 906a) in the three-dimensional environment, wherein the third sound corresponds to a third selectable option (e.g., 918a) of the one or more selectable options that is different from a respective selectable option (e.g., different from a first selectable option or different from a second selectable option) that corresponds to the first movement (e.g., as illustrated in FIG. 9F). In some embodiments, in response to detecting the one or more sensor measurements that correspond to the second movement and in accordance with a determination that the second movement corresponds to the respective portion of the user being oriented toward a fourth location in the three-dimensional environment that is different from a respective location (e.g., different from a first location or different from a second location) in the three-dimensional environment that corresponds to the first movement and is different from the third location in the three-dimensional environment, outputting a fourth sound that has a simulated spatial location that corresponds to the fourth location in the three-dimensional environment, wherein the fourth sound corresponds to a fourth selectable option of the one or more selectable options that is different from a respective selectable option (e.g., different from a first selectable option or different from a second selectable option) that corresponds to the first movement and is different from the third selectable option. Outputting a third sound that has a simulated spatial location that corresponds to the third location in the three-dimensional environment provides the user with a non-visual user interface for navigating the one or more selectable options, thereby improving control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently. Further, outputting sounds with different simulated spatial locations based on the orientation of the user towards different locations in the three-dimensional environment, improves the feedback for the user. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, subsequent to detecting the one or more sensor measurements that correspond to the second movement, the one or more audio output devices detect one or more sensor measurements that correspond to a third movement (e.g., 934a) of the portion of the user of the one or more audio output devices in the three-dimensional environment (in some embodiments, the third movement is a reverse of the direction of the second movement (e.g., rotation of a user's head in an opposite direction (e.g., clockwise vs counter clockwise) from the direction of the rotation in the second movement)).

In some embodiments, in response to detecting the one or more sensor measurements that correspond to the third movement and in accordance with a determination that the third movement corresponds to the respective portion of the user being oriented toward a fourth location (e.g., 908a) in the three-dimensional environment that is the same as the first location in the three-dimensional environment that corresponds to the first movement, the one or more audio output devices output a fourth sound (e.g., 926a) (e.g., repeating the first sound) that has a simulated spatial location that corresponds to the fourth location in the three-dimensional environment, wherein the fourth sound corresponds to a fourth selectable option (e.g., 922a) of the one or more selectable options that is the same as the first selectable option that corresponds to the first movement (e.g., as illustrated in FIG. 9G). In some embodiments, in response to detecting the one or more sensor measurements that correspond to the third movement and in accordance with a determination that the third movement corresponds to the respective portion of the user being oriented toward a fifth location in the three-dimensional environment that is the same as the second location in the three-dimensional environment that corresponds to the first movement, outputting a fifth sound (e.g., repeating the second sound) that has a simulated spatial location that corresponds to the fifth location in the three-dimensional environment, wherein the fifth sound corresponds to a fifth selectable option of the one or more selectable options that is the same as the second selectable option that corresponds to the first movement. Outputting a fourth sound that has a simulated spatial location that corresponds to the fourth location in the three-dimensional environment provides the user with a non-visual user interface for navigating the one or more selectable options, thereby improving control of the one or more audio output devices. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently. Further, outputting sounds with different simulated spatial locations based on the orientation of the user towards different locations in the three-dimensional environment, improves the feedback for the user. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the simulated spatial location of the first sound is perceptually fixed in space (simulated such that the user perceives the first sound as coming from a fixed location) relative to the respective portion of the user (e.g., relative to a user's head (e.g., the user's head in a front facing position before movement has begun)) (in some embodiments, the simulated spatial location is perceptually fixed in space relative to a starting position (e.g., default position) of the user's head, such that the user will perceive sounds corresponding to the simulated spatial as coming from a constant location even during subsequent movement of the head); and the simulated spatial location of the second sound is perceptually fixed in space relative to the respective portion of the user (e.g., as illustrated in FIGS. 9D and 9E). Outputting sounds that have respective simulated spatial locations that corresponds to respective locations in the three-dimensional environment, wherein respective simulated spatial locations are perceptually fixed in space relative to the respective portion of the user, provides the user with greater control of the one or more audio output devices. Having simulated spatial locations perceptually fixed in space relative to the user facilitates a consistent manner in which the user is receiving audio feedback while interacting with selectable options in the three-dimensional environment. For example, the user will perceive a first sound as coming from a first simulated spatial location that is always perceptually fixed to the left of the user's head (e.g., based on a head rotation or head tilt to the left) regardless of the current orientation of the user's body. Doing so enhances the operability of the devices and makes the user-device interface more efficient (e.g., by helping the user to provide proper inputs and reducing user mistakes when operating/ interacting with the devices) which, additionally, reduces power usage and improves battery life of the devices by enabling the user to use the devices more quickly and efficiently.

In some embodiments, the simulated spatial location of the first sound is perceptually located apart from the respective portion of the user and/or a location of the one or more audio devices, wherein the simulated spatial location of the first sound is generated via a spatialized audio simulation (e.g., a spatial audio experience) (in some embodiments, the spatialized audio simulation is generated at the one or more audio output devices based on processing performed at the one or more audio output devices and/or based on processing performed at one or more external devices such as a smartphone; In some embodiments, the spatialized audio simulation is generated at an external device in communication with the one or more audio output devices); and the simulated spatial location of the second sound is perceptually located apart from the respective portion of the user and/or the location of the one or more audio devices, wherein the simulated spatial location of the second sound is generated via the spatialized audio simulation at the one or more audio output devices (e.g., as illustrated in FIGS. 9E and 9D). Outputting sounds that have respective simulated spatial locations that corresponds to respective locations in the three-dimensional environment, wherein respective simulated spatial locations are perceptually located apart from the respective portion of the user, provides the user with greater control of the one or more audio output devices. Having simulated spatial locations perceptually fixed in space relative to the user facilitates a consistent manner in which the user is receiving audio feedback while interacting with selectable options in the three-dimensional environment. For example, the user will perceive a first sound as coming from a first simulated spatial location that is always perceptually fixed to the left of the user's head (e.g., based on a head rotation or head tilt to the left) regardless of the current orientation of the user's body. Doing so enhances the operability of the devices and makes the user-device interface more efficient (e.g., by helping the user to provide proper inputs and reducing user mistakes when operating/ interacting with the devices) which, additionally, reduces power usage and improves battery life of the devices by enabling the user to use the devices more quickly and efficiently.

In some embodiments, the first location in the three-dimensional environment is a first simulated location positioned relative to a respective orientation (e.g., a default orientation and/or a front facing position) of the respective portion of the user (e.g., body and/or head); and the second location in the three-dimensional environment is a second simulated location positioned relative to the respective orientation of the respective portion of the user (e.g., as illustrated in FIGS. 9E and 9D). Outputting sounds that have respective simulated spatial locations that corresponds to respective locations in the three-dimensional environment, in accordance with a determination that a respective movement corresponds to a respective portion of the user being oriented toward a respective location in the three-dimensional environment, wherein the respective locations are simulated locations positioned relative to a respective orientation of the respective portion of the user provides the user with greater control of the one or more audio output devices. Having simulated locations in a three-dimensional environment that are positioned relative to a respective orientation of the user facilitates a consistent interface for the user to interact with regardless of whether the user's body is in motion. For example, the user can interact with (e.g., produce head movement towards) a simulated location that is always is positioned the left of the user's head (e.g., based on a head rotation or head tilt to the left) regardless of the current orientation of the user's body. Doing so enhances the operability of the devices and makes the user-device interface more efficient (e.g., by helping the user to provide proper inputs and reducing user mistakes when operating/ interacting with the devices) which, additionally, reduces power usage and improves battery life of the devices by enabling the user to use the devices more quickly and efficiently.

In some embodiments, the first simulated location is fixed (e.g., the location does not change) relative to the respective orientation of the respective portion of the user (e.g., a simulated location that is always is positioned the left of the user's head (e.g., based on a head rotation or head tilt to the left) regardless of the current orientation and/or movement of the user's body); and the second simulated location is fixed relative to the respective orientation of the respective portion of the user (e.g., as illustrated in FIGS. 9E and 9D). Outputting sounds that have respective simulated spatial locations that corresponds to respective locations in the three-dimensional environment, in accordance with a determination that a respective movement corresponds to a respective portion of the user being oriented toward a respective location in the three-dimensional environment, wherein the respective locations are simulated locations positioned relative to a respective orientation of the respective portion of the user provides the user with greater control of the one or more audio output devices. Having simulated locations in a three-dimensional environment that are positioned relative to a respective orientation of the user facilitates a consistent interface for the user to interact with regardless of whether the user's body is in motion. For example, the user can interact with (e.g., produce head movement towards) a simulated location that is always is positioned the left of the user's head (e.g., based on a head rotation or head tilt to the left) regardless of the current orientation of the user's body. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the respective portion of the user is a head of the user and the first movement is a rotation of the head of the user (e.g., as illustrated in FIGS. 9E and 9D). Outputting a first sound that has simulated spatial location that corresponds to the first location in the three-dimensional environment in accordance with a determination that the first movement corresponds to a respective portion of the user being oriented toward a first location in the three-dimensional environment, the respective portion of the user is a head of the user and the first movement is a rotation of the head of the user, provides the user with a non-visual hands-free user interface for navigating a one or more selectable options, thereby improving control of the one or more audio output devices. For example, providing different simulated spatialized sounds based directionalized head movement allows the user to effectively navigate through a set of selectable options without the use of a visually displayed UI and without requiring the user to provide a hand or arm motion gesture. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, an axis of the rotation of the head of the user is positioned relative to a pose (e.g., a body position and/or orientation) of the user (e.g., the axis is always positioned through the user's body line regardless of whether the user is in a standing position or a reclining position) (e.g., as illustrated in FIGS. 9E and 9D). Having an axis of the rotation of the head of the user be positioned relative to a pose of the user provides the user with additional control of the one or more audio output devices by facilitating a consistent interface for the user to interact with regardless of the user's body position and/or orientation. For example, the user can interact with (e.g., produce head movement towards) a selectable option that always is perceptually fixed to the left of the user's head (e.g., based on a head rotation or head tilt to the left) regardless of whether the user is standing up or laying down. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the first sound is an announcement describing the first selectable option of the one or more selectable options (e.g., a sound describing an option to initiate a real-time communication session with a first contact); and the second sound is an announcement describing the second selectable option of the one or more selectable options (e.g., a sound describing an option to initiate a real-time communication session with a second contact); wherein the second sound is different from the first sound (e.g., as illustrated in FIGS. 9E and 9D). Outputting a first sound that has simulated spatial location that corresponds to the first location in the three-dimensional environment wherein the first sound is an announcement describing the first selectable option of the one or more selectable options and outputting a second sound that has a simulated spatial location that corresponds to the second location in the three-dimensional environment, wherein the second sound is an announcement describing the second selectable option of the one or more selectable options improves feedback for the user. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more audio output devices detect one or more sensor measurements that correspond to a first motion gesture (in some embodiments, detecting one or more sensor measurements occurs after outputting a respective sound that corresponds to a respective selectable option); and in response to detecting one or more sensor measurements that correspond to a first motion gesture (e.g., 936c) (e.g., a gesture of a first type (e.g., a nod, a shake, a tilt, and/or a double tilt of the user's head)) and in accordance with a determination that the first motion gesture is detected within a threshold time period of outputting the first sound (e.g., 948) (e.g., period of time while the first announcement for the first selectable option is ongoing and/or before a second announcement for the second selectable option is output), the one or more audio output devices cause performance of a first operation associated with the first selectable option (e.g., 946).

In some embodiments, in response to detecting one or more sensor measurements that correspond to a first motion gesture (e.g., 936c) and in accordance with a determination that the first motion gesture is detected within a threshold time period of outputting the second sound (e.g., 954)(e.g., period of time while the second announcement for the first selectable option is ongoing and/or before a third announcement for a third selectable option is output), the one or more audio output devices cause performance of a first operation associated with the second selectable option (e.g., 952) (e.g., as illustrated at FIG. 9M). Causing performance of the first operation associated with the first selectable option in accordance with a determination that the first motion gesture is detected within a threshold time period of outputting the first sound and causing performance of a first operation associated with the second selectable option in accordance with a determination that the first motion gesture is detected within a threshold time period of outputting the second sound provides the user with a non-visual user interface for performing an operation corresponding to a respective selectable options, thereby improving control of the one or more audio output device. For example, causing the performance an operation corresponding to a respective selectable options based on a motion gesture being detected within a threshold time period of outputting a respective sound provides for precise control of the non-visual interface without the use of a visually displayed UI and without requiring the user to produce a voice input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, prior to detecting the one or more sensor measurements that correspond to the first movement of the respective portion of the user of the one or more audio output devices in the three-dimensional environment, the one or more audio output devices detect one or more sensor measurements that correspond to a movement (e.g., 902a and/or e.g., 902b) of a second portion of the user (in some embodiments, the second portion of the user is the same as the respective portion of the user), wherein: in accordance with a determination that the one or more sensor measurements that correspond to the movement of the second portion of the user correspond to a first type of movement (e.g., a left head tilt or double left head tilt (e.g., 902a)), the one or more selectable options is a first set of selectable options (e.g., 916a, 918a, and/or 922a) (e.g., options of a first menu (e.g., a menu of contactable users)); and in accordance with a determination that the one or more sensor measurements that correspond to the movement of the second portion of the user correspond to a second type of movement that is different than the first type of movement (e.g., a right head tilt or double right head tilt (e.g., 902b)), the one or more selectable options is a second set of selectable options (e.g., 916b, 918b, and/or 922b) that is different from the first set of selectable options (e.g., options of a second menu (e.g., a menu of songs)) (e.g., as illustrated in FIGS. 9A and 9I). Detecting one or more sensor measurements that correspond to a movement of a second portion of the user, wherein, in accordance with a determination that the one or more sensor measurement that correspond to the movement of the second portion of the user correspond to a respective type of movement, the one or more selectable options is a respective set of selectable options, improves control of the one or more audio output devices by providing the user with control over a larger range of selectable option sets in the three dimensional environment. For example, the user can efficiently navigate to different sets of selectable options, based upon movement of the second portion of the user, and depending upon the type of movement (e.g., left head tilt or right head tilt) that movement of the second portion of the user corresponds to. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more selectable options (e.g., 916a, 918a, and/or 922a) are a first subset of a plurality of options (e.g., options of a hierarchical menu (e.g., a menu of songs that are arranged by genre (e.g., level 1), artist (e.g., level 2), album (e.g., level 3), and then song (e.g., level 4))) that are arranged in a hierarchy and the one or more selectable options correspond to a first level of the hierarchy.

In some embodiments, the one or more audio output devices detect (e.g., before or after detecting the first movement of the respective portion of the user) one or more sensor measurements that correspond to a movement (e.g., 938) of a third portion of the user (in some embodiments, the third portion of the user is the same as the respective portion of the user) (in some embodiments, one or more sensor measurements that correspond to the movement of the third portion of the user is detected after outputting a respective sound (e.g., first or second sound)); and in response to detecting the one or more sensor measurements that correspond to the movement of the third portion of the user, the one or more audio output devices cause performance of a hierarchy navigation operation, wherein causing performance of the hierarchy navigation includes navigating to a second level (e.g., a level higher or lower in the hierarchy) of the hierarchy that includes a second subset of the plurality of options (e.g., 946 and 952) that are different from the one or more selectable options (e.g., the one or more selectable options correspond to genres of music and the second subset of the plurality of options correspond to artists within that genre) (e.g., as illustrated in FIGS. 9L and 9M). Causing performance of a hierarchy navigation operation in response to detecting the one or more sensor measurements that corresponds to the movement of the third portion of the user, wherein causing performance of a hierarchy navigation operation includes navigating to a second level of the hierarchy that includes a second subset of the plurality of options that are different from the one or more selectable options improves control of the one or more audio devices by providing the user with control over a larger range of selectable options corresponding to different sub-menus. For example, while interacting in a menu of selectable options, a use can efficiently navigate to set of selectable options within a sub-menu of the menu without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more selectable options that correspond to the first level of the hierarchy have a first number of selectable options; and the second subset of the plurality of options that corresponds to the second level of the hierarchy has a second number of selectable options, different (e.g., a larger or smaller number) from the first number of selectable options (e.g., as illustrated in FIGS. 9L and 9M). Causing performance of a hierarchy navigation operation in response to detecting the one or more sensor measurements that corresponds to the movement of the third portion of the user, wherein causing performance of a hierarchy navigation operation includes navigating to a second level of the hierarchy that includes a second subset of the plurality of options that are different from the one or more selectable options improves control of the one or more audio devices by providing the user with control over a larger range of selectable options corresponding to different sub-menus. For example, while interacting in a menu of selectable options, a use can efficiently navigate to set of selectable options within a sub-menu of the menu without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the simulated spatial location that corresponds to the first location (e.g., 904b) in the three-dimensional environment (e.g., the location that corresponds to the first selectable option of the one or more selectable options) and the simulated spatial location that corresponds to the second location (e.g., 906b) in the three-dimensional environment (e.g., the location that corresponds to the second selectable option of the one or more selectable options) have a first spatial separation in the three-dimensional environment (e.g., a linear distance that separates them and/or an angular separation) (e.g., as shown in FIGS. 9I and 9L).

In some embodiments, the second subset of the plurality of options that corresponds to the second level of the hierarchy includes: a first selectable option (e.g., 946) in the second level of the hierarchy that corresponds to fifth location (e.g., 942) in the three-dimensional environment (e.g., the first second level selectable option corresponds to a sound that is output at the third location); and a second selectable option (e.g., 952) in the second level of the hierarchy that corresponds to a sixth location (e.g., 944) in the three-dimensional environment, wherein the third location in the three-dimensional environment and the fourth location in the three-dimensional environment have a second spatial separation in the three-dimensional environment that is different from the first spatial separation (e.g., the a greater or lesser amount of spatial separation) (in some embodiments, the degree of spatial separation between options at different levels of the hierarchy differ (e.g., because the number of options differ between the levels)). Causing performance of a hierarchy navigation operation in response to detecting the one or more sensor measurements that corresponds to the movement of the third portion of the user, wherein causing performance of a hierarchy navigation operation includes navigating to a second level of the hierarchy that includes a second subset of the plurality of options that are different from the one or more selectable options improves control of the one or more audio devices by providing the user with control over a larger range of selectable options corresponding to different sub-menus. For example, while interacting in a menu of selectable options, a use can efficiently navigate to set of selectable options within a sub-menu of the menu without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, the one or more audio output devices detect one or more sensor measurements that correspond to a second motion gesture (e.g., 936a) (e.g., head gesture (e.g., head nod or head shake)); and in response to detecting one or more sensor measurements that correspond to the second motion gesture and in accordance with the determination that the second motion gesture is detected while the respective portion of the user is oriented towards the first location (in some embodiments, the current orientation of the user is detected via one or more sensors (e.g., one or more accelerometers, gyroscopes, magnetometers, inertial measurement units, optical sensors and/or other sensors that are capable of detecting orientation) located at the one or more audio output devices and/or located at a companion device such as a smartphone, smartwatch, tablet, wearable computing device, laptop computer, and/or desktop computer) in the three-dimensional environment, the one or more audio output devices cause performance of an operation associated with the first selectable option.

In some embodiments, in response to detecting one or more sensor measurements that correspond to the second motion gesture and in accordance with the determination that the second motion gesture (e.g., 936a) is detected while the respective portion of the user is oriented towards the second location (e.g., 908a) in the three-dimensional environment, the one or more audio output devices cause performance of an operation associated with the second selectable option (e.g., 922a) (e.g., as illustrated in FIG. 9H). In some embodiments, performance of the operation associated with the first selectable option is independent of the output of the first sound (e.g., the user can gesture in the direction of the first location of the three-dimensional environment to perform the associated operation without first having listened to the first sound). In some embodiments, performance of the operation associated with the first selectable option caused subsequent to outputting the first sound (e.g., the user has to make a first movement to cause the output of the first sound before making a head gesture in the direction of the sound to perform the associated operation). Causing performance of an operation associated with the first selectable option in accordance with the determination that a second motion gesture is detected while the respective portion of the user is oriented towards the first location in the three-dimensional environment, and causing performance of an operation associated with the second selectable option in accordance with the determination that the second motion gesture is detected while the respective portion of the user is oriented towards the second location in the three-dimensional environment provides the user with a non-visual user interface for performing an operation corresponding to a respective selectable options, thereby improving control of the one or more audio output device. For example, causing the performance an operation corresponding to respective selectable options based on the direction that the user is oriented in when the motion gesture is received provides for precise control of the non-visual interface without the use of a visually displayed UI and without requiring the user to produce a voice input. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

In some embodiments, causing performance of the operation associated with the first selectable option includes: in accordance with a determination that the second motion gesture is a motion gesture of a third type (e.g., 936b) (e.g., head nod gesture), causing performance of an operation (e.g., as illustrated in FIG. 9K) (e.g., as described above in relation to method 700 and FIGS. 6A-6R) of a first type (e.g., shuffle the media playback of a first playlist) associated with the first selectable option (e.g., an option corresponding to a first playlist); and in accordance with a determination that the second motion gesture is a motion gesture of a fourth type (e.g., 938) (e.g., head tilt gesture), causing performance of an operation of a second type (e.g., navigate to a submenu of individual songs for playback within the first playlist), different from the operation of the first type, associated with the first selectable option (e.g., an option corresponding to a first playlist) (e.g., as illustrated in FIG. 9L). In some embodiments, causing performance of the operation associated with the second selectable option includes: in accordance with a determination that the second motion gesture is of a motion gesture of the third type (e.g., head nod gesture), causing performance of an operation of a first type (e.g., shuffle the media playback of a second playlist) associated with the second selectable option (e.g., an option corresponding to a second playlist); and in accordance with a determination that the second motion gesture is a motion gesture of the fourth type (e.g., head tilt gesture), causing performance of an operation of a second type (e.g., navigate to a submenu of individual songs for playback within the second playlist) associated with the second selectable option (e.g., an option corresponding to a second playlist). Causing performance of an operation of a second type, different from the operation of the first type, in accordance with the determination that the second motion gesture is a motion gesture of a fourth type provides the user with control over a larger range of operations, based upon different motion gesture types, without the use of a visually displayed UI and without requiring the user to provide a responsive voice command. Doing so enhances the operability of the devices and makes the user-device interface more efficient (e.g., by helping the user to provide proper inputs and reducing user mistakes when operating/interacting with the devices) which, additionally, reduces power usage and improves battery life of the devices by enabling the user to use the devices more quickly and efficiently.

Note that details of the processes described above with respect to method 1000 (e.g., FIG. 10) are also applicable in an analogous manner to the methods described above. For example, methods 700 and 800 optionally includes one or more of the characteristics of the various methods described above with reference to method 1000. For example, using the techniques described in methods 800 and 1000, the one or more audio output devices can cause performance of the operations described in in relation to method 700. For example, method 800 can be used to provide feedback for the progression of a motion gesture that causes performance of an operation for a selectable option in a simulated spatial arrangement in accordance with method 1000. As an additional example, sounds that have a simulated spatial arrangement in accordance with method 1000 can be audio notifications in method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve efficiency of interacting with audio data that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used as input data and/or to determine user intent. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining user intent and/or input, the present technology can be configured to allow users to select to "opt in" or "opt out" of participation in the collection of personal information data during registration for services or anytime thereafter. In another example, users can select not to provide movement-associated data for determining user intent. In yet another example, users can select to limit the length of time movement-associated data is maintained or entirely prohibit the development of a baseline movement profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users via audio data by inferring preferences based on non-personal information data or a bare minimum amount of personal information, such as the content being requested by the device associated with a user, other non-personal information available to the system, or publicly available information.

What is claimed is:

1. One or more audio output devices comprising:
one or more processors; and
memory storing one or more programs configured to be executed by the one or more processors, the one or more programs including instructions for:
outputting a first audio notification;
subsequent to outputting the first audio notification, a motion input, based on one or more sensor measurements from one or more sensors in the one or more audio output devices, is detected; and
in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification, wherein causing performance of the first operation associated with the first audio notification includes:
in accordance with a determination that the motion input corresponds to one or more rotations around a first axis of rotation, causing performance of an operation of a first type associated with the first audio notification; and
in accordance with a determination that the motion input corresponds to one or more rotations around a second axis of rotation, different from the first axis of rotation, causing performance of an operation of a second type, different from the first type, associated with the first audio notification.

2. The one or more audio output devices of claim 1, the one or more programs further including instructions for:

in response to the detection of the motion input and in accordance with a determination that the first set of criteria are not met, forgoing causing performance of the first operation associated with the first audio notification.

3. The one or more audio output devices of claim 1, wherein:
the first audio notification includes an actionable prompt; and
the motion input that corresponds to the one or more rotations around the first axis of rotation corresponds to an affirmative response to the actionable prompt.

4. The one or more audio output devices of claim 1, wherein:
the first audio notification includes an actionable prompt; and
the motion input that corresponds to the one or more rotations around the second axis of rotation corresponds to a negative response to the actionable prompt.

5. The one or more audio output devices of claim 1, wherein:
the first audio notification is a first sub-portion of a first ongoing audio notification;
the motion input is detected during the output of the first ongoing audio notification; and
causing performance of the first operation includes interrupting the output of the first ongoing audio notification.

6. The one or more audio output devices of claim 5, wherein interrupting the output of the first ongoing audio notification includes:
ceasing the output of the first ongoing audio notification; and
outputting a second audio notification.

7. The one or more audio output devices of claim 1, wherein:
the first audio notification includes a prompt to change a mode associated with the one or more audio output devices; and
causing performance of the first operation includes changing the mode associated with the one or more audio output devices from a first mode associated with the one or more audio output devices to a second mode associated with the one or more audio output devices that is different from the first mode.

8. The one or more audio output devices of claim 7, wherein:
the first mode associated with the one or more audio output devices is a first notification mode that includes a first set of notification settings; and
the second mode associated with the one or more audio output devices is a second notification mode that includes a second set of notification settings that are different from the first set of notification settings.

9. The one or more audio output devices of claim 7, wherein:
the first mode associated with the one or more audio output devices is a first audio notification mode that includes a first set of audio notification output settings that affect the output of audio notifications via the one or more audio output devices; and
the second mode associated with the one or more audio output devices is a second audio notification mode that includes a second set of audio notification output settings that affect the output of audio notifications via the one or more audio output devices, wherein the second set of audio notification output settings are different from the first set of audio notification settings.

10. The one or more audio output devices of claim 7, wherein the first audio notification that includes the prompt to change the mode associated with the one or more audio output devices is output after a plurality of previous motion inputs were detected, wherein the plurality of previous motion inputs satisfied a second set of criteria.

11. The one or more audio output devices of claim 1, wherein:
causing performance of the first operation includes changing a playback status of a media item.

12. The one or more audio output devices of claim 1, wherein:
the first audio notification is associated with an inquiry to join a real-time communication session; and
causing performance of the first operation includes joining the real-time communication session.

13. The one or more audio output devices of claim 1, wherein:
the first audio notification includes a prompt to send a message; and
causing performance of the first operation includes sending the message.

14. The one or more audio output devices of claim 1, wherein:
causing performance of the first operation includes outputting an announcement corresponding to a received message.

15. The one or more audio output devices of claim 1, the one or more programs further including instructions for:
in response to the detection of the motion input, providing first audio feedback indicating that the motion input is recognized.

16. The one or more audio output devices of claim 15, wherein providing the first audio feedback includes:
in accordance with a determination that the detected motion input is a motion input of a first type, providing audio feedback of a first type; and
in accordance with a determination that the detected motion input is a motion input of a second type, providing audio feedback of a second type, different from the first type.

17. The one or more audio output devices of claim 1, wherein performance of the first operation is caused without a speech input from a user of the one or more audio output devices.

18. The one or more audio output devices of claim 1, wherein the first set of criteria includes a second criterion that is met when:
in accordance with a determination that a conflicting speech input is detected during a second threshold time period of outputting the first audio notification, the detected motion input is identified as an intended input based on a set of conflict resolution criteria.

19. A non-transitory computer-readable storage medium storing one or more programs configured to be executed by one or more processors of one or more audio output devices, the one or more programs including instructions for:
outputting a first audio notification;
subsequent to outputting the first audio notification, a motion input, based on one or more sensor measurements from one or more sensors in the one or more audio output devices, is detected; and
in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification, wherein causing performance of the first operation associated with the first audio notification includes:
in accordance with a determination that the motion input corresponds to one or more rotations around a first axis of rotation, causing performance of an operation of a first type associated with the first audio notification; and
in accordance with a determination that the motion input corresponds to one or more rotations around a second axis of rotation, different from the first axis of rotation, causing performance of an operation of a second type, different from the first type, associated with the first audio notification.

20. A method, comprising:
at one or more audio output devices:
outputting a first audio notification;
subsequent to outputting the first audio notification, a motion input, based on one or more sensor measurements from one or more sensors in the one or more audio output devices, is detected; and
in response to the detected motion input and in accordance with a determination that a first set of criteria are met, wherein the first set of criteria includes a first criterion that is met when the motion input is detected within a threshold time period of outputting the first audio notification, causing performance of a first operation associated with the first audio notification, wherein causing performance of the first operation associated with the first audio notification includes:
in accordance with a determination that the motion input corresponds to one or more rotations around a first axis of rotation, causing performance of an operation of a first type associated with the first audio notification; and
in accordance with a determination that the motion input corresponds to one or more rotations around a second axis of rotation, different from the first axis of rotation, causing performance of an operation of a second type, different from the first type, associated with the first audio notification.

21. The non-transitory computer-readable storage medium 19, the one or more programs further including instructions for:
in response to the detection of the motion input and in accordance with a determination that the first set of criteria are not met, forgoing causing performance of the first operation associated with the first audio notification.

22. The non-transitory computer-readable storage medium 19, wherein:
the first audio notification includes an actionable prompt; and
the motion input that corresponds to the one or more rotations around the first axis of rotation corresponds to an affirmative response to the actionable prompt.

23. The non-transitory computer-readable storage medium 19, wherein:
the first audio notification includes an actionable prompt; and
the motion input that corresponds to the one or more rotations around the second axis of rotation corresponds to a negative response to the actionable prompt.

24. The non-transitory computer-readable storage medium 19, wherein:

the first audio notification is a first sub-portion of a first ongoing audio notification;

the motion input is detected during the output of the first ongoing audio notification; and causing performance of the first operation includes interrupting the output of the first ongoing audio notification.

25. The non-transitory computer-readable storage medium 24, wherein interrupting the output of the first ongoing audio notification includes:

ceasing the output of the first ongoing audio notification; and outputting a second audio notification.

26. The non-transitory computer-readable storage medium 19, wherein:

the first audio notification is associated with an inquiry to join a real-time communication session; and causing performance of the first operation includes joining the real-time communication session.

27. The non-transitory computer-readable storage medium 19, wherein:

the first audio notification includes a prompt to send a message; and causing performance of the first operation includes sending the message.

28. The non-transitory computer-readable storage medium 19, the one or more programs further including instructions for:

in response to the detection of the motion input, providing first audio feedback indicating that the motion input is recognized.

29. The non-transitory computer-readable storage medium 28, wherein providing the first audio feedback includes:

in accordance with a determination that the detected motion input is a motion input of a first type, providing audio feedback of a first type; and in accordance with a determination that the detected motion input is a motion input of a second type, providing audio feedback of a second type, different from the first type.

30. The non-transitory computer-readable storage medium 19, wherein performance of the first operation is caused without a speech input from a user of the one or more audio output devices.

31. The method of claim 20, further comprising:

in response to the detection of the motion input and in accordance with a determination that the first set of criteria are not met, forgoing causing performance of the first operation associated with the first audio notification.

32. The method of claim 20, wherein:

the first audio notification includes an actionable prompt; and the motion input that corresponds to the one or more rotations around the first axis of rotation corresponds to an affirmative response to the actionable prompt.

33. The method of claim 20, wherein:

the first audio notification includes an actionable prompt; and the motion input that corresponds to the one or more rotations around the second axis of rotation corresponds to a negative response to the actionable prompt.

34. The method of claim 20, wherein:

the first audio notification is a first sub-portion of a first ongoing audio notification;

the motion input is detected during the output of the first ongoing audio notification; and causing performance of the first operation includes interrupting the output of the first ongoing audio notification.

35. The method of claim 34, wherein interrupting the output of the first ongoing audio notification includes:

ceasing the output of the first ongoing audio notification; and outputting a second audio notification.

36. The method of claim 20, wherein:

the first audio notification is associated with an inquiry to join a real-time communication session; and causing performance of the first operation includes joining the real-time communication session.

37. The method of claim 20, wherein:

the first audio notification includes a prompt to send a message; and causing performance of the first operation includes sending the message.

38. The method of claim 20, further comprising:

in response to the detection of the motion input, providing first audio feedback indicating that the motion input is recognized.

39. The method of claim 38, wherein providing the first audio feedback includes:

in accordance with a determination that the detected motion input is a motion input of a first type, providing audio feedback of a first type; and in accordance with a determination that the detected motion input is a motion input of a second type, providing audio feedback of a second type, different from the first type.

40. The method of claim 20, wherein performance of the first operation is caused without a speech input from a user of the one or more audio output devices.

* * * * *